United States Patent
Abu-Reziq et al.

(10) Patent No.: US 12,478,064 B2
(45) Date of Patent: Nov. 25, 2025

(54) MICROCAPSULES AND PROCESSES FOR THEIR PREPARATION

(71) Applicant: Yissum Research Development Company of The Hebrew University of Jerusalem Ltd., Jerusalem (IL)

(72) Inventors: Raed Abu-Reziq, Jatt Hamesholash (IL); Charlie Batarseh, Jerusalem (IL); Ahmad Zarour, Lod (IL); Yafit Schnell, Haifa (IL); Amani Zoabi, Nazareth (IL); Suzana Natour, Qalansuwa Hameshulash (IL); Suheir Omar, Deir el-Assad (IL); Esti Weiss, Mevaseret Zion (IL)

(73) Assignee: Yissum Research Development Company of The Hebrew University of Jerusalem Ltd., Jerusalem (IL)

( * ) Notice: Subject to any disclaimer, the term of this patent is extended or adjusted under 35 U.S.C. 154(b) by 1552 days.

(21) Appl. No.: 16/766,684

(22) PCT Filed: Nov. 22, 2018

(86) PCT No.: PCT/IL2018/051268
§ 371 (c)(1),
(2) Date: May 24, 2020

(87) PCT Pub. No.: WO2019/102468
PCT Pub. Date: May 31, 2019

(65) Prior Publication Data
US 2023/0172195 A1    Jun. 8, 2023

Related U.S. Application Data

(60) Provisional application No. 62/590,286, filed on Nov. 23, 2017, provisional application No. 62/590,288, filed on Nov. 23, 2017.

(51) Int. Cl.
| | |
|---|---|
| *A01N 25/28* | (2006.01) |
| *A01N 43/80* | (2006.01) |
| *A01N 47/34* | (2006.01) |
| *B01J 13/02* | (2006.01) |
| *B01J 21/08* | (2006.01) |
| *B01J 31/16* | (2006.01) |
| *B01J 31/22* | (2006.01) |
| *B01J 35/23* | (2024.01) |
| *B01J 37/00* | (2006.01) |

(52) U.S. Cl.
CPC ............. *A01N 25/28* (2013.01); *A01N 43/80* (2013.01); *A01N 47/34* (2013.01); *B01J 13/02* (2013.01); *B01J 21/08* (2013.01); *B01J 31/1683* (2013.01); *B01J 31/22* (2013.01); *B01J 35/23* (2024.01); *B01J 37/0072* (2013.01); *B01J 2231/646* (2013.01); *B01J 2531/824* (2013.01)

(58) Field of Classification Search
None
See application file for complete search history.

(56) References Cited

U.S. PATENT DOCUMENTS

| | | |
|---|---|---|
| 2012/0104638 A1 | 5/2012 | Travnor et al. |
| 2012/0104639 A1 | 5/2012 | Travnor et al. |

FOREIGN PATENT DOCUMENTS

| | | |
|---|---|---|
| GB | 2416524 A | 2/2006 |
| WO | WO 01/80823 A2 | 11/2001 |
| WO | WO 03/066209 A1 | 8/2003 |
| WO | WO 2008/072239 A2 | 6/2008 |

OTHER PUBLICATIONS

Chai et al. (2015). Development of bifunctional microencapsulated phase change materials with crystalline titanium dioxide shell for latent-heat storage and photocatalytic effectiveness. *Applied Energy*, 138, 661-674.
Zhang et al. (2015). Design and fabrication of dual-functional microcapsules containing phase change material core and zirconium oxide shell with fluorescent characteristics. *Solar Energy Materials and Solar Cells*, 133, 56-68.
Zhang et al. (2016). Microencapsulation of n-dodecane into zirconia shell doped with rare earth: Design and synthesis of bifunctional microcapsules for photoluminescence enhancement and thermal energy storage. *Energy*, 97, 113-126.
Niederberger et al. (2009). Metal oxide nanoparticles in organic solvents: synthesis, formation, assembly and application, Chapter 2: Aqueous and None Aqueous Sol Gel Chemistry. Springer Science & Business Media.
Niederberger, M. (2007). Nonaqueous sol-gel routes to metal oxide nanoparticles. Accounts of chemical research, 40(9), 793-800.
Debecker, D. P. et al. (2012). Non-hydrolytic sol-gel routes to heterogeneous catalysts, Chemical Society Reviews, 41(9), 3624-3650.
International Search Report issued for PCT Application No. PCT/IL2018/051268 dated May 14, 2019.

*Primary Examiner* — Alton N Pryor
(74) *Attorney, Agent, or Firm* — Mark S. Cohen; PEARL COHEN ZEDEK LATZER BARATZ LLP

(57) ABSTRACT

The present invention provides microcapsules encapsulating hydrophilic or hydrophobic active agents in an inorganic shell, processes for their preparation and compositions comprising them.

7 Claims, 33 Drawing Sheets

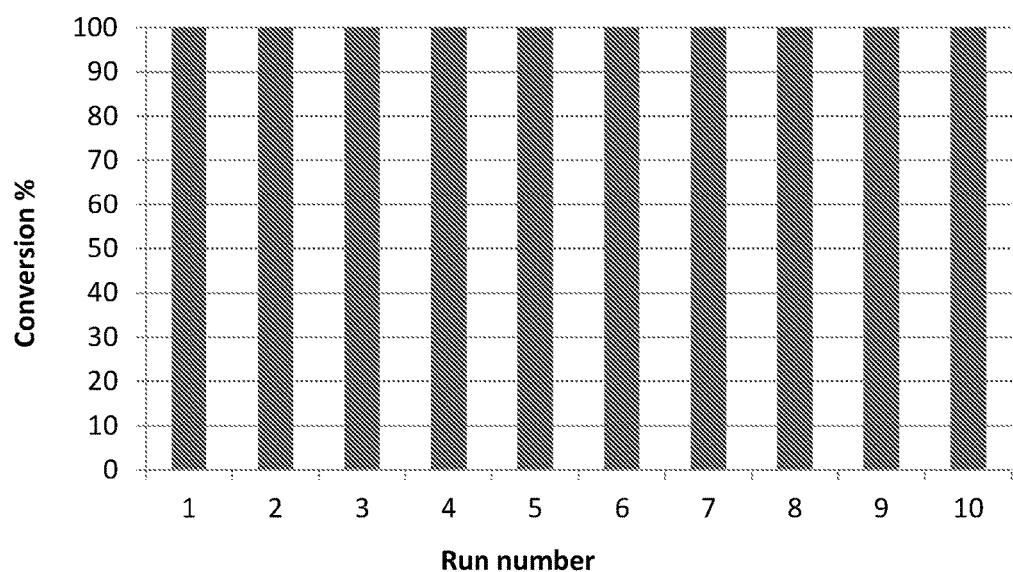
Figure 43
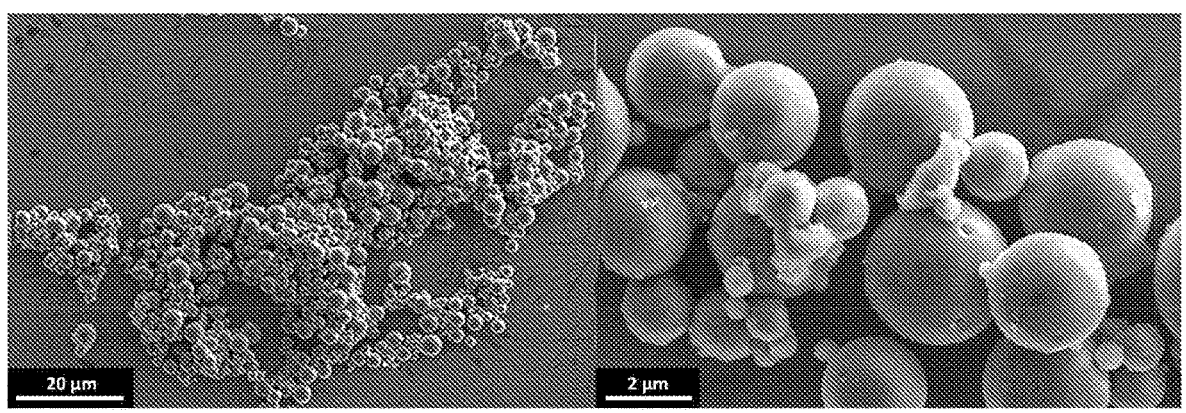
Figure 44AFigure 44B

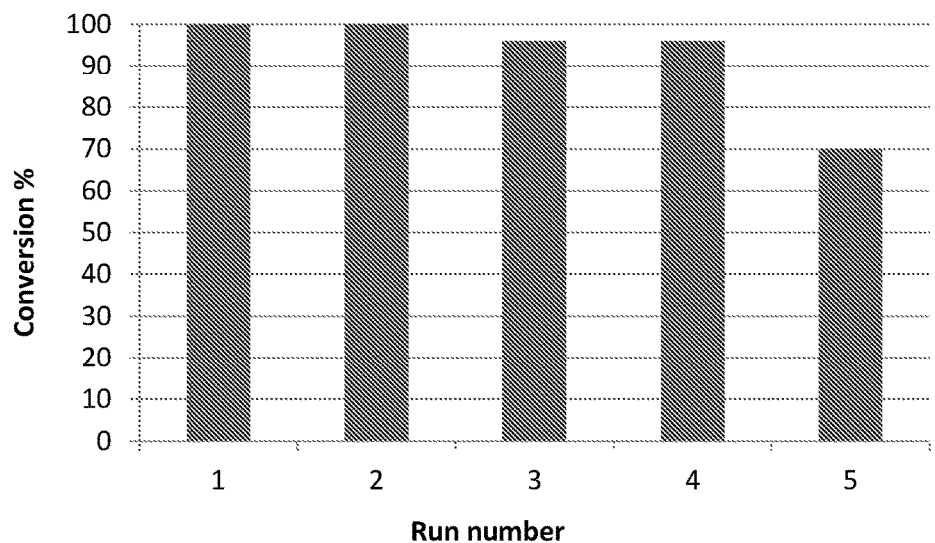
Figure 45
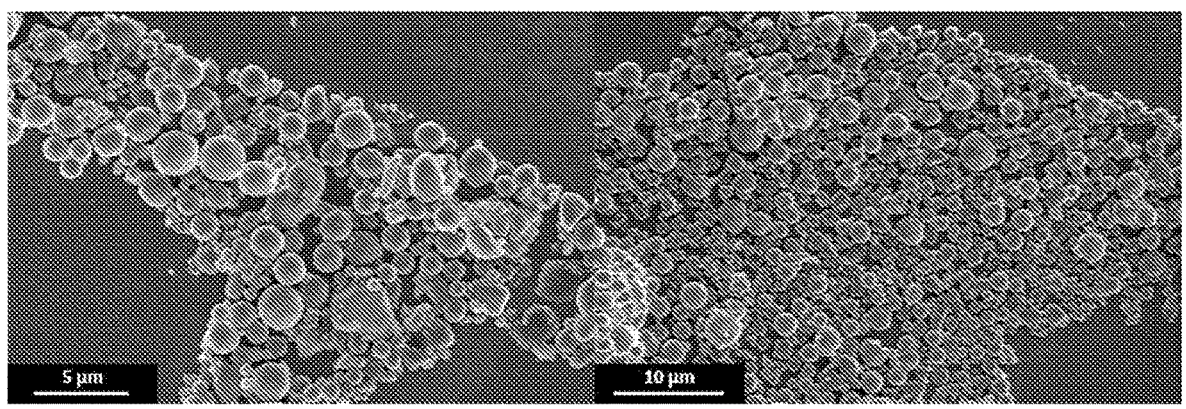
Figure 46A                              Figure 46B

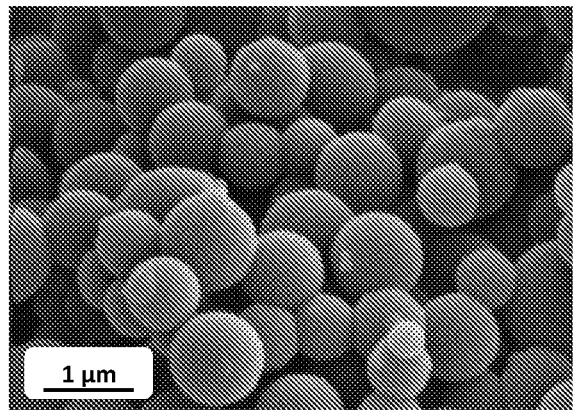 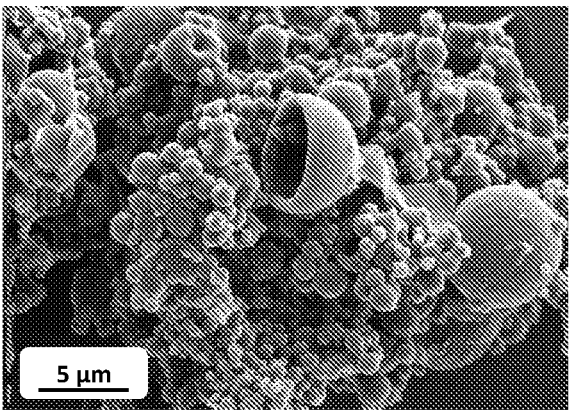
Figure 47A          Figure 47B
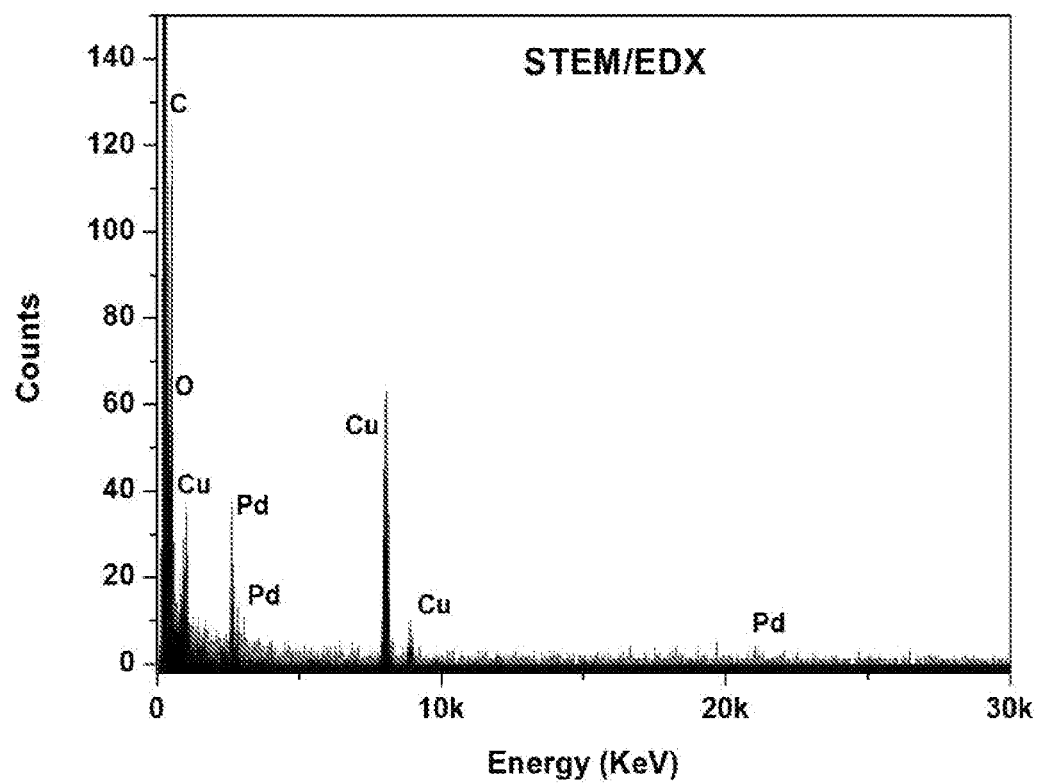
Figure 48

MICROCAPSULES AND PROCESSES FOR THEIR PREPARATION

CROSS-REFERENCE TO RELATED APPLICATIONS

This application is a National Phase Application of PCT International Application No. PCT/IL2018/051268, International Filing Date Nov. 22, 2018, claiming the benefit of U.S. Patent Application(s) No(s). 62/590,286 and 62/590,288, filed Nov. 23, 2017, which are hereby incorporated by reference.

TECHNOLOGICAL FIELD

The present invention provides microcapsules encapsulating hydrophilic or hydrophobic active agents in an inorganic shell, processes for their preparation and compositions comprising them.

BACKGROUND

The aqueous sol-gel process can be defined as the conversion of a precursor solution into an inorganic solid via inorganic polymerization reactions induced by water. In general, the sol-gel process consists of the main steps: in the first step a homogeneous solution is prepared by dissolution of metal organic precursors in an organic solvent that is miscible with water, or by dissolution of inorganic salts in water; in the second step the homogeneous solution is converted into a sol by treatment with a suitable reagent (generally water with or without any acid/base).

The first step in a sol-gel reaction is the formation of an inorganic polymer by hydrolysis and condensation reactions, i.e., the transformation of the sol-gel precursor into a highly crosslinked solid. Hydrolysis leads to a sol, a dispersion of colloidal particles in a liquid, and further condensation results in a gel, an interconnected, rigid and porous inorganic network enclosing a continuous liquid phase.

The major problem of sol-gel methods based on the hydrolysis and condensation of molecular precursors is the control over the reaction rates. For most transition metal oxide precursors, these reactions are too fast, resulting in loss of morphological and also structural control over the final oxide material. Furthermore, the different reactivities of metal alkoxides make it difficult to control the composition and the homogeneity of complex multi-metal oxides by the sol-gel process.

There are several advantages to sol-gel microencapsulation that play a major factor in industrial processes, such advantages include the capability of performing the encapsulation process at room temperature or lower, there are no changes in the chemical and physical properties of the encapsulated compounds, silica provides significant protection of the encapsulated compounds, microencapsulation allows for designing the release rate of the encapsulated compounds by controlling the physical properties of the shell, homogeneous distribution of the encapsulated compound throughout the microcapsules, silica is chemically and biologically inert, silica is fully biodegradable.

However, several disadvantages limit the use of the aqueous sol-gel encapsulation methods in several commercial areas. Such disadvantages include: the inability to encapsulate in this method moisture-sensitive and hydrolyzable active agents, due to the need to use water in the process hydrophilic materials cannot be encapsulated as neat, formulation options are limited, and there is also restricted stability at the long term storage of the formed microcapsules.

There is therefore a need for a more versatile encapsulation process that will enable the encapsulation of both hydrophilic and hydrophobic compounds in an inorganic shell.

GENERAL DESCRIPTION

In order to overcome the disadvantages of aqueous sol gel encapsulation processes, the inventors of the present application have utilized non-aqueous sol-gel chemistry.

In non-aqueous sol-gel chemistry the transformation of the precursor takes place in an organic solvent under exclusion of water. In comparison to aqueous sol-gel chemistry, the list of precursors includes, in addition to inorganic metal salts and metal alkoxides, also metal acetates and metal acetyl-acetonates. Organometallic compounds (compounds having a direct metal-carbon bond) are also frequently used, under which the process is based on thermal decomposition than sol-gel.

Preparing silica microcapsules by non-aqueous or non-hydrolytic sol-gel of the invention follows the steps of forming an oil-in-oil emulsion using polar and non-polar phases and then performing an interfacial polymerization using metal oxide precursors in order to form the metal oxide shell of the microcapsule.

Such a none aqueous process enables microencapsulation of highly hydrophilic materials as neat. It also enables microencapsulation of moisture-sensitive active compounds and also compounds having very limited solubility. The process of the present invention can encapsulate both hydrophilic and hydrophobic active agents in high loading into the capsule. Furthermore, since the process is none aqueous it allows for the formation of non-aqueous formulations which were not possible with the previous aqueous sol-gel process.

The present invention provides a process for the preparation of microcapsules encapsulating at least one active agent in a metal oxide shell comprising the steps of: (a) preparing a non-hydrous emulsion comprising at least one polar phase, at least one non-polar phase, said at least one active agent, at least one metal oxide precursor, at least one condensation precursor and at least one surface active agent; (b) subjecting said non-hydrous emulsion to at least one condition allowing the formation of a metal oxide shell encapsulating said at least one active agent; thereby forming said microcapsules.

The term "microcapsule" as used in the context of the present invention should be understood to relate to a microparticle composed of a solid shell made of a metal (or semi-metal) oxide, surrounding a core-forming space entrapped therein said at least one active agent.

In the present invention, the term "active agent" refers to any molecule or substance that can be used in medicine, cosmetics, agriculture, industry and which grants the final product comprising said microcapsule at least one desired property. In some embodiments said active agent is a pharmaceutical agent. In other embodiments, said active agent is a cosmetic agent. In further embodiments said active agent is a pesticide. In other embodiments said active agent is a herbicide In further embodiments said active agent is a fertilizing agent. In other embodiments said active agent is a catalyst. In further embodiments said active agent is a solvent. In some further embodiments, said active agent is a deep eutectic solvent (DES).

DESs exhibit low vapor pressures, high thermal and chemical stabilities, low toxicity, and high biodegradability. As a result, they lead the list of viable alternatives to conventional organic solvents in synthesis and are increasingly important in numerous fields such as nanotechnology, electrochemistry, extractions, and absorption of gases. In addition, many studies have demonstrated the efficiency of DESs as organocatalysts in various catalytic reactions. For instance, Brønsted acidic DESs based on carboxylic or sulfonic acids such as L-tartaric acid or p-toluenesulfonic acid are used in a wide spectrum of applications. Examples include biomass treatment, biodiesel production and the synthesis of pyrroles, pyrimidines, and imidazoles. DESs, however, usually comprise high viscosities that complicate their handling and limit their use in catalysis, especially in large scale industries.

In some embodiments said active agent is a solid. In other embodiments said active agent is a liquid.

In some embodiments, said at least one active agent is a hydrophobic agent. In other embodiments, said at least one active agent is a hydrophilic agent.

In some embodiments, said at least one active agent is dissolved in at least one of said polar phase and said non-polar phase. In some embodiments, said at least one active agent is dissolved in said polar phase. In other embodiments, said at least one active agent is dissolved in said non-polar phase.

In other embodiments, said at least one active agent is dispersed in at least one of said polar phase and said non-polar phase. In some embodiments, said at least one active agent is dispersed in said polar phase. In other embodiments, said at least one active agent is dispersed in said non-polar phase.

Non-Hydrous Emulsion

The term "non-hydrous emulsion" should be understood to encompass a system of at least two immiscible liquids, none of which is a hydrous liquid, thereby their immiscible character is defined by the difference in their polarity, i.e. the emulsion system is formed of at least one polar phase (liquid) and at least one non-polar phase (liquid). The polarity of each phase (liquid) is determined relatively to the other. Thus, the at least two phases differ in their polarity in a manner that does not allow them to be miscible in each other, therefore not able to form a single phase, but rather they both form an at least two phase system wherein one liquid is emulsified in the other. In said emulsion system, one phase is a continuous phase and the other phase is dispersed therein.

In some embodiments, said polar phase is the continues phase in the non-hydrous emulsion of a process of the invention. In other embodiments, said non-polar phase is the continues phase in the non-hydrous emulsion of a process of the invention. In some embodiments, said polar phase is the dispersed phase in the non-hydrous emulsion of a process of the invention. In some embodiments, said non-polar phase is the dispersed phase in the non-hydrous emulsion of a process of the invention.

The polarity of the phase (or liquid) is defined by the degree of electric charge separation in the molecule of said liquid. This charge separation leads to the formation of at least one dipole moment of the molecule of said liquid (phase). Thus, a non-hydrous emulsion used in the process of the invention, comprises at least one polar phase, i.e. a phase having a dipole moment higher than 0 Debyes, and at least one non-polar phase, i.e. a phase having a dipole moment of 0 Debyes.

In some embodiments, said at least one polar phase is selected from a hydrophobic polar phase or a hydrophilic polar phase. In some embodiments, said at least one polar phase is a hydrophobic polar phase. In other embodiments, said at least one polar phase is a hydrophilic polar phase.

In other embodiments, said at least one non-polar phase is selected from a hydrophobic non-polar phase or a hydrophilic non-polar phase. In some embodiments, said at least one non-polar phase is a hydrophobic non-polar phase. In other embodiments, said at least one non-polar phase is a hydrophilic non-polar phase.

In some embodiments, said at least one polar phase is selected from polyethylene glycol, glycerol, ethylene glycol, propylene glycol, dimethylsulfoxide, dimethylformamide, formamide, 1-butyl-3-methylimidazolium hexafluorophosphate, 1-butyl-3-methylimidazolium tetrafluoroborate, Aliquat 336, hexadecyltrimethylammonium chloride, and any combinations thereof.

In some further embodiments, said at least one non-polar hydrophobic phase is selected from paraffin oil, vegetable oils, silicone oils, heptane, xylene, toluene, cycolmethicone and any combinations thereof.

In some embodiments, said non hydrous emulsion is prepared by mixing said at least one polar phase and said at least one non-polar phase, wherein said at least one non-polar phase comprises at least one metal oxide precursor prior to said mixing.

In other embodiments, said non hydrous emulsion is prepared by mixing said at least one polar phase and said at least one non-polar phase, wherein said at least one polar phase comprises at least one condensation precursor prior to said mixing.

In further embodiments, said non hydrous emulsion is prepared by mixing said at least one polar phase and said at least one non-polar phase, wherein said at least one metal oxide precursor is added after said mixing.

In further embodiments, said non hydrous emulsion is prepared by mixing said at least one polar phase and said at least one non-polar phase, wherein said at least one condensation precursor is added after said mixing.

In yet other embodiments, said non hydrous emulsion is prepared by mixing said at least one polar phase and said at least one non-polar phase, wherein said at least one non-polar phase comprises at least one surfactant prior to said mixing.

In some other embodiments, said non hydrous emulsion is prepared by mixing said at least one polar phase and said at least one non-polar phase, wherein said at least one polar phase comprises at least one surfactant prior to said mixing.

In further embodiments, said non hydrous emulsion is prepared by mixing said at least one polar phase and said at least one non-polar phase, wherein said at least one non-polar phase comprises at least one active agent prior to said mixing.

In other embodiments, said non hydrous emulsion is prepared by mixing said at least one polar phase and said at least one non-polar phase, wherein said at least one polar phase comprises at least one active agent prior to said mixing.

At Least One Catalyst

In some embodiments, said non-hydrous emulsion further comprises at least one catalyst. In some embodiments, said at least one catalyst is an organic acid. In some other embodiments, said at least one catalyst is selected from formic acid, glycolic acid, tartaric acid, acetic acid, trichloroacetic acid, trifluoroacetic acid, oxalic acid and any combinations thereof.

At Least One Metal Oxide Precursor

The term "metal oxide precursor" is meant to include any compound that participates in a condensation reaction that produces a shell of metal (or semi-metal) oxide, such as for example a precursor of Silica, Titania, Zirconia, ZnO, and mixtures thereof.

In some embodiments, said at least one metal oxide precursor is selected from tetraethoxysilane, tetramethoxysilane, tetrakis(2-hydroxyethoxy)silane, titanium (IV) isopropoxide, aluminium isorpoxide, zirconium (IV) butoxide, aluminium acetylacetonate, titanium acetylacetonate, silicon tetrachloride, silicon tetraacetate, titanium tetrachloride, aluminium chloride, zirconium tetrachloride, titanium tetraacetate, zirconium tetraacetate and any combinations thereof.

At Least One Condensation Precursor

The term "condensation precursor" is meant to include any compound that participates in the condensation reaction that produces said shell of metal (or semi-metal) oxide (more particularly during the condensation reaction of the metal oxide precursor, an Metal-O-Metal bond is formed which eventually forms the metal oxide shell).

In some other embodiments, said at least one condensation precursor is selected from dimethylsulfoxide, tert-butanol, benzyl alcohol, acetone and any combinations thereof.

At Least One Surface Active

In some embodiments, said at least one surface active agent is an ionic surfactant or a non-ionic surfactant. In some other embodiments, said at least one surface active agent is a polymeric surfactant.

In some embodiments, said at least one surface active agent is selected from ethoxylated fatty alcohols, polysorbate 20, polysorbate 80, sorbitan monooleate, poly(1-ethenylpyrrolidin-2-one/hexadec-1-ene) (Agrimer AL22), Bis-PEG/PPG-14/14 dimethicone (ABIL EM-97), Cetyl PEG/PPG-10/1 dimethicone (ABIL EM 90) and any combinations thereof.

Process Conditions

When referring to "condition allowing the formation of a metal oxide shell" it should be understood to include any physical, chemical or process conditions that promote the reaction for the formation of said metal oxide shell entrapping said at least one active agent. Such conditions include, but are not limited to at least one of: homogenizing said emulsion, stirring said emulsion, aging the resulting precipitant, reaction temperature, selecting specific ratios between the polar and non-polar phases, selecting specific surfactant concentrations, selecting specific condensation precursor concentrations and any combinations thereof.

In some embodiments, said at least one condition allowing the formation of a metal oxide shell encapsulating at least one active agent comprises at least one of homogenizing, stirring, aging, reaction temperature, polar phase: non-polar phase concentration ratios, surfactant concentration, condensation precursor concentration and any combinations thereof.

In some embodiments, said at least one condition allowing the formation of a metal oxide shell encapsulating at least one active agent comprises homogenization of said none-aqueous emulsion prior or during the condensation reaction.

In other embodiments, said at least one condition allowing the formation of a metal oxide shell encapsulating at least one active agent comprises stirring of said none-aqueous emulsion prior or during the condensation reaction. In some embodiments, said stirring is performed for 1 to 24 hours.

In other embodiments, said at least one condition allowing the formation of a metal oxide shell encapsulating at least one active agent comprises aging the resulting precipitant. In some embodiments, said aging is performed for up to 24 hours at room temperature.

In other embodiments, said at least one condition allowing the formation of a metal oxide shell encapsulating at least one active agent comprises subjecting the emulsion to a temperature in the range of 20-100° C. prior or during the condensation reaction.

In other embodiments, said at least one condition allowing the formation of a metal oxide shell encapsulating at least one active agent comprises having a polar phase to non-polar phase ratio of between about 5/95 to 90/10.

In other embodiments, said at least one condition allowing the formation of a metal oxide shell encapsulating at least one active agent comprises adding said surfactant in a concentration of between about 0.05 to 15%.

In other embodiments, said at least one condition allowing the formation of a metal oxide shell encapsulating at least one active agent comprises adding said precursor in a concentration of between about 0.01 to 15%.

The invention further provides a composition comprising at least one microcapsule formed by the process of the invention as disclosed herein above and below.

In a further aspect the invention provides a microcapsule comprising at least one active agent encapsulated in a metal oxide shell, wherein said at least one active agent is a water or air sensitive compound.

The term "water (moisture) or air sensitive compound" should be understood to encompass a compound that in contact with water, moisture or air (humidity) reacts or changes its properties, such as for example hygroscopic compounds, compounds having high vapor pressure, room temperature volatile compounds, compounds that dissolve in water (polar compounds, ionic compounds, salts), hydrophilic compounds, hydrolyzable compounds, compounds that form hydrates and similar. It should be noted that it is almost not possible to encapsulate such water (moisture) or air sensitive compounds (at least in the neat) using typical oil-in-water encapsulating techniques or aqueous based encapsulation techniques.

None limiting example of compounds that fall within the scope of the definition include ketoconazole, zidovudine, ranitidine, benzocaine, azosemide, cangrelor, cilazapril, amlodipine, isradipine, tazarotene, diazepam, flurazepam, lovastatin, procarbazine, cyclophosphamide, nitrosurea, bisulfan, trimethoprim-sulphamethoxazole, rifampin, cymoxanil, pinoxaden, azimsulfuron, cinosulfuron.

In another aspect the invention provides a composition comprising a microcapsule comprising at least one active agent encapsulated in a metal oxide shell, wherein said composition is a non-aqueous composition.

The term "non-aqueous composition" should be understood to encompass a composition that is substantially free of water (having less then 1% water in the composition).

The inventors of the present application have found that it is possible to encapsulate agents in polyuria microcapsules using none-aqueous processes that enables microencapsulation of highly hydrophilic materials. It also enables microencapsulation of sensitive active compounds and compounds having very limited solubility. The process of the present invention can encapsulate both hydrophilic and hydrophobic active agents in high loading into the capsule. Furthermore, since the process is none aqueous it allows for the formation of non-aqueous formulations which were not possible with the previous process.

The invention further provides a process for the preparation of microcapsules encapsulating at least one active agent in a polyurea shell comprising the steps of: (a) preparing a non-hydrous emulsion comprising at least one polar phase, at least one non-polar phase, at least one active agent, at least one polyamine precursor, at least one isocyanate precursor, at least one surface active agent and at least one non soluble nanoparticle; (b) subjecting said non-hydrous emulsion to at least one condition allowing the formation of a polyurea shell encapsulating at least one active agent, thereby forming said microcapsules.

The term "microcapsule" as used in the context of the present invention should be understood to relate to a microparticle composed of a solid shell made of a polyurea and said non soluble nanoparticle (thus forming a hybrid shell), surrounding a core-forming space entrapped therein said at least one active agent.

Polyurea is a type of elastomeric polymer that is derived from the polymerization reaction of said at least one isocyanate precursor and said at least one polyamine precursor.

In the present invention, the term "active agent" refers to any molecule or substance that can be used in medicine, cosmetics, agriculture, industry and which grants the final product comprising said microcapsule at least one desired property.

In some embodiments said active agent is a pharmaceutical agent. In other embodiments, said active agent is a cosmetic agent. In further embodiments said active agent is a pesticide. In other embodiments said active agent is a herbicide In further embodiments said active agent is a fertilizing agent. In other embodiments said active agent is a catalyst. In further embodiments said active agent is a solvent. In some further embodiments, said active agent is a deep eutectic solvent (DES).

DESs exhibit low vapor pressures, high thermal and chemical stabilities, low toxicity, and high biodegradability. As a result, they lead the list of viable alternatives to conventional organic solvents in synthesis and are increasingly important in numerous fields such as nanotechnology, electrochemistry, extractions, and absorption of gases. In addition, many studies have demonstrated the efficiency of DESs as organocatalysts in various catalytic reactions. For instance, Brønsted acidic DESs based on carboxylic or sulfonic acids such as L-tartaric acid or p-toluenesulfonic acid are used in a wide spectrum of applications. Examples include biomass treatment, biodiesel production and the synthesis of pyrroles, pyrimidines, and imidazoles. DESs, however, usually comprise high viscosities that complicate their handling and limit their use in catalysis, especially in large scale industries.

In some embodiments said active agent is a solid. In other embodiments said active agent is a liquid.

In some embodiments, said at least one active agent is a hydrophobic agent. In other embodiments, said at least one active agent is a hydrophilic agent.

In some embodiments, said at least one active agent is dissolved in at least one of said polar phase and said non-polar phase. In some embodiments, said at least one active agent is dissolved in said polar phase. In other embodiments, said at least one active agent is dissolved in said non-polar phase.

In other embodiments, said at least one active agent is dispersed in at least one of said polar phase and said non-polar phase. In some embodiments, said at least one active agent is dispersed in said polar phase. In other embodiments, said at least one active agent is dispersed in said non-polar phase.

Non-Hydrous Emulsion

The term "non-hydrous emulsion" should be understood to encompass a system of at least two immiscible liquids, none of which is a hydrous liquid, thereby their immiscible character is defined by the difference in their polarity, i.e. the emulsion system is formed of at least one polar phase (liquid) and at least one non-polar phase (liquid). The polarity of each phase (liquid) is determined relatively to the other. Thus, the at least two phases differ in their polarity in a manner that does not allow them to be miscible in each other, therefore not able to form a single phase, but rather they both form an at least two phase system wherein one liquid is emulsified in the other. In said emulsion system, one phase is a continuous phase and the other phase is dispersed therein.

In some embodiments, said polar phase is the continues phase in the non-hydrous emulsion of a process of the invention. In other embodiments, said non-polar phase is the continues phase in the non-hydrous emulsion of a process of the invention. In some embodiments, said polar phase is the dispersed phase in the non-hydrous emulsion of a process of the invention. In some embodiments, said non-polar phase is the dispersed phase in the non-hydrous emulsion of a process of the invention.

The polarity of the phase (or liquid) is defined by the degree of electric charge separation in the molecule of said liquid. This charge separation leads to the formation of at least one dipole moment of the molecule of said liquid (phase). Thus, a non-hydrous emulsion used in the process of the invention, comprises at least one polar phase, i.e. a phase having a dipole moment higher than 0 Debyes, and at least one non-polar phase, i.e. a phase having a dipole moment of 0 Debyes.

In some embodiments, said at least one polar phase is selected from a hydrophobic polar phase or a hydrophilic polar phase. In some embodiments, said at least one polar phase is a hydrophobic polar phase. In other embodiments, said at least one polar phase is a hydrophilic polar phase.

In other embodiments, said at least one non-polar phase is selected from a hydrophobic non-polar phase or a hydrophilic non-polar phase. In some embodiments, said at least one non-polar phase is a hydrophobic non-polar phase. In other embodiments, said at least one non-polar phase is a hydrophilic non-polar phase.

In some embodiments, said at least one polar phase is selected from polyethylene glycol, glycerol, ethylene glycol, propylene glycol, dimethylsulfoxide, dimethylformamide, formamide, 1-butyl-3-methylimidazolium hexafluorophosphate, 1-butyl-3-methylimidazolium tetrafluoroborate, Aliquat 336, hexadecyltrimethylammonium chloride, and any combinations thereof.

In some further embodiments, said at least one non-polar hydrophobic phase is selected from paraffin oil, vegetable oils, silicone oils, heptane, xylene, toluene, cycolmethicone and any combinations thereof.

In further embodiments, said non hydrous emulsion is prepared by mixing said at least one polar phase and said at least one non-polar phase, wherein said at least one non-polar phase comprises at least one active agent prior to said mixing.

In other embodiments, said non hydrous emulsion is prepared by mixing said at least one polar phase and said at least one non-polar phase, wherein said at least one polar phase comprises at least one active agent prior to said mixing.

In some embodiments, said non hydrous emulsion is prepared by mixing said at least one polar phase and said at least one non-polar phase, wherein said at least one non-polar phase comprises at least one polyamine precursor prior to said mixing.

In other embodiments, said non hydrous emulsion is prepared by mixing said at least one polar phase and said at least one non-polar phase, wherein said at least one polar phase comprises at least one isocyanate precursor prior to said mixing.

In further embodiments, said non hydrous emulsion is prepared by mixing said at least one polar phase and said at least one non-polar phase, wherein said at least one polyamine precursor is added after said mixing.

In some embodiments, said non hydrous emulsion is prepared by mixing said at least one polar phase and said at least one non-polar phase, wherein said at least one isocyanate precursor is added after said mixing.

In some embodiments, said non hydrous emulsion is prepared by mixing said at least one polar phase and said at least one non-polar phase, wherein said at least one non-polar phase comprises at least one surfactant prior to said mixing.

In some other embodiments, said non hydrous emulsion is prepared by mixing said at least one polar phase and said at least one non-polar phase, wherein said at least one polar phase comprises at least one surfactant prior to said mixing.

In some embodiments, said non hydrous emulsion is prepared by mixing said at least one polar phase and said at least one non-polar phase, wherein said at least one non-polar phase comprises at least one active agent prior to said mixing.

In some embodiments, said none hydrous emulsion is prepared by mixing said at least one polar phase and said at least one non-polar phase, wherein said at least one polar phase comprises at least one active agent prior to said mixing.

In some embodiments, said non hydrous emulsion is prepared by mixing said at least one polar phase and said at least one non-polar phase, wherein said at least one non soluble nanoparticle is added after said mixing.

In some embodiments, said non hydrous emulsion is prepared by mixing said at least one polar phase and said at least one non-polar phase, wherein said at least one non-polar phase comprises at least one non soluble nanoparticle prior to said mixing.

In some embodiments, said non hydrous emulsion is prepared by mixing said at least one polar phase and said at least one non-polar phase, wherein said at least one polar phase comprises at least one non soluble nanoparticle prior to said mixing.

A process according to any one of the preceding claims wherein said at least one polar phase is at least one hydrophilic polar phase.

A process according to any one of the preceding claims wherein said at least one polar phase is at least one hydrophobic polar phase.

A process according to any one of the preceding claims wherein said at least one none-polar phase is at least one hydrophobic non-polar phase.

Non Soluble Nanoparticle

In some embodiments, said at least one non soluble nanoparticle is selected from silica, titanium oxide, aluminum oxide, zirconium oxide, laponite, latex nanoparticles.

Polyamine Precursor

In some other embodiments, said at least one polyamine precursor is a diamine precursor.

In some embodiments, said at least one polyamine precursor is selected from ethylene diamine, diethylenetriamine, 1,6-hexamethylenediamine, polyethyleneimine, 1,3-bis-(3-aminopropyl)-1H-imidazol-3-ium chloride, 1,6-diaminopyridine, p-phenylenediamine and any combinations thereof.

Isocyanate Precursor

In some embodiments, said at least one isocyanate precursor is selected from 2,4-toluene diisocyanate, 1,6-hexamethylene diisocyanate, polymethylene polyphenyl isocyanate, 4,4'-metyhlenebis(cyclohexyl isocyanate), 4,4'-metyhlenebis(phenyl isocyanate) and any combinations thereof.

At Least One Surface Active

In some embodiments, said at least one surface active agent is an ionic surfactant or a non-ionic surfactant. In some other embodiments, said at least one surface active agent is a polymeric surfactant.

In some embodiments, said at least one surface active agent is selected from ethoxylated fatty alcohols, polysorbate 20, polysorbate 80, sorbitan monooleate, poly(1-ethenylpyrrolidin-2-one/hexadec-1-ene) (Agrimer AL22), Bis-PEG/PPG-14/14 dimethicone (ABIL EM-97), Cetyl PEG/PPG-10/1 dimethicone (ABIL EM 90) and any combinations thereof.

When referring to "condition allowing the formation of a shell" it should be understood to include any physical, chemical or process conditions that promote the reaction for the formation of said polyurea or polyurea hybrid shell entrapping said at least one active agent. Such conditions include, but are not limited to at least one of: homogenizing said emulsion, stirring said emulsion, aging the resulting precipitant, reaction temperature, selecting specific ratios between the polar and non-polar phases, selecting specific surfactant concentrations, selecting the concentrations of and ratios between said at least one isocyanate and said at least one polyamine precursors and any combinations of such conditions.

In some embodiments, said at least one condition allowing the formation of a metal oxide shell encapsulating at least one active agent comprises at least one of homogenizing, stirring, aging, reaction temperature, polar phase: non-polar phase concentration ratios, surfactant concentration, precursor (at least one isocyanate precursor and at least one polyamine precursor) concentration and ratio and any combinations thereof.

In some embodiments, said at least one condition allowing the formation of a shell encapsulating at least one active agent comprises homogenization of said none-aqueous emulsion prior or during the condensation reaction.

In other embodiments, said at least one condition allowing the formation of a shell encapsulating at least one active agent comprises stirring of said none-aqueous emulsion prior or during the condensation reaction. In some embodiments, said stirring is performed for 1 to 24 hours.

In other embodiments, said at least one condition allowing the formation of a shell encapsulating at least one active agent comprises aging the resulting precipitant. In some embodiments, said aging is performed for up to 24 hours at room temperature.

In other embodiments, said at least one condition allowing the formation of a shell encapsulating at least one active agent comprises subjecting the emulsion to a temperature in the range of 20-100° C. prior or during the condensation reaction.

In other embodiments, said at least one condition allowing the formation of a shell encapsulating at least one active agent comprises having a polar phase to non-polar phase ratio of between about 5/95 to 90/10.

In other embodiments, said at least one condition allowing the formation of a shell encapsulating at least one active agent comprises adding said surfactant in a concentration of between about 0.05 to 15%.

In other embodiments, said at least one condition allowing the formation of a shell encapsulating at least one active agent comprises adding said at least one isocyanate precursor in a concentration of between about 0.01 to 15%.

In other embodiments, said at least one condition allowing the formation of a shell encapsulating at least one active agent comprises adding said at least one polyamine precursor in a concentration of between about 0.01 to 15%.

The invention further provides a composition comprising at least one microcapsule formed by the process of the invention as disclosed herein above and below.

In a further aspect the invention provides a microcapsule comprising at least one active agent encapsulated in a polyurea shell, wherein said at least one active agent is a water or air sensitive compound. In another aspect the invention provides a microcapsule comprising at least one active agent encapsulated in a hybrid polyurea shell, wherein said at least one active agent is a water or air sensitive compound.

The term "water (moisture) or air sensitive compound" should be understood to encompass a compound that in contact with water, moisture or air (humidity) reacts or changes its properties, such as for example hygroscopic compounds, compounds having high vapor pressure, room temperature volatile compounds, compounds that dissolve in water (polar compounds, ionic compounds, salts), hydrophilic compounds, hydrolyzable compounds, compounds that form hydrates and similar. It should be noted that it is almost not possible to encapsulate such water (moisture) or air sensitive compounds (at least in the neat) using typical oil-in-water encapsulating techniques or aqueous based encapsulation techniques.

None limiting example of compounds that fall within the scope of the definition include ketoconazole, zidovudine, ranitidine, benzocaine, azosemide, cangrelor, cilazapril, amlodipine, isradipine, tazarotene, diazepam, flurazepam, lovastatin, procarbazine, cyclophosphamide, nitrosurea, bisulfan, trimethoprim-sulphamethoxazole, rifampin, cymoxanil, pinoxaden, azimsulfuron, cinosulfuron.

In another aspect the invention provides a composition comprising a microcapsule comprising at least one active agent encapsulated in a polyurea shell, wherein said composition is a non-aqueous composition. In another aspect the invention provides a composition comprising a microcapsule comprising at least one active agent encapsulated in a hybrid polyurea shell, wherein said composition is a non-aqueous composition.

The term "non-aqueous composition" should be understood to encompass a composition that is substantially free of water (having less then 1% water in the composition).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 43. shows the recycling of Pd—CHCl:TA@SiO$_2$ microcapsules.

FIG. 44A-44B show the SEM images of Pd—CHCl:TA@SiO$_2$ microcapsules after the 10$^{th}$ run, following the hydrogenation of styrene.

FIG. 45 shows the recycling of CHCl:TA@SiO$_2$ microcapsules.

FIG. 46A-46B show the SEM images of CHCl:TA@SiO$_2$ microcapsules after the 5$^{th}$ run, following the condensation of 4-bromoaniline with acetonylacetone.

FIGS. 47A-47B. SEM images of the PEG@polyurea microcapsules

FIG. 48. STEM/EDX analysis of Pd/PEG@polyurea

DETAILED DESCRIPTION OF EMBODIMENTS

Figures 1A, 1B, 1C:
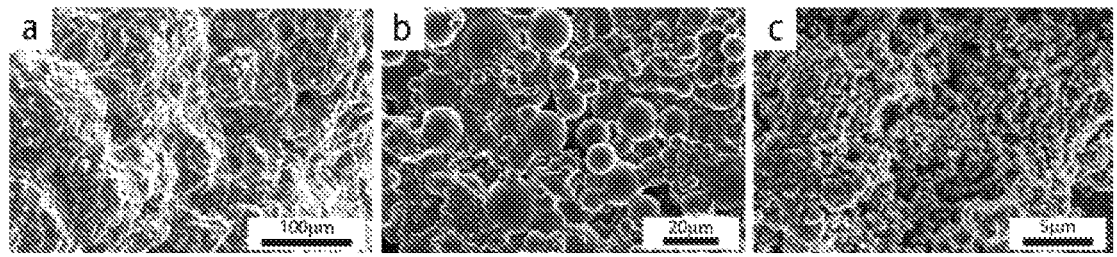
FIGS. 1A-1C. Shows the SEM images demonstrating the effect different surfactants have on the formation of BMim[BF$_4$] microcapsules: Span 80 (FIG. 1A), Agrimer AL22 (FIG. 1B) and AOT (FIG. 1C).

In recent years, deep eutectic solvents (DESs) have attracted significant interest due to their exceptional properties and wide applicability. DESs exhibit low vapor pressures, high thermal and chemical stabilities, low toxicity, and high biodegradability. As a result, they lead the list of viable alternatives to conventional organic solvents in synthesis and are increasingly important in numerous fields such as nanotechnology, electrochemistry, extractions, and absorption of gases. In addition, many studies have demonstrated the efficiency of DESs as organocatalysts in various catalytic reactions. For instance, Brønsted acidic DESs based on carboxylic or sulfonic acids such as L-tartaric acid or p-toluenesulfonic acid are used in a wide spectrum of applications. Examples include biomass treatment, biodiesel production and the synthesis of pyrroles, pyrimidines, and imidazoles. DESs, however, usually comprise high viscosities that complicate their handling and limit their use in catalysis, especially in large scale industries.

Scheme 1. Preparation of [RhCl(TPPMS) 3]/PEG@silica microreactors.

Scheme 3. The microencapsulation of a DES droplet within silica.

Scheme 4. Preparation of PEG@polyurea microcapsules.

Microencapsulation is a method for enclosing a compound, regardless of its chemical state, within an inert shell. This process enables the immobilization of various compounds such as drugs, enzymes, and catalysts within an inner core that is protected from the outside environment. Hence, protecting the compounds from undesired reactions and facilitating their separation and recycling. Lately, silica-based microcapsules have been developed as viable substitutes to polymeric ones. The silica shell can be prepared via the sol-gel method to produce porous, inert, biocompatible, highly pure, and versatile ceramic materials. In addition, silica microcapsules possess high mechanical and thermal stability. Thus, facilitating their use in various fields such as in cosmetics, healthcare, construction, and food industries. Currently, most of the silica-based microencapsulation routes rely on combining oil-in-water (O/W) or water-in-oil (W/O) systems with traditional aqueous sol-gel techniques. The emulsions are used as templates for the interfacial polycondensation of silane monomers, which leads to the fabrication of the shell.

Recently, oil in oil (O/O) emulsions have emerged as promising non-aqueous alternatives to O/W and W/O emulsions. These emulsions provide water-free routes for the preparation of microcapsules, thus allowing the use of water-sensitive compounds that may be incompatible with the more common aqueous techniques. Similarly, in 1994, Kenneth G. Sharp presented a non-aqueous route for preparing silica-gels using carboxylic acid derivatives that contain pKa values that are less than four.[31] This method proved highly efficient as an alternative fast sol-gel route, compared to the usual aqueous processes, and is currently used for the preparation of ionogels[32] and metal oxide nanoparticles.

In the present invention, the use of O/O emulsions was combined with non-aqueous sol-gel chemistry to microencapsulate different DESs. The outer and inner morphology, chemical composition, surface area, and thermal properties of the immobilized DESs were characterized using different techniques. In addition, some of the microencapsulated DESs were used as hosts for palladium nanoparticles (Pd NPs), and were then applied as catalytic microreactors in the hydrogenation of various unsaturated compounds. The microencapsulation process dramatically improved the handling of the DESs, enabling facile separation and multiple re-use of powder-like materials. Accordingly, Pd NPs entrapped within choline chloride: L-tartaric acid (1:0.5) microcapsules (CHCl:TA@$SiO_2$) catalyzed the hydrogenation of styrene 10 times without any decrease in conversion efficiency. In addition, scanning electron microscope (SEM) images showed that the microcapsules remained intact after the $10^{th}$ catalytic run, even though the reactions were conducted under magnetic stirring and moderate to high hydrogen gas pressures. The CHCl:TA@$SiO_2$ capsules also catalyzed the condensation of acetonylacetone with various aniline derivatives. The acidic catalyst provided high yields at room temperature and was successfully recycled several times.

Example 1: Preparation of Glycerol@$SiO_2$ Microcapsules by Oil in Oil Emulsification Process To a solution of 17.8 g toluene and 0.25 g Agrimer AL-22, 2 g of tetraorthosilicate (TEOS) (9.6 mmol) were added. The mixture was homogenized for 2 minutes at 8,000 rpm. Then, 1.5 g glycerol (16.3 mmol) and 3.55 g formic acid (77.1 mmol) were mixed and dropped into to the dispersing phase. The two phases were homogenized further for 3 minutes at 10,000 rpm. The sample was stirred for 24 hours at room temperature, then separated by centrifugation and washed three times with toluene (3*15 ml). The resulting particles were analyzed by scanning electron microscopy (SEM).

Example 2: The Microencapsulation of BMIM $PF_6$ Using Lactic Acid 3.23 g BMIM $PF_6$ and 5.77 g lactic acid were mixed together and added at once to a 100 ml beaker containing 0.1 g ABIL EM 90, 12.67 g cyclohexane/heptane, and 3.23 g TEOS. The mixture was homogenized at 10000 rpm for three minutes and then stirred at room temperature at 750 rpm for one hour. The microcapsules were separated by centrifugation at 3000 rpm and were washed three times with cyclohexane/heptane.

Example 3: The Microencapsulation of BMIM $PF_6$ Using Aluminium Acetylacetonate/Zirconium Acetylacetonate 1.8 g aluminium acetylacetonate/zirconium acetylacetonagte, 1.8 g BMIM $PF_6$, and 7.2 g formic acid were mixed together and added at once to a 100 ml beaker containing 1.25 g ABIL EM 90, and 12.95 g cyclohexane. The mixture was homogenized at 10000 rpm for two minutes then centrifuged at 3000 rpm for 10 minutes to separate the capsules. The capsules were washed six times with cyclohexane.

Example 4: The Effect of Some Process Parameters on BMIm[$BF_4$]@$SiO_2$ Microcapsules In this example the inventors have encapsulated 1-methyl-3-butyl imidazolium tetrafluoroborate (BMIm[$BF_4$]), a hydrophilic ionic liquid, as the entrapped material in similar to the procedure of Example 1.

The formation of these silica microcapsules is based on the emulsification of a polar-in-a polar phases. In this example procedure, three surfactants suitable for the formation of water-in-oil emulsions were used: a non-ionic surfactant (sorbitane monooleate (Span 80)), an ionic surfactant (sodium 1,4-bis(2-ethylhexoxy)-1,4-dioxobutane-2-sulfonate) and a polymeric surfactant (poly(1-ethenylpyrrolidin-2-one/hexadec-1-ene (Agrimer AL22)), and their effect on the formation of BMIm[$BF_4$]@$SiO_2$ microcapsules were examined.

SEM images demonstrate formation of spherical objects only in the presence of the polymeric surfactant, Agrimer AL22. Without being bound by theory, it is stipulated that the polymeric surfactant enables better stabilization of the ionic liquid droplet during the vigorous NHSG process, due to the slower diffusion of the polymeric surfactant form the interface. Although the formed capsules have a spherical morphology, they are conjugated and require optimization (FIG. 1b). Therefore, further optimization was performed using Agrimer AL22 as the surfactant. In the optimization process a number of parameters and their effect on the microcapsules formation was examined, such as, the $SiCl_4$ addition technique, the surfactant percentage, and the DMSO/BMIm[$BF_4$] ratio.

Figures 2A, 2B, 2C:
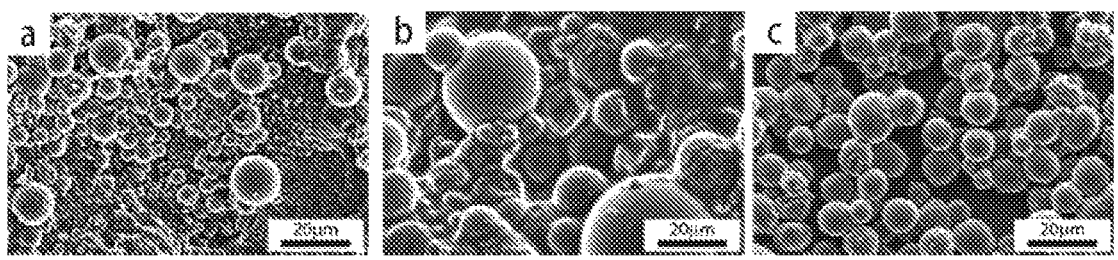
FIGS. 2A-2C. shows the microcapsules formed by using different SiCl$_4$ addition techniques: all at once (FIG. 2A), dripped slowly (FIG. 2B), diluted and added slowly (FIG. 2C).

First, the preparation of BMIm[$BF_4$]@$SiO_2$ microcapsules was observed by adding the $SiCl_4$ in three different manners: all at once, dripped slowly and diluted with heptane and dropped slowly. This parameter was suspected to have a major effect on the formation of the desired microcapsules, because of the vigorous nature of the NHSG process obtained in the presence of $SiCl_4$. As suspected, SEM images show that the way $SiCl_4$ is added has a major effect on the microcapsules formation. Separated microcapsules with a spherical morphology are formed only when $SiCl_4$ is diluted and slowly added (FIG. 2). The dilution and slowed addition reduces the $SiCl_4$ concentration and enables better control of the vigorous NHSG process. Thus, from this point on $SiCl_4$ was diluted in heptane and slowly added into the emulsion.

Figures 3A, 3B, 3C, 3D:
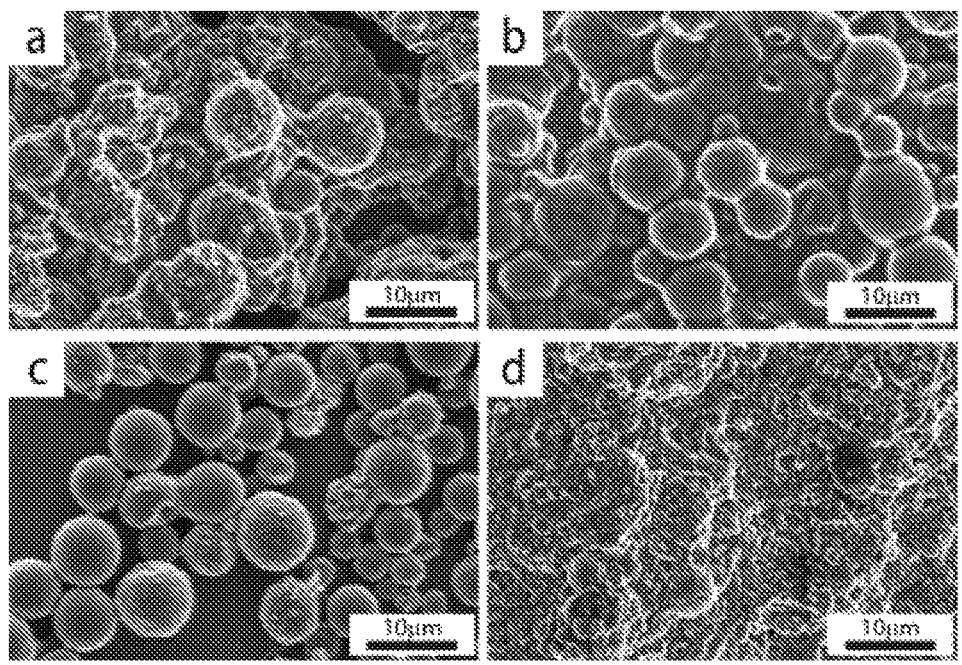
FIGS. 3A-3D. shows the effect of different Agrimer AL22 percentage has on the formation of BMIm[BF$_4$]@SiO$_2$ microcapsules: 2% (FIG. 3A), 4% (FIG. 3B), 5% (FIG. 3C) and 8% (FIG. 3D).

In attempts to further optimize the system different percentages of Agrimer AL22, 2%, 4%, 5% and 8%, were examined (FIG. 3). SEM images demonstrate that spherical and separated capsules are formed only in the presence of 5% Agrimer AL22, therefore 5% was chosen as the optimized percentage.

Figures 4A, 4B, 4C:
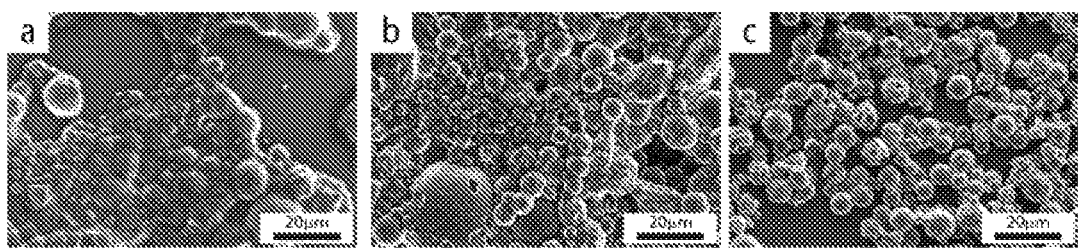
FIGS. 4A-4C. shows the effect of the DMSO/BMIm[BF$_4$] ratio has on the formation of BMIm[BF$_4$]@SiO$_2$ microcapsules: 30:70 (FIG. 4A), 40:60 (FIG. 4B) and 50:50 (FIG. 4C).

Three different DMSO/BMIm[$BF_4$] ratios were examined, 30:70, 40:60 and 50:50 (FIG. 4). SEM images demonstrate that optimized BMIm[$BF_4$]@$SiO_2$ microcapsules are obtained only in a 50:50 DMSO/BMIm[$BF_4$] ratio. These results indicate that an increase in the ionic liquid amount impairs the formation of the BMIm[$BF_4$]@$SiO_2$ microcapsules.

Figure 5:
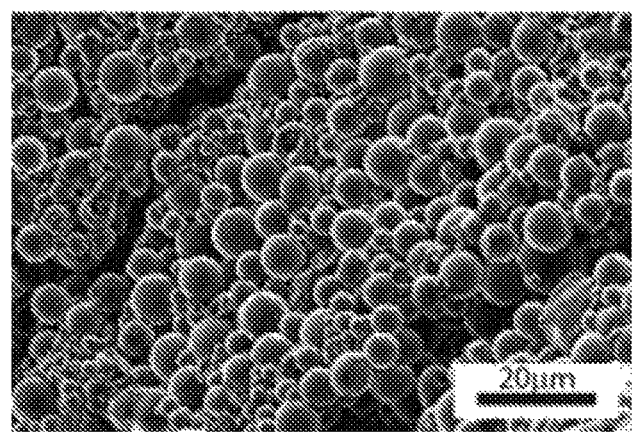
FIG. 5. shows the BMIm[BF$_4$]@SiO$_2$ microcapsules.
Figure 6:
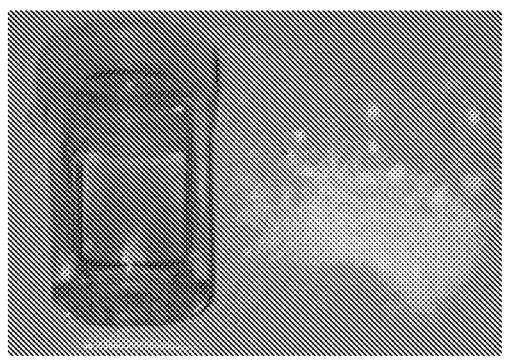
FIG. 6. shows the BMIm[BF$_4$] vs. BMIm[BF$_4$] @SiO$_2$ microcapsules.

The optimized capsules (FIG. 5) were achieved by emulsifying the ionic liquid phase, 50:50 DMSO BMIm[$BF_4$], ratio with the organic phase, 5% Agrimer AL22 in heptane, which were then emulsified at 9000 rpm. The emulsion was then stirred at room temperature under nitrogen. $SiCl_4$ was diluted in heptane and added slowly to the emulsion and stirred for additional 15 min. Then the capsules were separated by centrifugation and dried to form a powder (FIG. 6).

Figure 7:
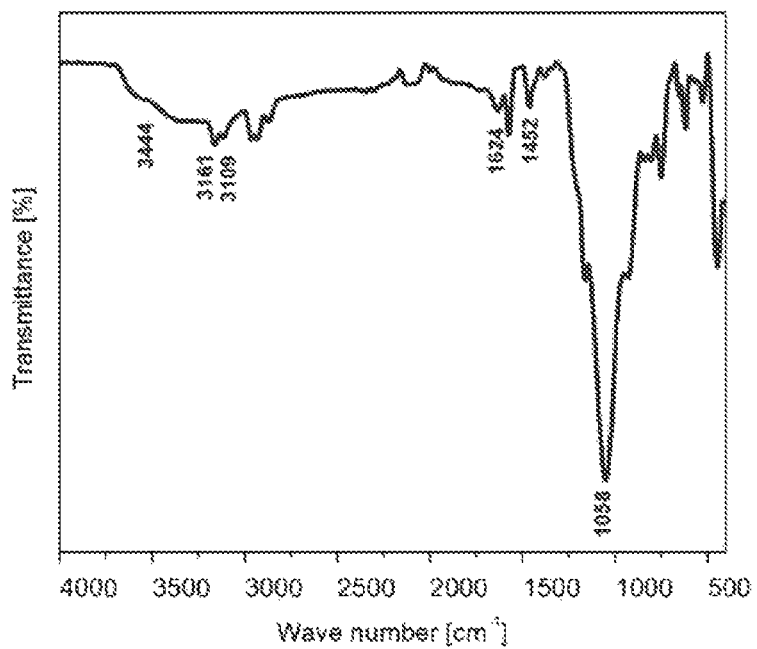
FIG. 7. shows the IR analysis of BMIm[BF$_4$]@SiO$_2$ microcapsules.

The BMIm[$BF_4$]@$SiO_2$ microcapsules were then characterized by SEM, infrared, NMR and TGA analyses. Primary indications for the formation of the BMIm[$BF_4$] were obtained by IR analysis in which BMIm[$BF_4$] and silica characteristic bands were obtained. The bands at 3161 $cm^{-1}$ and 3109 cm$^{-1}$ are ascribed to the C—H stretch vibration of the imidazolium group, demonstrating ionic liquid is present. The bands at 3444 cm$^{-1}$ and 1058 cm$^{-1}$ are attributed to the Si—OH and Si—O—Si stretching bands respectively, indicating a silica shell was formed (FIG. 7).

Figure 8:
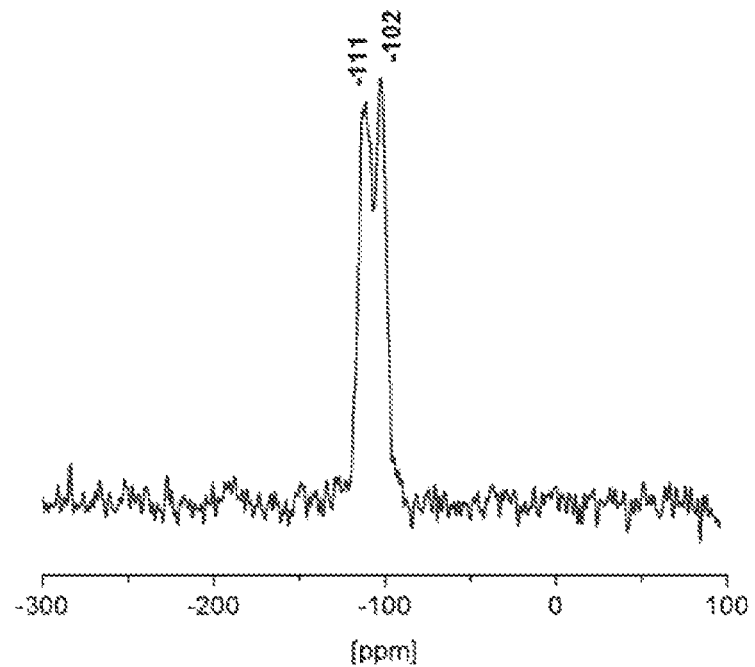
FIG. 8. Shows the $^{29}$Si CP MAS NMR spectra of BMIm [BF$_4$]@SiO$_2$ microcapsules.
Figures 9A, 9B, 9C:
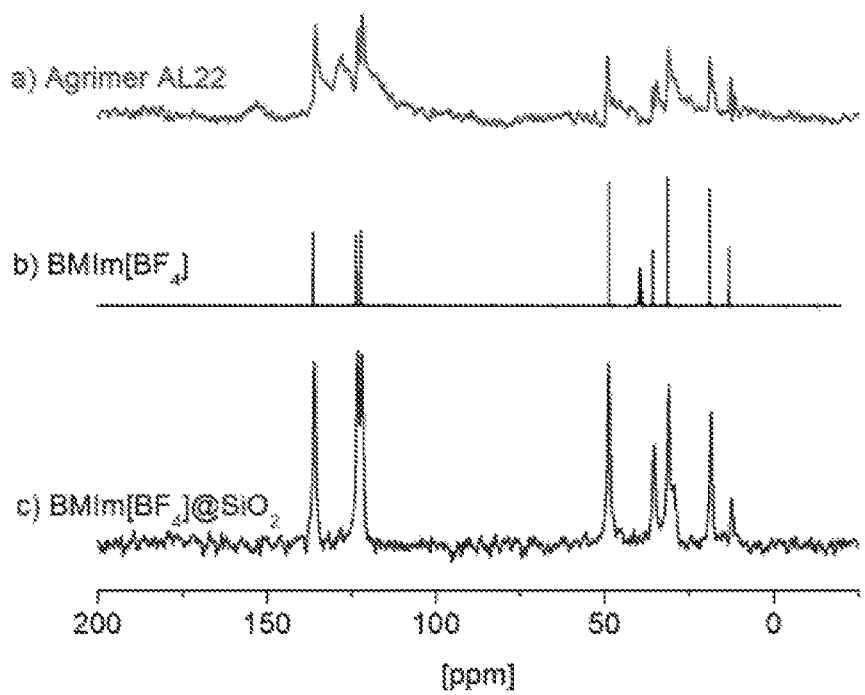
FIGS. 9A-9C. shows $^{13}$C NMR spectra of Agrimer AL22 (FIG. 9A), $^{13}$C NMR spectra of BMIm[BF$_4$] (FIG. 9B), and $^{13}$C CP MAS NMR spectra of BMIm[BF$_4$]@SiO$_2$ microcapsules (FIG. 9C).

Then, $^{29}$Si CP MAS NMR and $^{13}$C MAS NMR measurements of the BMIm[BF$_4$] were conducted. $^{29}$Si CP MAS NMR analysis obtained two peaks, the first at −102 ppm, ascribed to the Q$_3$ specie, SiO$_3$(OH). The second peak, at −111 ppm represents the Q$_4$ specie, SiO$_4$. These peaks demonstrate the formation of a silica shell (FIG. 8). In addition, when the $^{13}$C CP MAS NMR of the BMIm[BF$_4$] @SiO$_2$ microcapsules (FIG. 9c) was compared with the $^{13}$C NMR of BMIm[BF$_4$](FIG. 9b), all of the ionic liquid characteristic peaks were observed. These results indicate the ionic liquid, BMIm[BF$_4$] was encapsulated within a silica shell, and that the encapsulation did not change the ionic liquid chemical structure.

Figure 10:
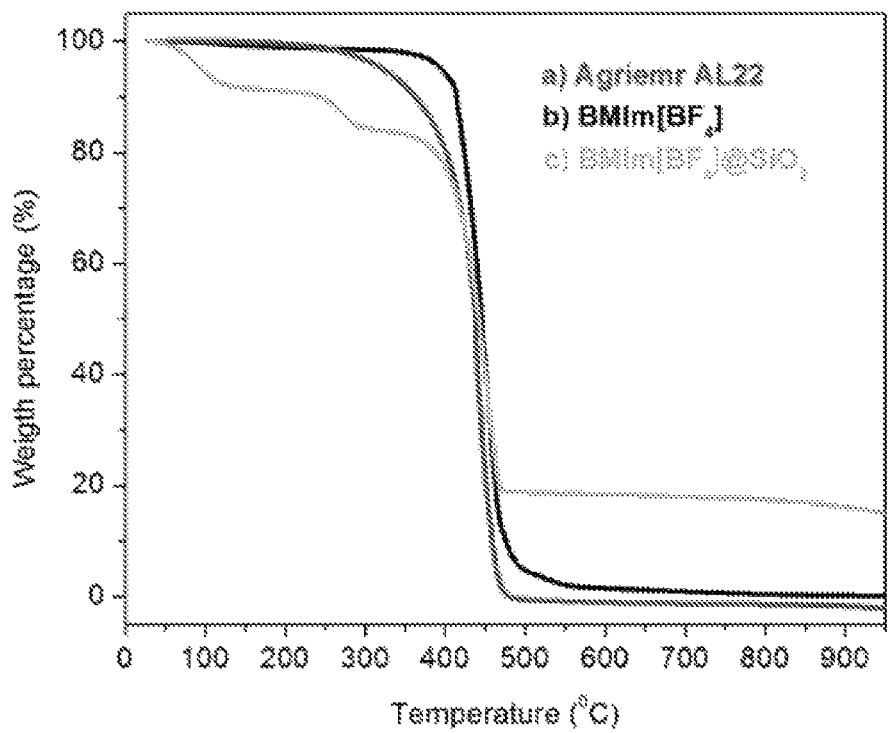
FIG. 10. shows the TGA analysis of: Agrimer AL22 (line a), BMIm[BF$_4$] (line b) and BMIm[BF$_4$]@SiO$_2$ microcapsules (line c).

The chemical decomposition of the BMIm[BF$_4$]@SiO$_2$ microcapsules was determined by TGA analysis (FIG. 10). First, a 10% mass loss centred at 102° C., represents the physically absorbed heptane is observed. Second, a 72% decomposition occurs between 250-474° C. representing the decomposition of BMIm[BF$_4$] and the traces of Agrimer AL22. A total of 82% mass loss is observed, indicating the capsules compose of 18% silica.

Example 5: The Microencapsulation of Eusolex 2292 Using TEOS 3.23 g Eusolex 2292 and 3.23 g TEOS were mixed together and added at once to a 100 ml beaker containing 1 g Tween 20, 11.77 g PEG 200, and 5.77 g formic acid. The mixture was homogenized at 10000 rpm for three minutes and then stirred at room temperature at 750 rpm for one hour. The microcapsules were separated by centrifugation at 6000 rpm and were washed three times with distilled water.

Example 6: Encapsulation of Neat Cymoxanil

Figures 11A, 11B:
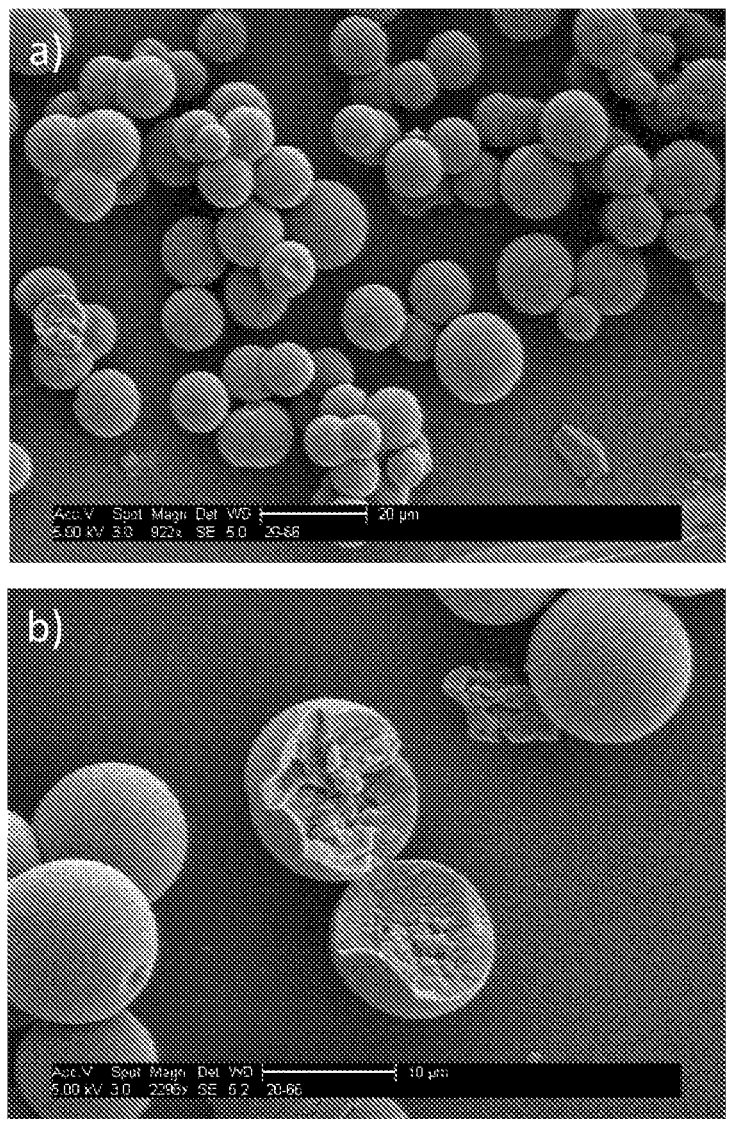
FIGS. 11A-11B. SEM images of the silica capsules prepared only from formic acid as dispersed phase.

The initial attempts for the non-aqueous encapsulation of cymoxanil were directed toward using neat cymoxanil without dissolving or dispersing it in any organic solvent or polyethylene glycol (PEG). This active showed excellent solubility in formic acid, which is used as reagent and catalyst in our non-aqueous sol-gel microencapsulation technology. First, we established a procedure for the formation of silica microcapsules using only formic acid as dispersed phased and heptane as dispersing phase in the presence of different surfactants and 10% w/w of tetraethoxysilane (TEOS). The ratio between the dispersed phase and the dispersing phase was 20/80 and the percentages of the surfactant applied in these experiments were 0.1-5% w/w. In most cases the capsules were completely formed after 3 hours. The best surfactant that could give spherical capsules was Agrimer AL 22 (FIG. 11). The SEM images of broken capsules showed that the core is porous and filled also with silica.

Figures 12A, 12B:
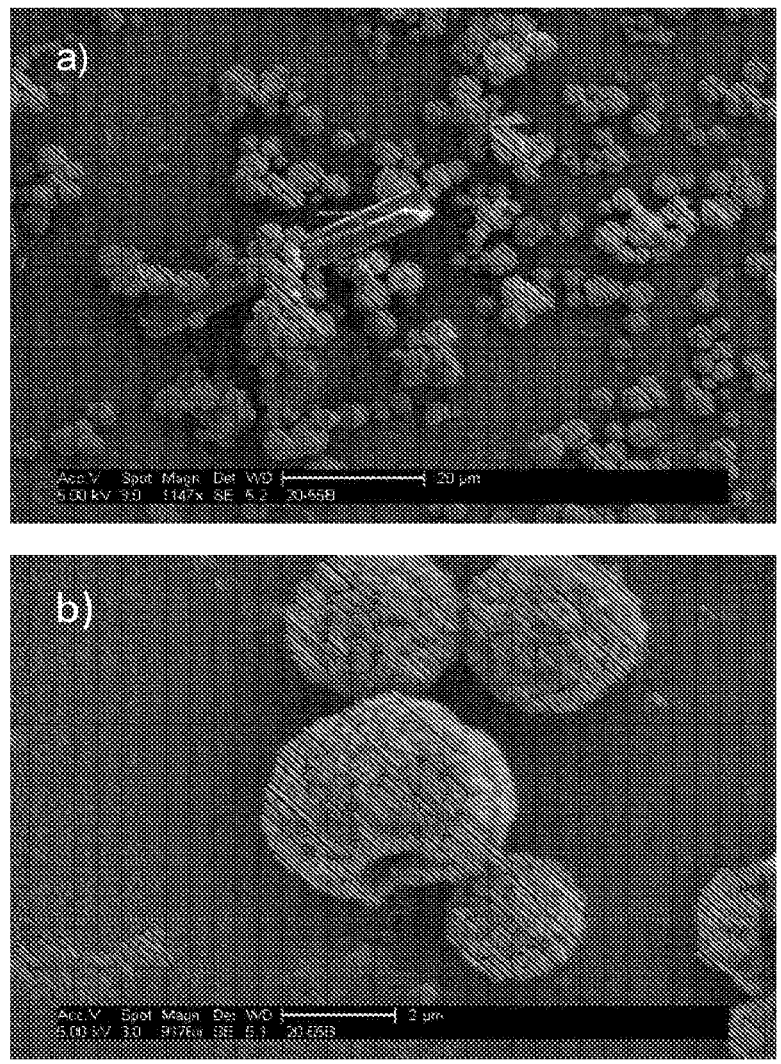
FIGS. 12A-12B. SEM images of the silica capsules containing 70% cymoxanil prepared from formic acid only as dispersed phase.
Figures 13A, 13B:
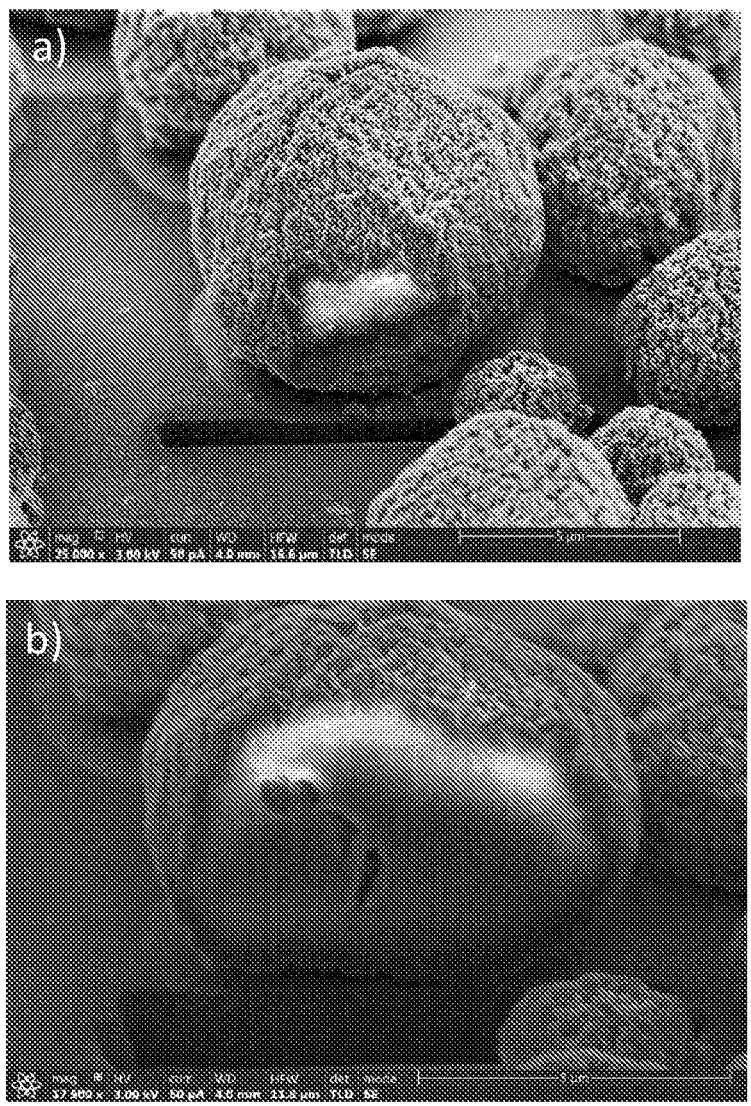
FIGS. 13A-13B. FIB-SEM images of the silica capsules containing 70% cymoxanil prepared from formic acid only as dispersed phase FIGS. 14A-14B. SEM images of the silica capsules containing 45% cymoxanil prepared only from formic acid as dispersed phase.
Figures 14A, 14B:
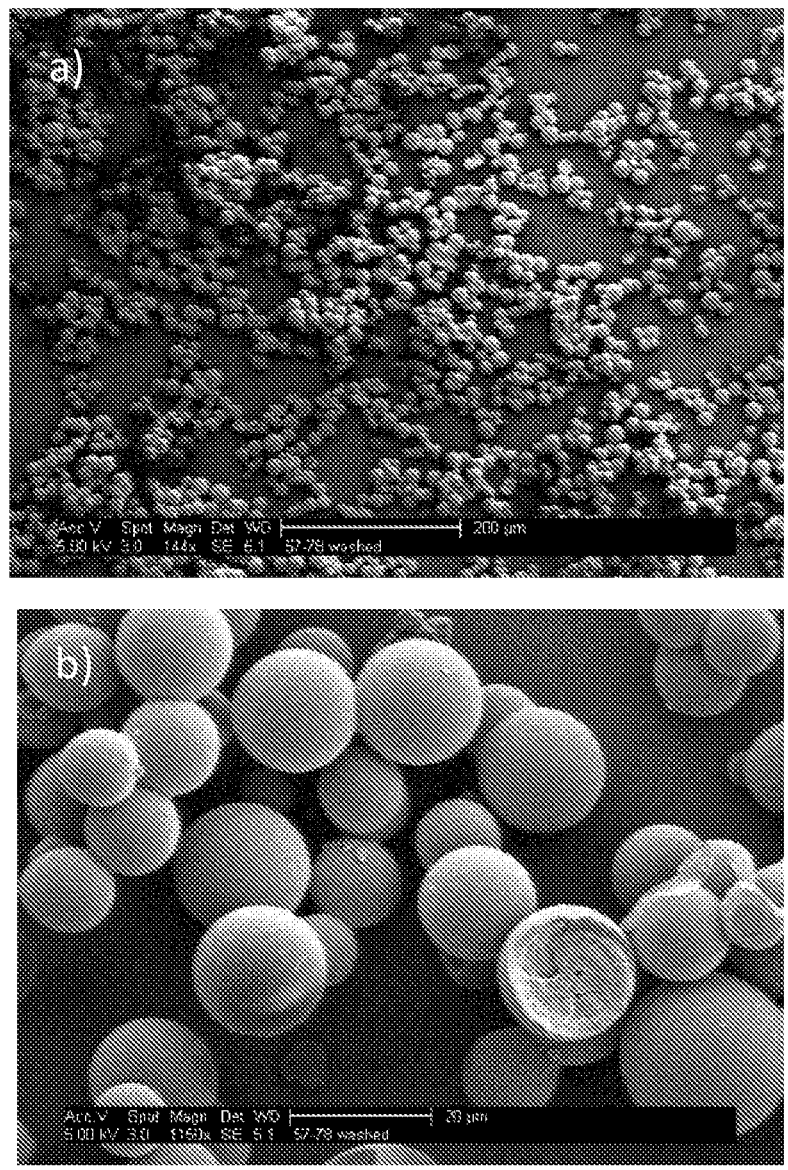

Then, we tried to encapsulate cymoxanil following this procedure by dissolving it in formic acid and emulsifying the resulted emulsion in heptane using 5% Agrimer AL 22 as surfactant and 10% TEOS. We tried to prepare capsules with loading of cymoxanil of 45-70%. The system with loading of 70% showed highly porous capsules with rough surface texture (FIG. 12). In order to check what contains the core of these capsules, we analyzed this system with focus ion beam scanning electron microscopes (FIB-SEM) which allows removing layers from the surface of the capsule followed by direct imaging of the core itself (FIG. 13). The core was smooth and contains silica in addition to cymoxanil. The capsules with 45% loading of cymoxanil were spherical and showed smooth surface texture (FIG. 14).

Figures 15A, 15B:
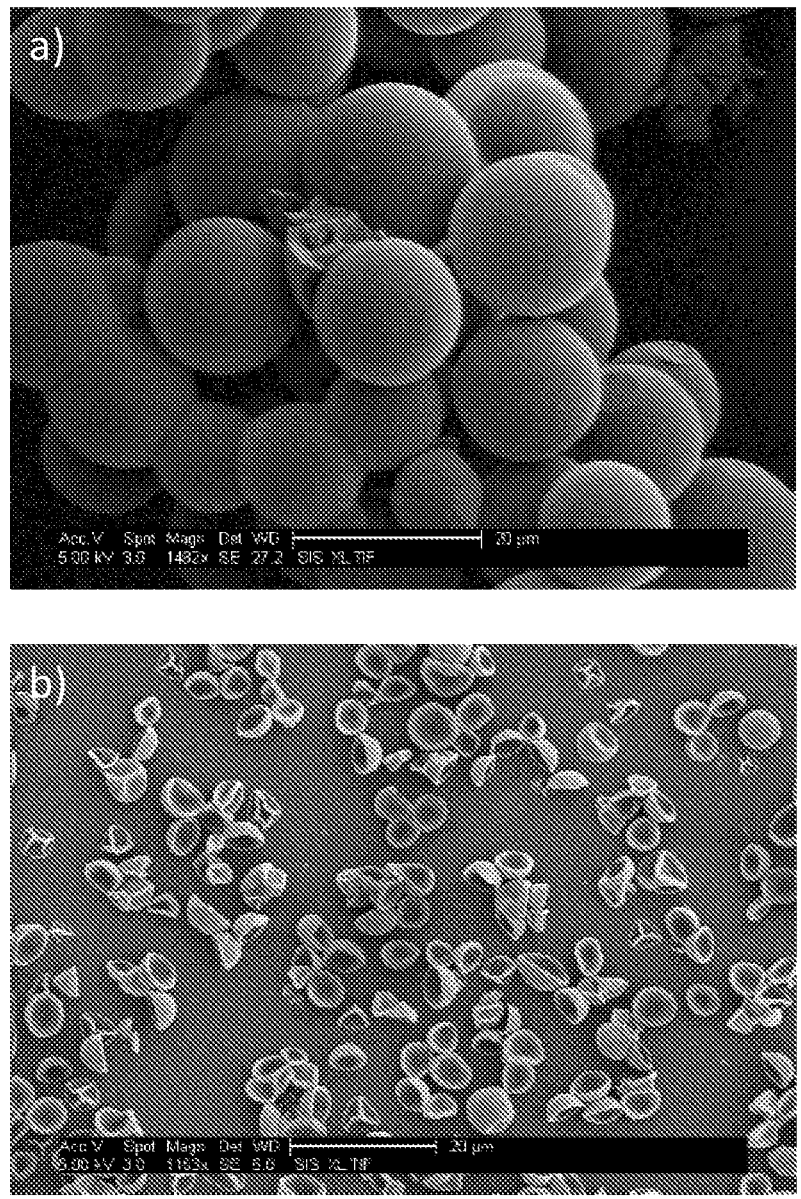
FIGS. 15A-15B. Microcapsules of cymoxanil prepared from 3:1 of TEOS: hydrophobic silane monomers. a) MeTEOS; b) Dec-TEOS.

Following the same procedure, we tried to prepare capsules starting from the hydrophobic silane monomers such as methyltriethoxysilane (Me-TEOS) and decyltriethoxysilane (Dec-TEOS). We tried to prepare capsules staring from mixtures of TEOS and hydrophobic silane monomers with ratios of 3:1 up to 1:3. The best results were obtained when the molar ratio between TEOS and the hydrophobic silane was 3:1 (FIG. 15).

Example 7: Encapsulation of Cymoxanil Dissolved in Polyethylene Glycol (PEG)

Figures 16A, 16B, 16C, 16D:
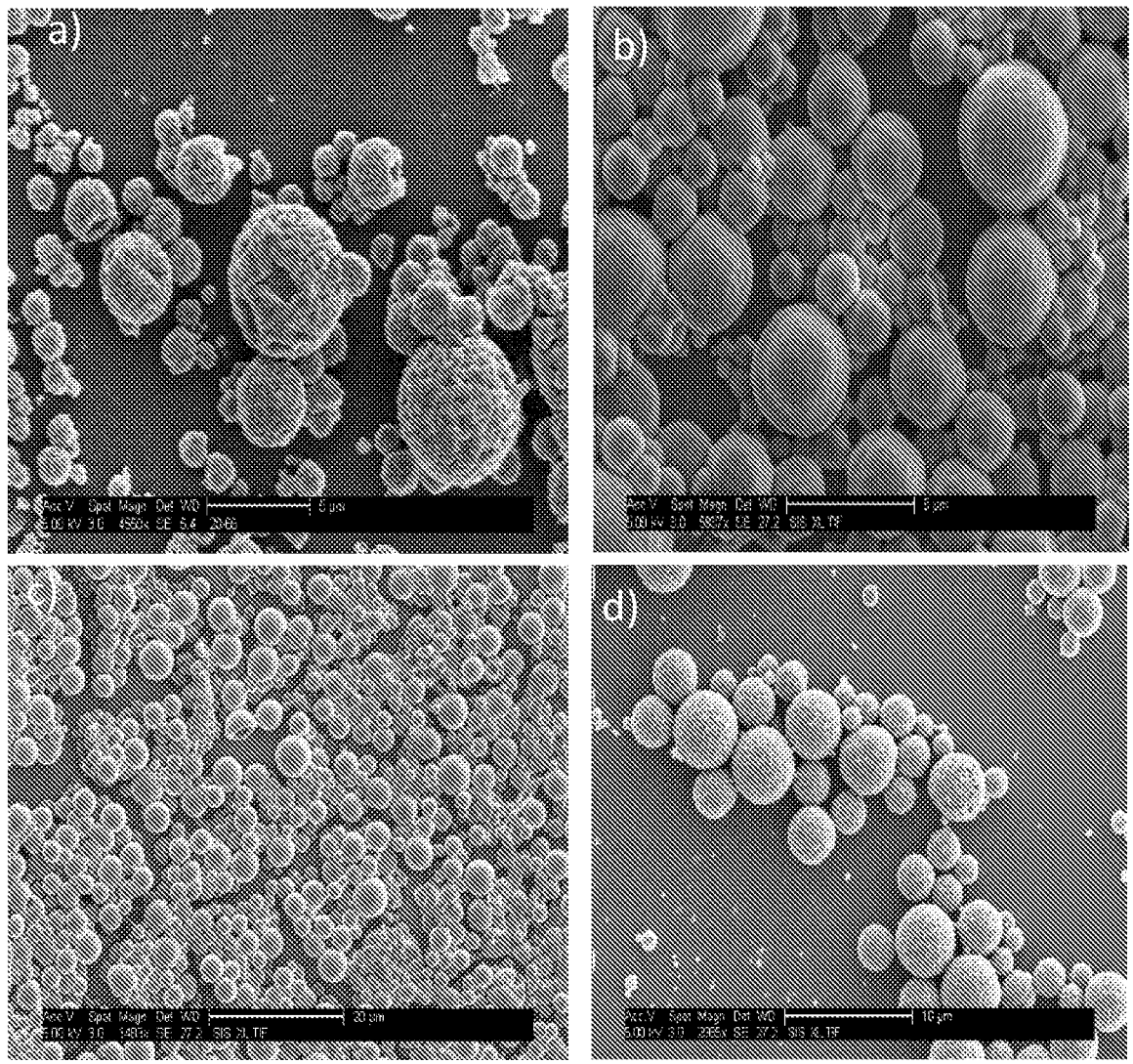
FIGS. 16A-16D. Silica microcapsules of cymoxanil with PEGs in the core. a) PEG 200; b) PEG 600; c) PEG 1000; d) PEG 6000.
Figure 17:
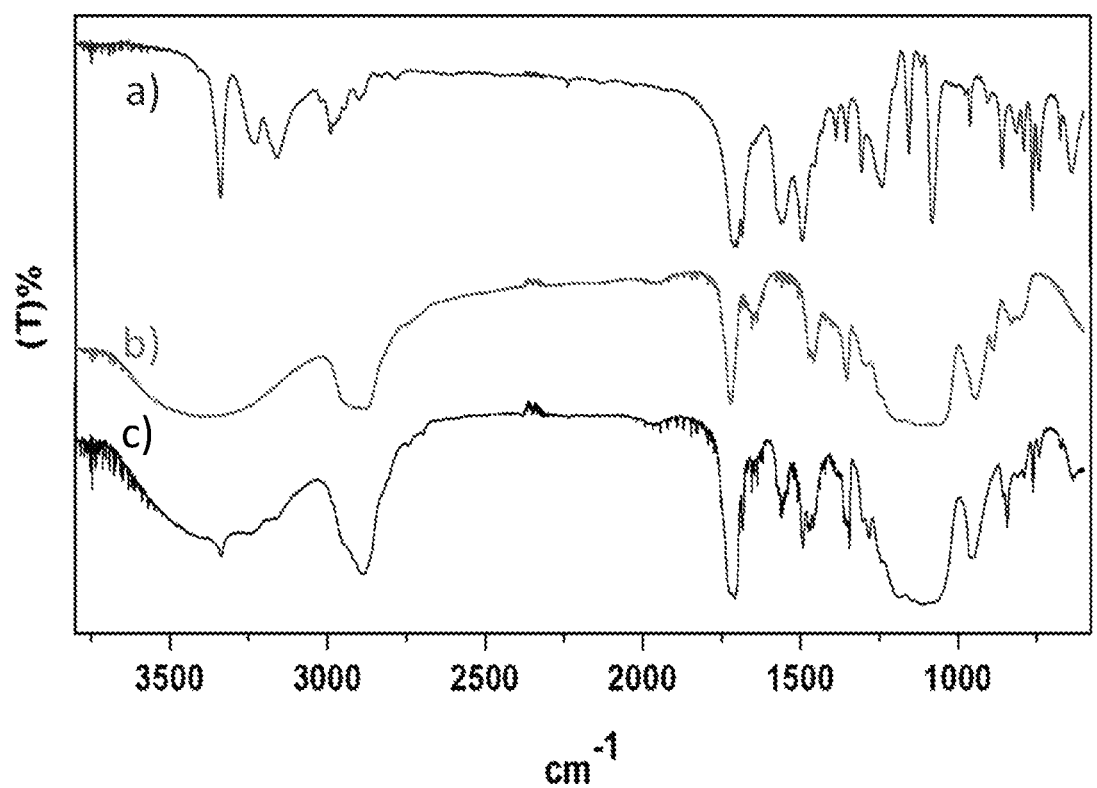
FIG. 17. FT-IR spectra of a) cymoxanil; b) silica capsules with PEG 200 and c) silica capsules with PEG 200 and cymoxanil.
Figures 18A, 18B:
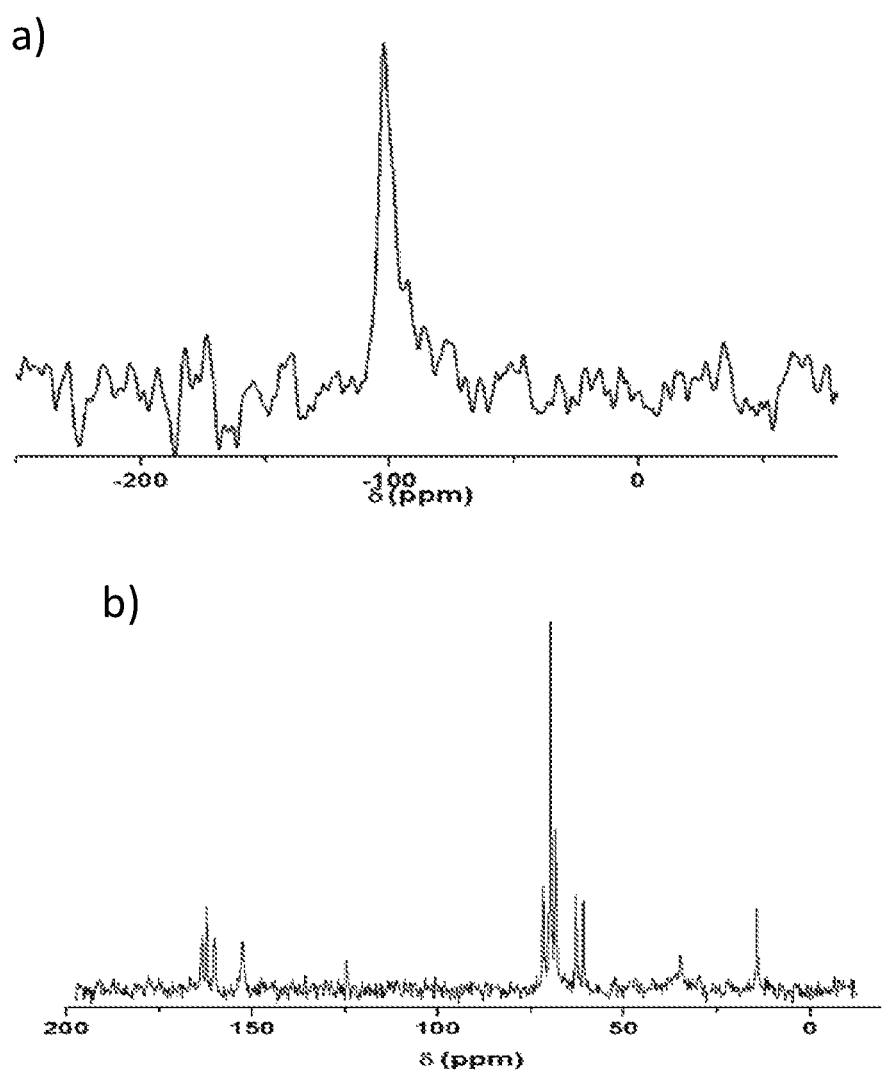
FIGS. 18A-18B. a)$^{29}$Si CP/MAS NMR of silica capsules with PEG 200 and cymoxanil b)$^{13}$C CP/MAS NMR of silica capsules with PEG 200 and cymoxanil.
Figure 19:
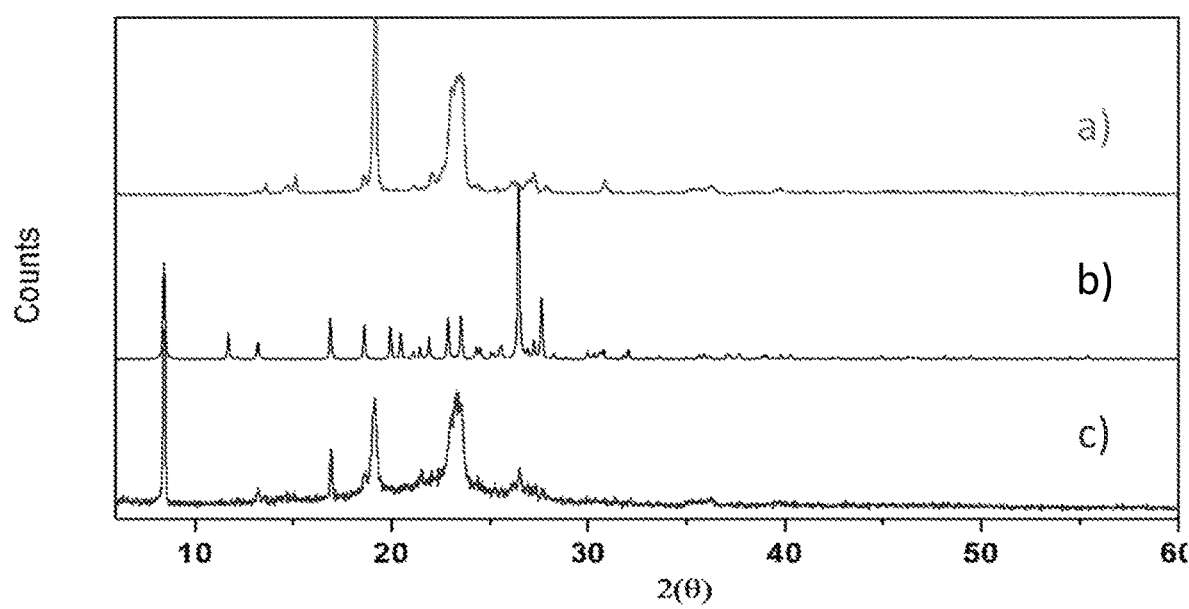
FIG. 19. XRD patterns of a) PEG 6000; b) cymoxanil; c) silica capsules with PEG 6000 and cymoxanil FIGS. 20A-20C. Silica capsules with PEG and cymoxanil prepared from TEOS and hydrophobic silane monomers. a) MeTEOS; b) Pr-TEOS; c) Dec-TEOS.

Cymoxanil dissolved in different PEGs such as PEG 200, 600, 1000 and 6000 was encapsulated using the non-aqueous sol-gel method. These encapsulation experiments were based on using Agrimer AL22 as surfactant and the ratio between the dispersing phase and the dispersed phase was 80:20. The loading of cymoxanil in these samples was 19-25%. SEM analysis indicated that spherical silica microcapsules were attained in most cases (FIG. 16). The samples were also analyzed by FT-IR, solid $^{13}$C and $^{29}$Si NMR and XRD to check whether the core contains dissolved or crystallized cymoxanil. FT-IR spectra showed the characteristic peaks of PEG at 3400 cm$^{-1}$ which belongs to the stretching vibration of OH groups and a broad peak centered at 1100 cm$^{-1}$ that is attributed to the stretching vibration of C—O groups (see FIG. 17 for capsules with PEG 200 as representative spectra). The presence of characteristic peaks of cymoxanil indicated that no change on its structure was occurred during the microencapsulation process. $^{29}$Si CP/MAS NMR showed the presence of Q3 silica species at −102.3 ppm, which confirms the polycondensation of TEOS and formation cross-linked silica (see FIG. 18 for capsules with PEG 200 as representative spectra). XRD pattern showed the presence of characteristic peaks of crystalline cymoxanil in addition to a broad peak between 2Θ=15 to 2Θ=30, which belongs to amorphous silica. The presence of peaks of cymoxanil crystals in the XRD pattern indicates that after formation the silica cymoxanil crystallized within the core and PEG act as stabilizer of these crystals. When PEG was with molecular weight of 1000 or 6000, additional characteristic peaks of these PEG appeared in the pattern (FIG. 19 for capsules with PEG 6000 as representative XRD pattern).

Figures 20A, 20B, 20C:
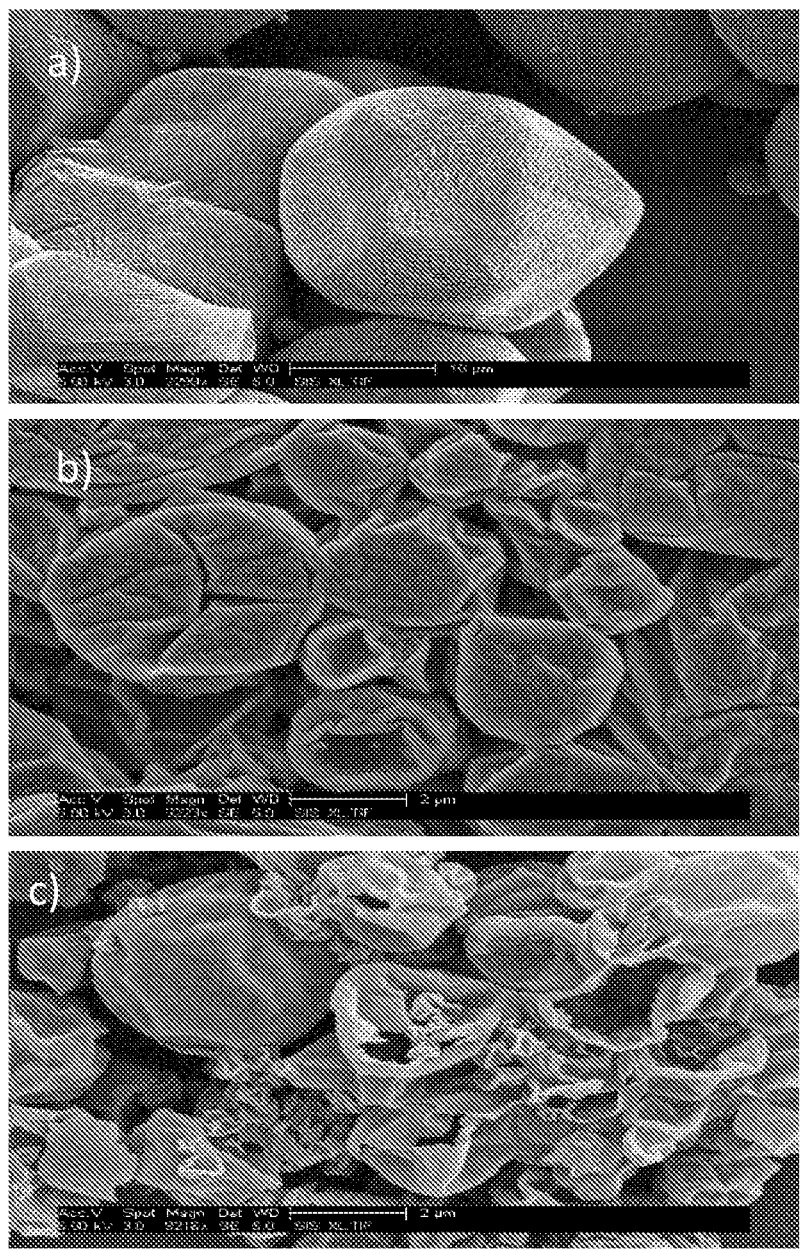
Figure 21:
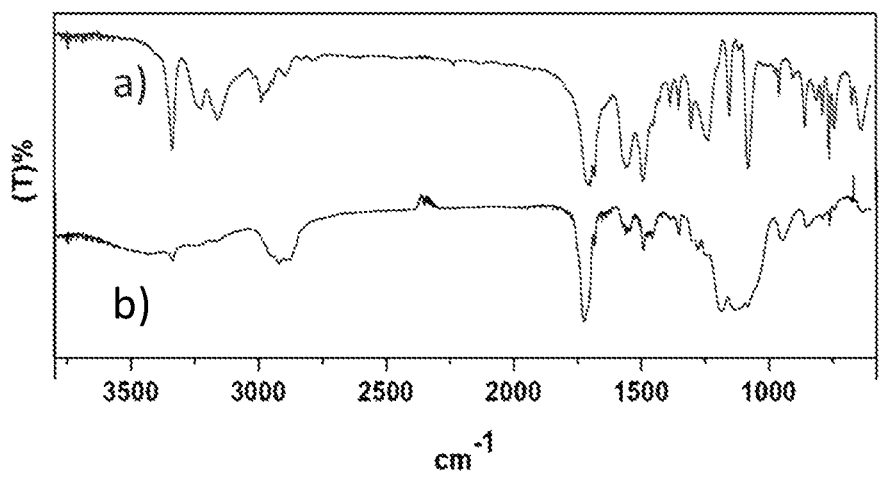
FIG. 21. FT-IR spectra of a) cymoxanil b) Silica capsules with PEG and cymoxanil prepared from TEOS and MeTEOS FIG. 22. $^{13}$C CP/MAS NMR spectrum of capsules containing PEG and cymoxanil prepared from TEOS and Pr-TEOS FIG. 23. $^{29}$Si CP/MAS NMR spectrum of capsules containing PEG and cymoxanil prepared from TEOS and Pr-TEOS FIGS. 24A-24C. Silica microcapsules of vitamin A dispersed in a) PEG200; b) PEG1000; c) PEG6000.
Figure 22:
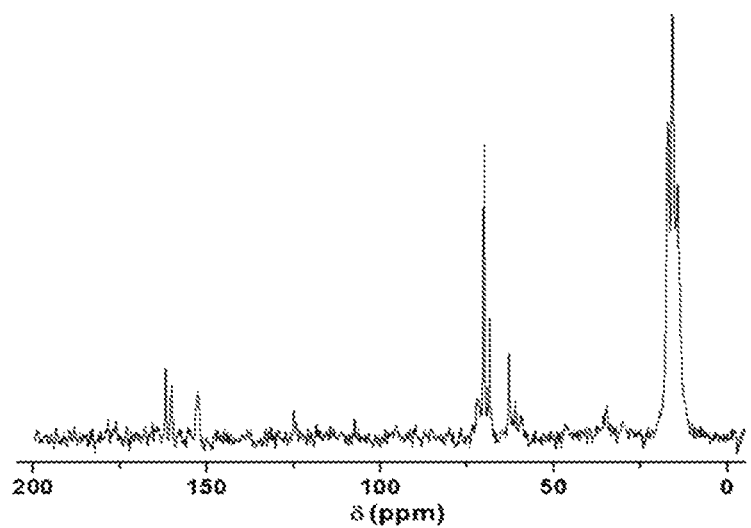
Figure 23:
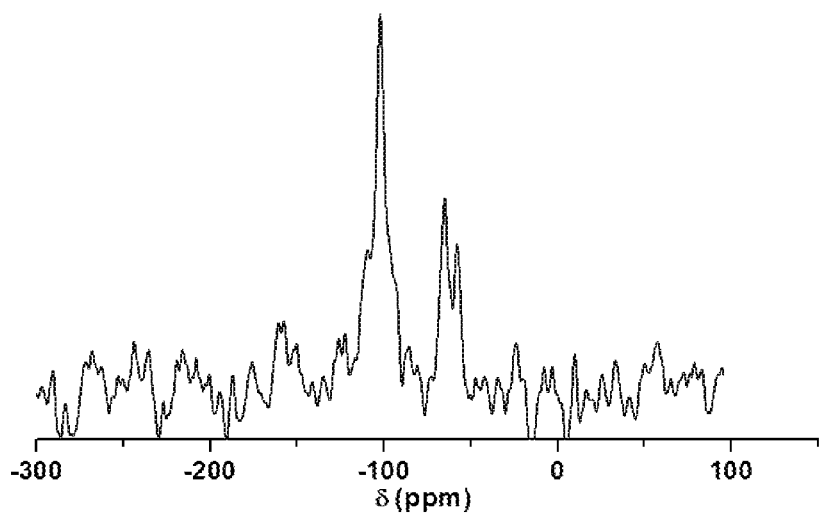

Then, we focused on the preparation silica microcapsules that contain PEG in their cores and hydrophobic groups in the silica shell. The preparation was based on the same procedure mentioned above using a mixture of TEOS with alkyltriethoxysilane monomers. The molar ratio between TEOS and the hydrophobic silane monomers was 3:1. Three hydrophobic monomers were studied, Me-TEOS, Pr-TEOS and Dec-TEOS. SEM images showed that once a silane monomer with long alkyl chain is applied, the capsules are raptured (FIG. 20). Only the monomer Me-TEOS led to the formation of capsules with very smooth surface (FIG. 20a). These capsules look closed very well. These capsules were also characterized by FT-IR, solid $^{13}$C and $^{29}$Si NMR. The IR spectra indicated the presence of PEG and cymoxanil within the capsules (FIG. 21 for capsules prepared from TEOS and Me-TEOS as representative spectra). $^{13}$C CP/MAS NMR spectra included the peaks of the cymoxanil, PEG 200 and the peaks of the alkyl groups (FIG. 22 for capsules prepared from TEOS and Pr-TEOS as representative spectra). $^{29}$Si CP/MAS NMR spectra showed the presence of Q3 silica species (–102 ppm) besides T3 (–67 ppm) and T2 (–57 ppm) species which indicate that the hydrophobic silane monomer was successfully co-condensed with TEOS and incorporated very well within the silica framework (FIG. 23 for capsules prepared from TEOS and Pr-TEOS as representative spectra).

Example 8: Microencapsulation of Vitamin A

Figures 24A, 24B, 24C:
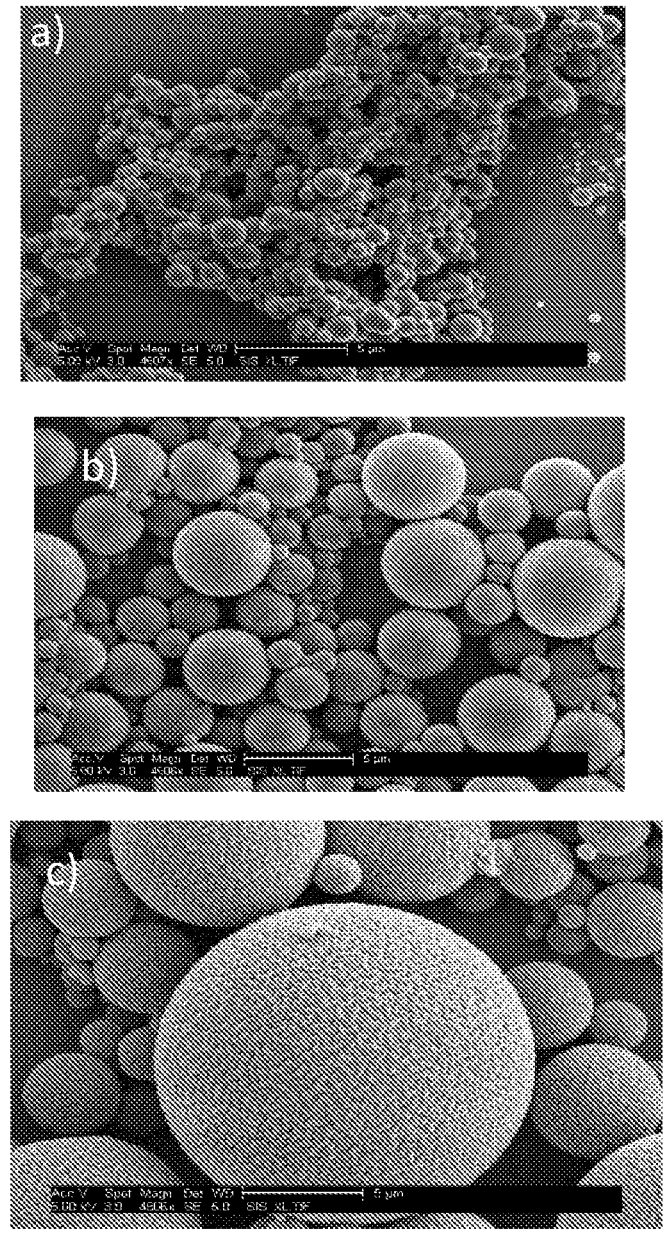
Figure 25:
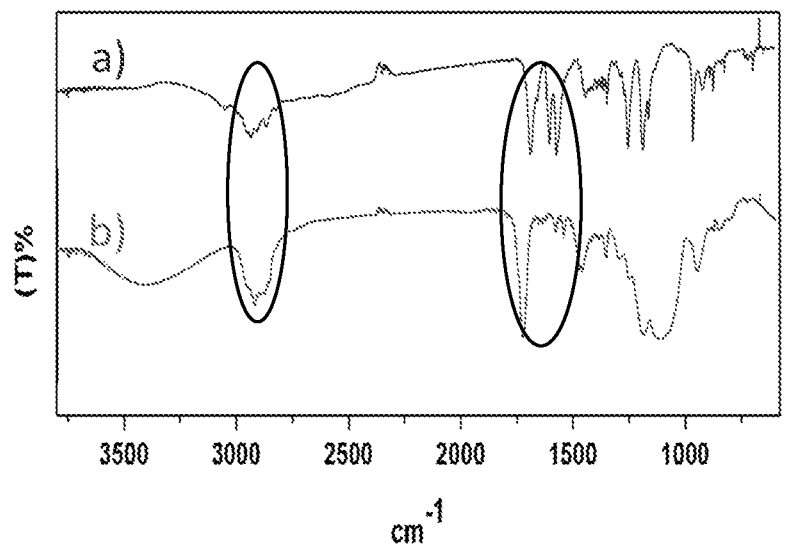
FIG. 25. FT-IR spectra of a) vitamin A; b) silica microcapsules containing vitamin A and PEG200.
Figure 26:
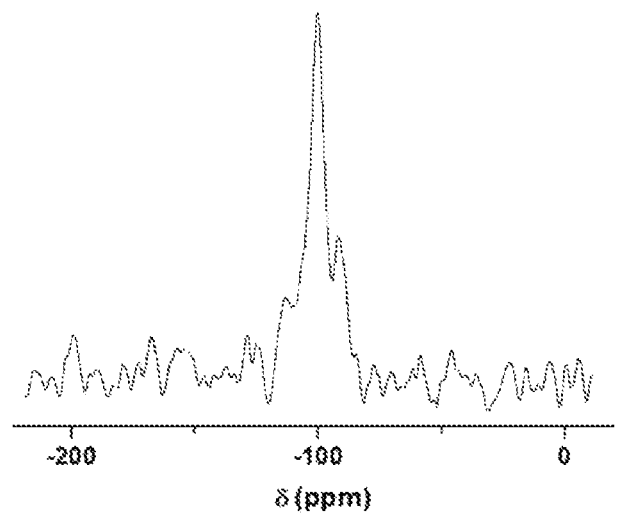
FIG. 26. $^{29}$Si CP/MAS NMR spectrum of capsules containing vitamin A and PEG200.
Figure 27:
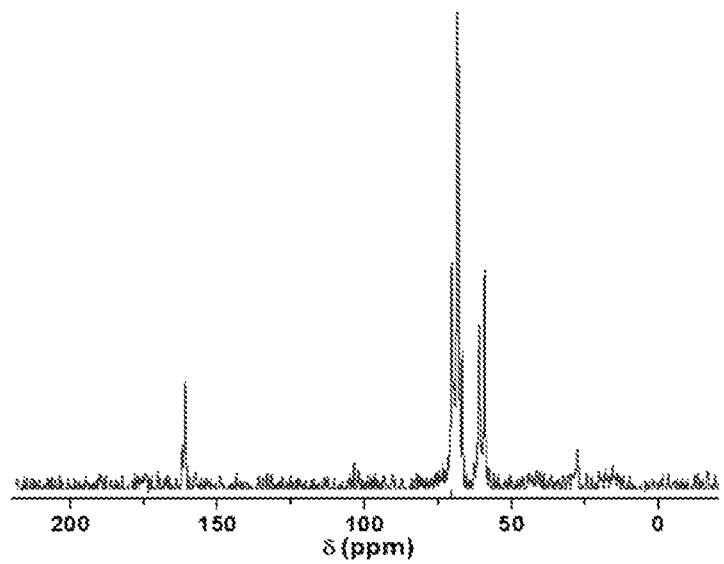
FIG. 27. $^{13}$C CP/MAS NMR spectrum of capsules containing vitamin A and PEG200.
Figure 28:
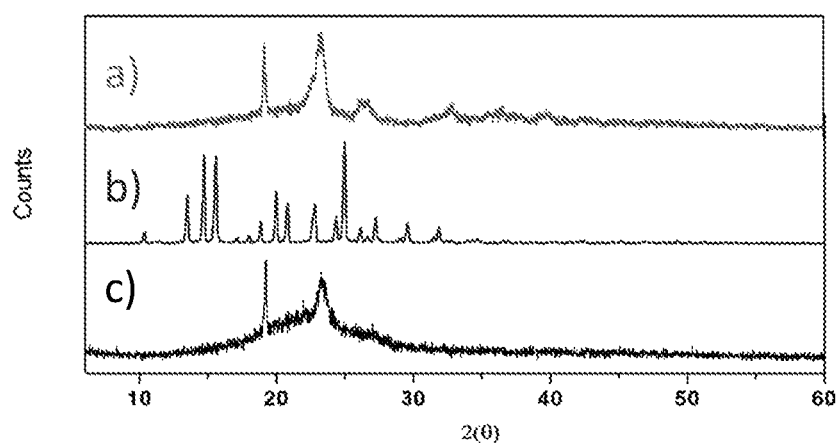
FIG. 28. XRD patterns of a) PEG1000; b) vitamin A; c) silica capsules containing vitamin A and PEG1000.
Figures 29A, 29B, 29C:
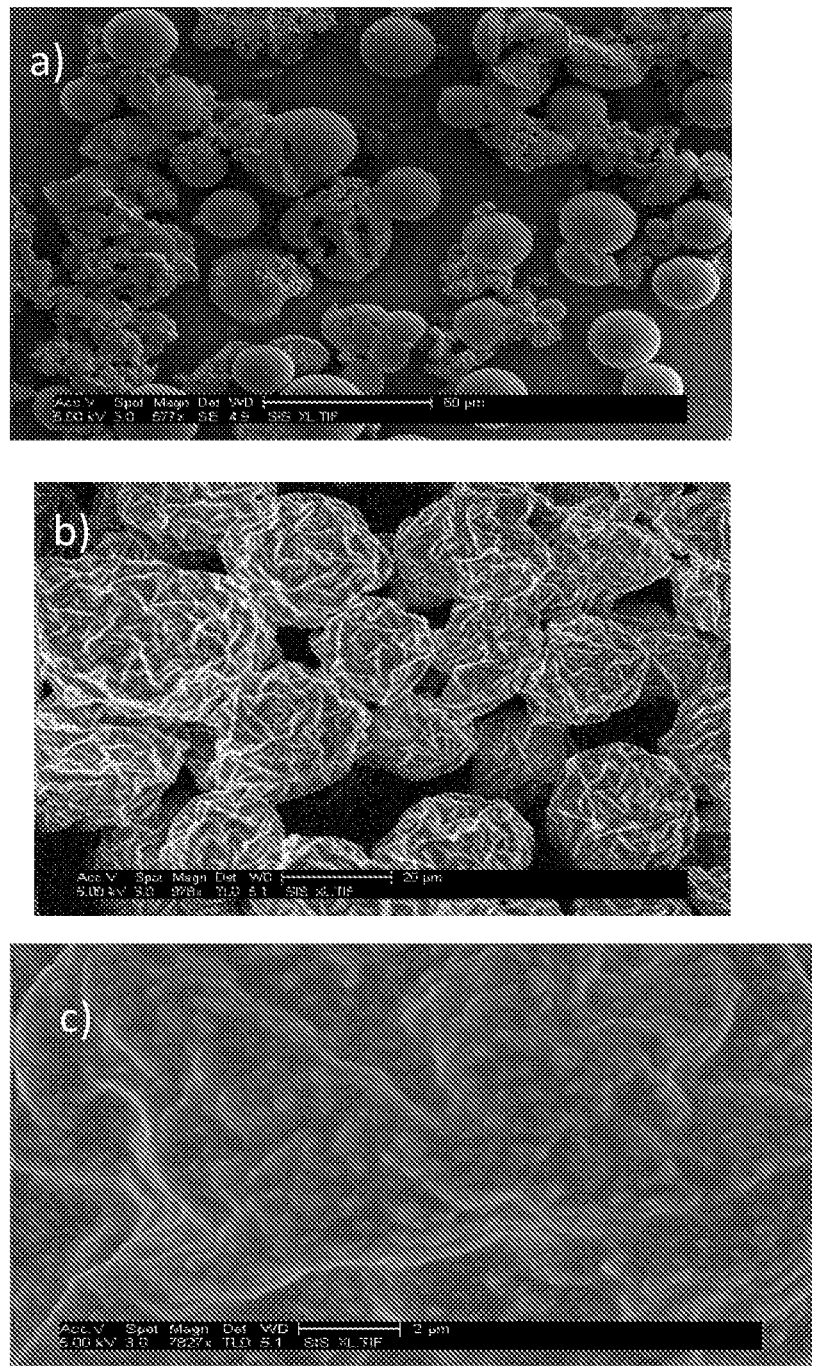
FIGS. 29A-29C. SEM images of silica capsules of vitamin A prepared from mixtures of TEOS and hydrophobic silane: a) Me-TEOS b) Oct-TEOS c) Oct-TEOs, closer imaging.
Figure 30:
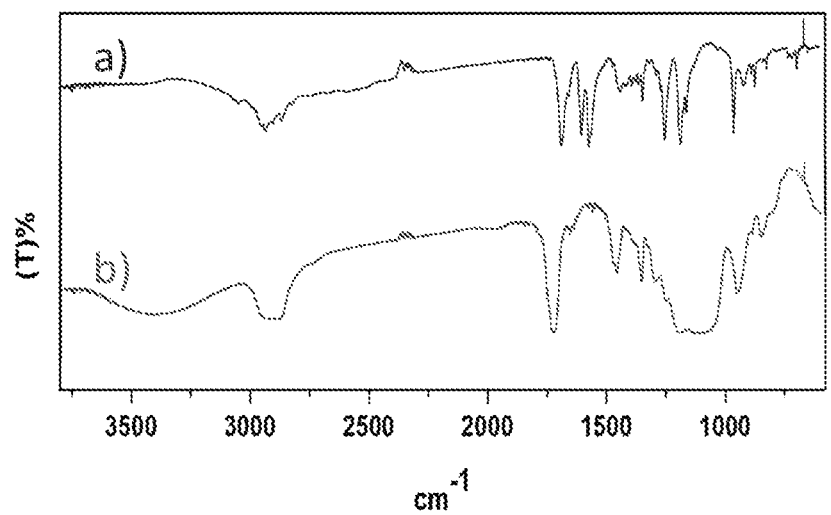
FIG. 30. FT-IR spectra of a) vitamin A b) capsules containing vitamin A and PEG prepared from TEOS and Oct-TEOS.
Figure 31:
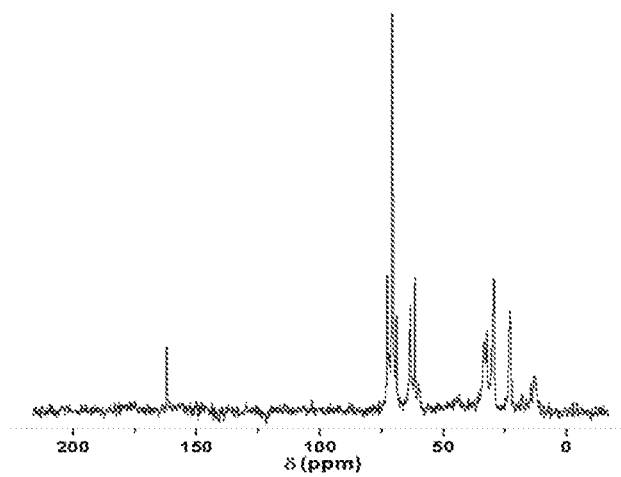
FIG. 31. $^{13}$C CP/MAS NMR of capsules containing vitamin A and PEG prepared from TEOS and Oct-TEOS.
Figure 32:
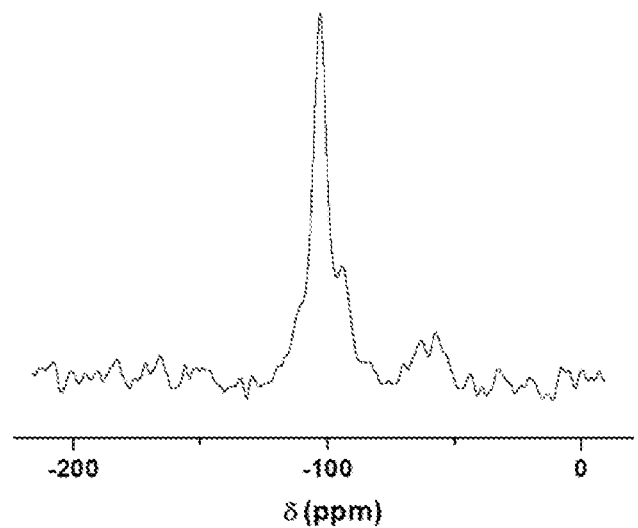
FIG. 32. $^{29}$Si CP/MAS NMR of capsules containing vitamin A and PEG prepared from TEOS and Oct-TEOS.

We tried to encapsulate vitamin A as hydrophobic organic nanoparticles dispersed in PEG. First, we check the stability of the dispersion of vitamin A in a mixture of PEG 200, PEG 1000 or PEG 6000 with formic acid. Sonication was applied to obtain nanoparticles of vitamin A. Different percentages of vitamin A in PEGs were tested. Dynamic light scattering (DLS) measurements indicated that only when the percentage of vitamin A is lower than 10%, the size of its crystals is smaller than 300 nm. When the percentage was higher than 10% a strong aggregation of the crystals was occurred. It seems that PEG stabilize the formation of nanocrystals of vitamin A in PEG by sonication. It is important to keep the size of the crystals in the nanometric size to keep the crystals within the core of the microcapsules. The next step was to emulsify these mixtures in cyclomethicone using 0.2% ABIL EM 90. SEM images showed that spherical capsules with smooth surface were obtained (FIG. 24). FT-IR analysis proved the presence of PEG and vitamin A within the silica microcapsules as their characteristic peaks appeared in the spectra (see FIG. 25 for capsules containing PEG 200 as representative spectra). $^{29}$Si CP/MAS NMR analysis indicated the presence of mainly Q3 silica species at –101.5 ppm (see FIG. 26 for capsules containing PEG 200 as representative spectra). $^{13}$C CP/MAS NMR analysis could not prove the presence of vitamin A since its loading is very low (0.04–0.06%) (FIG. 27). Even powder XRD could not give the characteristic peaks of vitamin A due to the low loading in the analyzed samples (FIG. 28). Following the same procedure, we tried to prepare microcapsules containing in their shells hydrophobic groups. Mixtures of TEOS with Me-TEOS or Oct-TEOS were used to construct the hydrophobic shells. SEM images showed the spherical capsules where obtained when Me-TEOS was use as the hydrophobic monomer (FIG. 29). On the other hand, Oct-TEOS provided capsules with very smooth surface and even it can be seen easily that the crystals of vitamin A exist in the core of these capsules (FIG. 29c). Similar to the previous cases, FT-IR (FIG. 30) and $^{13}$C CP/MAS NMR (FIG. 31) could not give the characteristic peaks of vitamin A due to its low loading. $^{13}$C CP/MAS NMR showed the presence of PEG and the alkyl groups in the silica shells. $^{29}$Si CP/MAS NMR showed the presence of Q3 silica species in addition to T3 and T2 species which indicate that the hydrophobic silane monomer was successfully incorporated within the silica shells (FIG. 32).

Example 9: Preparing Catalytic Microcapsules Via Non-Aqueous Sol-Gel Method

Preparing Rhodium Catalysts Encapsulated within PEG@Silica Microcapsules

Figure 53:
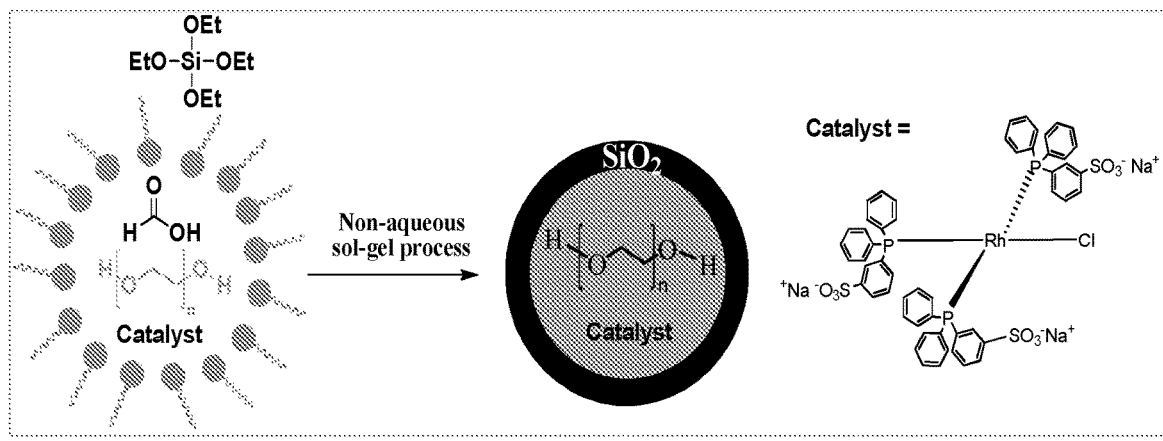
FIG. 53. shows a scheme of the preparation of [RhCl(TPPMS)3]/PEG@silica microreactors.

We succeeded to prepare catalytic microcapsules where the active species are enclosed in the inner environment. Rhodium based catalyst, prepared by reacting[Rh(COD)Cl]$_2$ with sodium triphenylphosphine monosulfonate (TPPMS) ligand, was utilized for this target. The catalyst was dissolved in polyethylene glycol (PEG) and no further immobilization, covalent or non-covalent, was needed. The entire process of the preparation of silica microreactors is summarized in FIG. 53.

Figure 33:
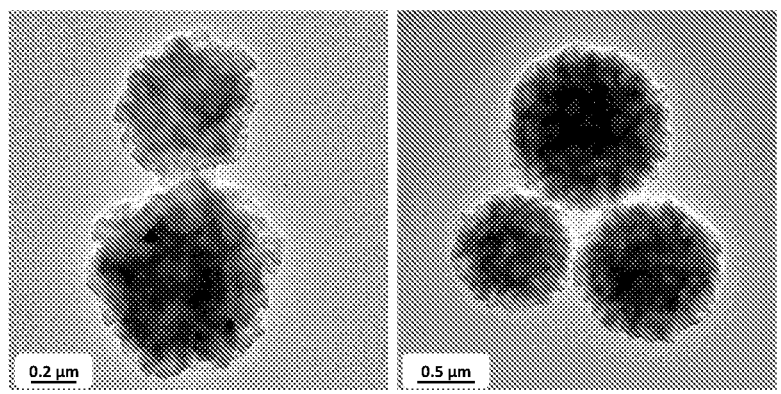
FIG. 33. TEM images of the [RhCl(TPPMS)3]/PEG@silica microreactors
Figure 34:
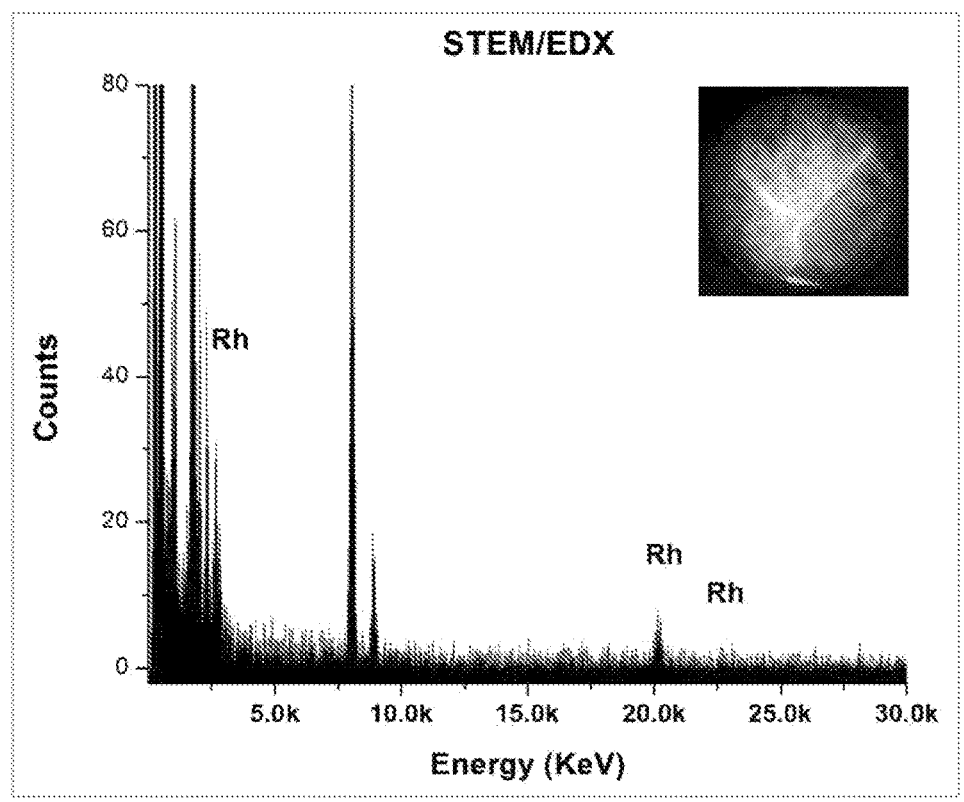
FIG. 34. STEM/EDX analysis of the [RhCl(TPPMS)3]/PEG@silica microcapsules

The formation of spherical microcapsules with core-shell architecture was confirmed by transmission electron microscopy (TEM) as shown in FIG. 33. These microreactors were also examined by scanning transmission electron microscopy (STEM) analysis in conjugation with energy-dispersive X-ray spectroscopy (EDX) that could certainly evidence the presence of the expected rhodium (FIG. 34).

The catalytic performance of the encapsulated catalyst was tested by applying a set of hydroformylation reactions of various alkenes. In this type of reactions, a linear or branched aldehyde is directly afforded from the corresponding alkene. We were able to tune and control efficiently the selectivity of the reaction by changing the dispersing phase. Styrene hydroformylation in different solvents was employed as a model reaction for this target. This tuning was accomplished since the diffusion of styrene exhibits a different profile in correlation to the involved solvent. From the depicted results in table 1, heptane was proved to be as an optimum solvent for selective reaction where styrene was exclusively converted to the branched aldehyde (Table 1, entry 1).

TABLE 1

Styrene hydroformylation in different solvents[a]

| Entry | Solvent | Conversion (%)[b] | Selectivity (B:L) ratio[b] |
|---|---|---|---|
| 1 | Heptane | 100 | 100:0 |
| 2 | Toluene | 100 | 33:1 |
| 3 | Xylene | 100 | 24:1 |
| 4 | Cyclohexane | 100 | 33:1 |

[a]Reaction conditions: 12 hrs, 40° C., 1 mol % catalyst, 1000 psi of 1:1 CO:H$_2$;
[b]Determined by $^1$H NMR.

Our catalyst showed high activity as it was expressed in the high obtained conversions and tremendous selectivity toward the branched aromatic aldehyde. It was noticed that aromatic alkenes revealed high conversions and selectivity with no significant effect of the electronic nature of the substituted aromatic group whether it is an electron donating or withdrawing group (Table 2, entries 1-7). Whereas aliphatic alkenes showed a contrast effect on the regioselectivity where the linear aldehyde was formed selectively (Table 2, entry 10). In addition, sterically hindered substrates did not contribute to the reaction proceed as it was exhibited in the case of 9-vinylanthracene (Table 2, entry 8). Moreover, 4-vinylpyridine was a bad substrate selection for this type of reaction, which its progress was prohibited (Table 2, entry 9). This is probably attributed to catalyst poisoning.

TABLE 2
Hydroformylation reactions with [RhCl(TPPMSL$_3$/PEG@silica[a]
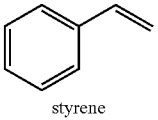
| Entry | Substrate | Conversion %[b] | Selectivity (B:L ratio)[c] |
|---|---|---|---|
| 1[c] | styrene | 100 | 100:0 |
| 2 | 4-vinylanisole | 100 | 100:0 |
| 3 | 2-chlorostyrene | 100 | 49:1 |
| 4 | 3-chlorostyrene | 100 | 100:0 |
| 5 | 4-chlorostyrene | 100 | 100:0 |
| 6 | 4-flourostyrene | 100 | 33:1 |
| 7 | 4-cyanostyrene | 190 | 100:0 |
| 8 | 9-vinylanthracene | 3 | 100:0 |
| 9 | 2-vinylpyridine | 0 | — |

TABLE 2-continued

Hydroformylation reactions with [RhCl(TPPMSL₃/PEG@silica[a]

| Entry | Substrate | Conversion %[b] | Selectivity (B:L ratio)[c] |
|---|---|---|---|
| 10[d] | 1-octene | 100 | 1:12 |

[a]Reartion conditions: 1 mol % catalyst, 1000 psi of 1:1 CO:H₂, 20 hrs, 50° C.;
[b]Determined by ¹H NMR;
[c]Reaction conditions: 12 hrs at 40° C.; [d]Reaction conditions: 14 hrs at 40° C.

In our system, we practically followed a "homogeneous-heterogeneous catalysis" methodology. Evaluating the attained efficiency was mostly related to the afforded results in the parallel homogeneous catalysis under equivalent conditions. The outcome results in table 3 revealed a higher selectivity of our system than the homogeneous and the commonly used catalysts. When the reaction was tested in a homogeneous medium of PEG or a homogeneous medium of PEG, formic acid and heptane (Table 3, entries 2-3), remarkable decrease in the selectivity ratios were obtained in comparison to our encapsulated catalyst (Table 3, entry 1).

Example 9: Preparation of Catalytic Deep Eutectic Solvents-Based Silica Microreactors Using a Non-Aqueous Sol-Gel Route Materials Choline chloride, D-sorbitol, urea, sodium tetrachloropalladate ($Na_2PdCl_4$) and all the substrates used in the hydrogenation and the Paal-Knorr synthesis were purchased from Sigma-Aldrich. Cetyl polyethyleneglycol/polypropyleneglycol-10/1 dimethicone (ABIL EM 90) and tetraethoxysilane (TEOS) were contributed from Sol-Gel Technologies. L-lactic acid was purchased from Apollo Scientific Ltd.. Polydimethoxysiloxane (PDMS) was purchased from abcr GmbH. L-tartaric acid, and formic acid were purchased from Fisher Scientific.

TABLE 3

Comparison between the encapsulated catalyst and the homogeneous one [a]

| Entry | Catalyst | Medium | Substrate | Conversion %[b] | Selectivity (B:L ratio)[b] |
|---|---|---|---|---|---|
| 1 | [Rh]/PEG@silica | Heptane | | 100 | 100:0 |
| 2 | [Rh] | PEG | | 100 | 3.5:1 |
| 3 | [Rh] | PEG + Formic acid + Heptane | | >99 | 11.5:1 |

[a]Reaction conditions: 20 hrs, 50° C., 1 mol % catalyst, 1000 psi of 1:1 CO:H₂
[b]Determined by ¹H NMR.

Figure 35:
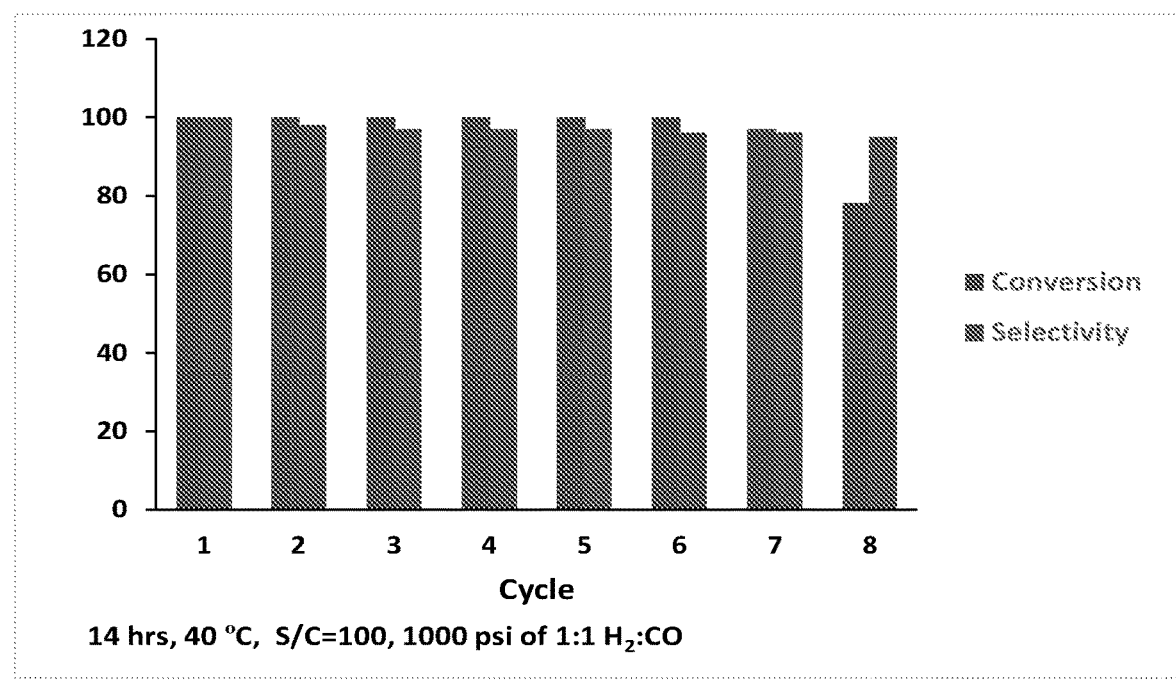
FIG. 35. Styrene hydroformylation recyclability.

The recyclability of our catalyst was tested in the hydroformylation of styrene. The catalyst was recycled over 8 times without showing any significant loss in its activity as seen in FIG. 35. By a simple centrifugation the catalyst was separated, washed and reused for the next cycle.

Abbreviations

ABIL EM 90, cetyl PEG/PPG-10/1 dimethicone; TEOS, tetraethoxysilane; PDMS, polydimethoxysiloxane; DES, deep eutectic solvent, CHCl:TA, choline chloride: L-tartaric acid (1:0.5); CHC:TA@SiO$_2$, choline chloride: L-tartaric acid (1:0.5) entrapped within silica; CHCl:TSA@SiO$_2$, choline chloride: p-toluenesufonic acid (1:1) entrapped within silica; Pd—CHCl:TA@SiO$_2$, entrapped catalyst within CHCl:TA silica microcapsules; Pd NPs, palladium nanoparticles; SEM, scanning electron microscopy; STEM, scanning transmission electron microscopy; EDS, electron diffraction spectroscopy; XRD, X-ray powder diffraction; FIB, focused ion beam, TGA, thermogravimetric analysis; BET, Brnauer-Emmet-Teller.

Instrumentation

The microcapsules were initially examined using high resolution scanning electron microscopy (HR SEM) Sirion from FEI equipped with Shottky-type field emission source and secondary electron (SE) detector at 5 kV, and focused ion beam (FIB) using FEI Helios nanolab 460S1 instrument to investigate the inner and outer morphology of the capsules and to evaluate whether core-shell or matrix structures were obtained. These analyses were followed by $^{13}C$ and, $^{29}Si$ cross polarization magic angle spinning (CP-MAS) NMR spectroscopy acquired using Bruker DRX-500 instrument and infrared spectroscopy (IR) recorded with KBr pellets at RT in transmission mode on a PerkinElmer 65 FTIR spectrometer to prove the chemical composition of the microcapsules. In cases of entrapped metal catalyst within the core, X-Ray powder diffraction (XRD) was employed to affirm the presence of the metallic species inside the capsules. XRD measurements were performed on the D8 Advance diffractometer (Bruker AXS, Karlsruhe, Germany) with agoniometer radius of 217.5 mm, secondary graphite monochromator, 2° Soller slits and 0.2 mm receiving slit. Low-back-ground quartz sample holders were filled with the powder samples. XRD patterns within the range 2q=1 to 908 were recorded at RT by using CuKα radiation (λ=1.5418 Å) under the following measurement conditions: tube voltage 40 kV, tube current 40 mA, step-scan mode with a step size of 2q=0.028, and counting time is step$^{-1}$. Scanning transmission electron microscope (STEM) and electron diffraction spectroscopy (EDS) were performed with (S) TEM Tecnai F20 G2 (FEI Company, USA) operated at 200 kV. In addition, thermal gravimetric analysis (TGA) were performed using a Mettler Toledo TG 50 analyzer at a temperature range of 25-950° C. at heating rate of 10° C./min under $N_2$ or air atmosphere. Malvern mastersizer hydro 2000 M/MU particle size analyzer was used to determine the size distribution of the capsules. The specific surface area was measured using Brnauer-Emmet-Teller (BET), Quantachrome Nova 1200e instrument. Finally, $^1$H-NMR, $^{13}$C-NMR measurements operated by a Bruker DRX-400 instrument and gas chromatography (GC) (Aglient Technologies, 7890A) with a capillary column (HP-5, 30 m) were used to characterize the reaction components and determine the yields of products. Emulsifications were performed using Kinematica Polytron homogenizer PT-6100 equipped with dispersing aggregate 3030/4EC.

General Procedure for the Preparation of DESs

Choline chloride was mixed at a suitable molar ratio with a hydrogen bond donor such as urea or L-tartaric acid in a pressure vessel at 80-120° C. for 1 hour. At the end of the reactions, the initially solid mixtures produced colorless liquids, which were then used in the microencapsulation process without further purification.

Microencapsulation of DESs

The microencapsulation started by emulsifying a mixture of the targeted DES (3.23 g) and formic acid (5.77 g) in a hydrophobic dispersing phase while homogenizing at 10000 rpm for two minutes. The dispersing phase usually consisted of ABIL EM 90 (0.4 g), cyclohexane or heptane (12.37 g), and TEOS or PDMS (3.23 g). After the required amount of time (1-4 hours), the microcapsules were easily separated and washed three times with an appropriate solvent by centrifugation. Finally, the microcapsules were dried at 80° C. under high vacuum overnight to remove any remaining volatile and undesired side-products that were produced during the microencapsulation process. In order to incorporate $Na_2PdCl_4$ within microcapsules, 300 mg of the metal precursor were dissolved inside the DES-formic acid phase prior to microencapsulation. Finally, the palladium nanoparticles (Pd NPs) were obtained by reducing the entrapped metal precursor with 500 psi of $H_2$ in 5 g diethyl ether at 50° C. for 24 hrs in a glass-lined autoclave.

General Procedure for the Hydrogenation Reactions with Pd—CHCl:TA@SiO$_2$ Microcapsules.

1 mmol of substrate, a suitable amount of Pd—CHCl:TA@SiO$_2$ microcapsules containing $2 \times 10^{-3}$ to $1 \times 10^{-2}$ mmol Pd, and 5 g of diethylether were transferred to a 25 ml glass-lined autoclave. The autoclave was purged three times with $H_2$ and then pressurized to 100–500 psi. The reactions were held at RT or 60° C. whilst stirring for the required period of time, followed by centrifugation at 6000 rpm to separate the microcapsules from the reaction mixture. Afterwards, the capsules were washed two times with diethyl ether, dried in an oven at 50° C. for 2 hours and then used for the next catalytic cycle. Lastly, the reaction contents were obtained by evaporating the solvent, and examined using $^1$H NMR and GC to calculate the conversion of the products.

General Procedure for the Paal-Knorr Synthesis of N-Substituted Pyrroles with CHCl:TA@SiO$_2$ Microcapsules.

1 mmol of aniline or other aniline derivative were mixed with 1.1 equivalent of acetonylacetone, 0.05 g of CHCl:TA@SiO$_2$ microcapsules (10 mol % L-tartaric acid), and 1 g solvent. The mixture was stirred at a suitable temperature for the required amount of time and monitored by TLC. At the end of the reaction, the capsules were separated by centrifugation, washed twice with acetonitrile, dried under high vacuum for 2 hours, and then used in the next catalytic cycle. The washings were combined with the reaction mixture and the products were separated by evaporation and purified by column chromatography on silica using 10% ethyl acetate in hexane.

Results and Discussion

Microencapsulation of DESs

Figure 54:
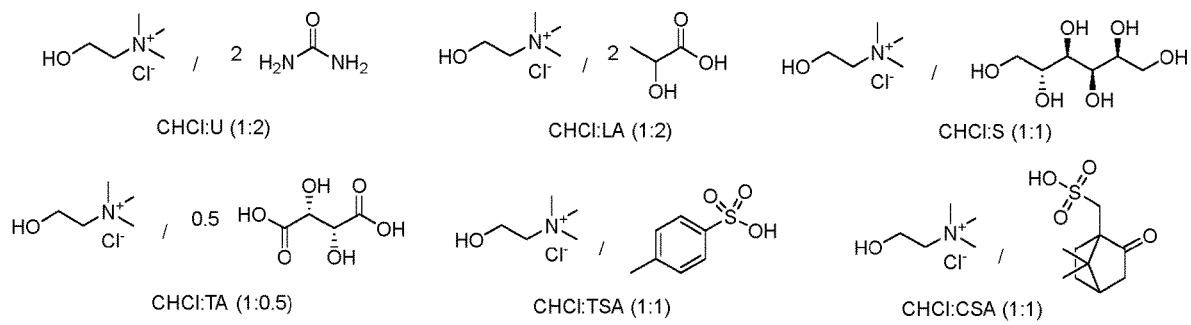
FIG. 54 shows a scheme of DESs microencapsulated via combining O/O emulsions and non-aqueous sol-gel.
Figure 55:
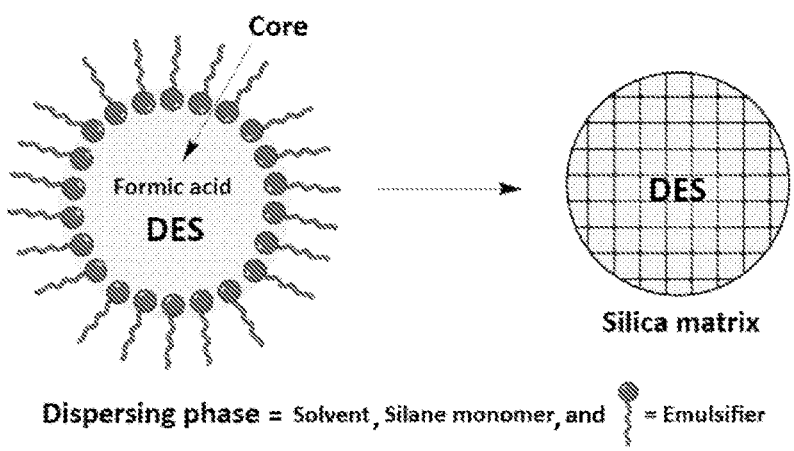
FIG. 55 shows a scheme of the microencapsulation of a DES droplet within silica.

The microencapsulation of the DESs (FIG. 54) was performed in a non-aqueous fashion using O/O emulsions as templates for the microencapsulation process. The emulsions were prepared from two immiscible phases with dissimilar polarities: 1) The polar phase (core phase), consisted of a DES mixed with an excess of formic acid, and 2) The apolar phase (dispersing phase), contained a) the emulsifier ABIL EM 90, b) a suitable solvent, and c) silane monomer. Although the ratio between the two phases (according to weight) was usually 35% to 65% respectively, attempts with only 20% core were also successful. Shear forces were required to produce micron-sized droplets of DES-formic acid inside the dispersing phase. This was achieved using a Homogenizer, which was applied at 10000 rpm for 2 minutes. The silica matrix required for the microencapsulation of the DESs was produced from the reaction between formic acid and the silane monomer at the interface of the emulsion droplets (FIG. 55). The acid acted as a catalyst and as a reactant in the non-aqueous sol-gel process. In addition, the presence of the acid was crucial for dissolving the highly hydrophilic and viscous DESs prior to homogenization. Hence, eliminating any need of water. Microencapsulation attempts failed using other carboxylic acids, such as acetic acid, trifluoroacetic acid, and trichloroacetic acid. The only successful alternative to formic acid was L-lactic acid. Furthermore, formic acid solubilizes hydrophobic compounds much better than water. Even compounds such as TEOS, which are insoluble in water, are completely soluble in formic acid. Moreover, the non-aqueous formic acid mediated sol-gel technique is a two-component reaction, unlike aqueous approaches that require four components. Hence providing a simpler route for microencapsulation. At the end of the microencapsulation, the capsules were separated by simple centrifugation and washed several times with a suitable solvent to dispose of any undesired materials. After drying, the capsules were obtained as easily handled powders that were dispersible in numerous organic solvents.

Scheme 2. DESs microencapsulated via combining O/O emulsions and non-aqueous sol-gel.

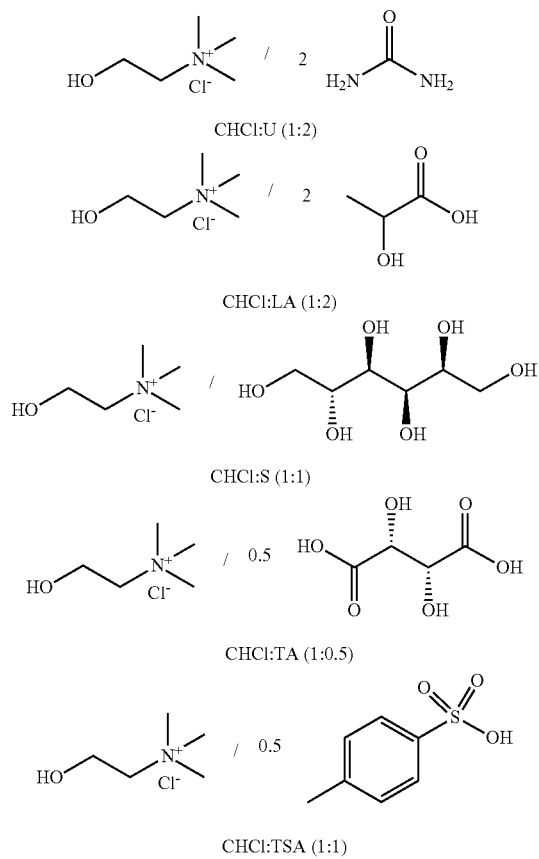

-continued

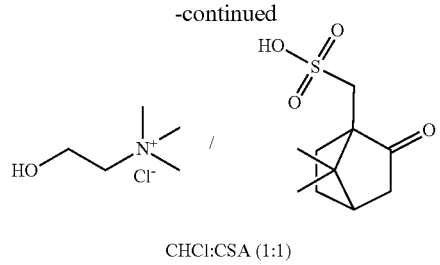

CHCl:CSA (1:1)

The presence of the emulsifier ABIL EM 90 was crucial for stabilizing the DES-formic acid droplets. The silicon-based emulsifier proved efficient for all the targeted DESs. Without the emulsifier, the microencapsulation failed and phase separations were obtained. Among slightly polar solvents such as xylene, small amounts of ABIL EM 90, 0.2-0.4 w/w %, produced large microcapsules (over 100 microns) accompanied with much smaller ones (less than 10 microns). Increasing the amount of the emulsifier to 0.8 w/w % reduced the amount of large microcapsules but did not eliminate it. Therefore, we switched to apolar solvents such as heptane and cyclohexane. In both cases, the production of large microcapsules was successfully eliminated. Nevertheless, highly aggregated systems were acquired. In addition, increasing the amount of ABIL EM 90 could not minimize the aggregation of the capsules and improve their dispersibility. This obstacle was overcame when PDMS was used as a silane monomer instead of TEOS. PDMS comprises oligomeric chains of partially condensed tetramethoxysilane monomers, which contain over 26% of silicon. The enhanced stability of the microcapsules might be explained by addressing the polymeric nature of the silane monomer. First, the oligomeric chains of PDMS highly resemble the hydrophobic part of the silicon-based emulsifier ABIL EM 90. Therefore, PDMS can contribute to the stability of the DES-formic acid droplet by acting as a co-surfactant. Second, replacing TEOS with PDMS increased the viscosity of the dispersing phase, thus, retarding the aggregation of the capsules.

Figures 36A, 36B:
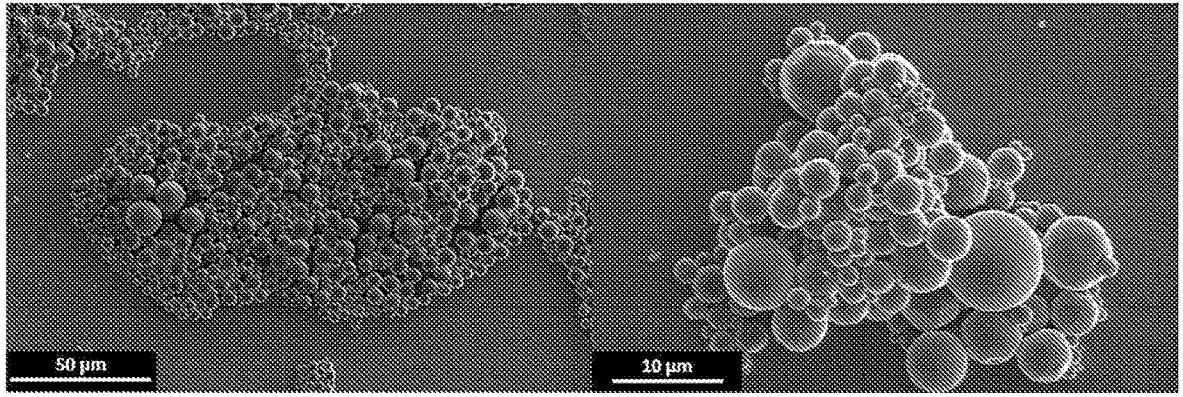
FIG. 36A-36B. show the SEM images of CHCl:TA@SiO$_2$ microcapsules (FIG. 36A in 50 micrometer scale and FIG. 36B in 10 micrometer scale).
Figures 37A, 37B:
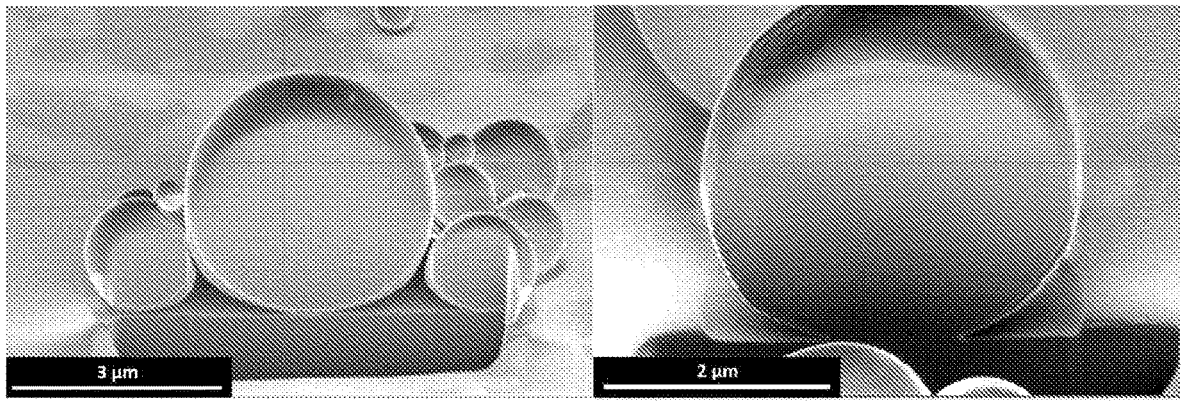
FIG. 37A-37B. show the FIB images of CHCl:TA@SiO$_2$ microcapsules.

The characterization of the microcapsules started by examining the confined DESs using SEM and FIB. The goal was to discover the external and internal morphology of the capsules. According to SEM, spherical micron-sized capsules were obtained in all cases. FIGS. 36A-36B shows the SEM images of choline chloride: L-tartaric acid (1:0.5) microcapsules (CHCl:TA@SiO$_2$). The size, however, varied dramatically depending on the microencapsulated DES. The size of the microcapsules ranged from 7 to 30 μm according to laser diffraction analyses. These results correlated poorly with sizes observed in SEM, which were significantly smaller. Many factors may be addressed to explain the different outcomes. The main reason is that the analyses using laser diffraction were conducted under very different conditions. For example, the capsules were dispersed in water instead of in organic solvents. Therefore, in some cases, the dispersion in water was not optimal, despite conducting the measurements under continuous sonication. Also, SEM indicated that the capsules naturally exist as aggregates. Only rarely can a single aggregate-free microcapsule be found. Consequently, the results obtained from the laser diffraction, most probably represent aggregated microcapsules and not separated individual capsules. The next step revolved around figuring out whether the obtained microcapsules possessed core-shell or matrix-like structures. For this purpose, FIB analyses (FIG. 37) were conducted where the ion beam was used to cut selected microcapsules in half to reveal their interior structure. Accordingly, all of the systems possessed matrix-like structures. These results indicate that the polycondensation of the silane monomers did not occur solely on the interface of the DES-formic acid emulsions but also inside the core of the droplets. Therefore, silica filled particles were obtained instead of core-shell structures.

The surface area and pore size of the microcapsules were measured by BET analysis after the extraction of the DESs. The extraction was performed using a soxhlet apparatus by refluxing the microcapsules with ethanol overnight. CHCl:TA@SiO$_2$ microcapsules provided the lowest surface area with 483 m$^2$/g. The rest of the microencapsulated DESs provided significantly higher surface areas averaging at 923 m$^2$/g. The highest surface area, 1079 m$^2$/g, was obtained with CHCl:TSA@SiO$_2$ microcapsules. These values are comparable to other high surface area materials such as zeolites, MCM-41, and FSM-16. [36-38] In addition, the pore size of the capsules varied from 4 to 7 nm depending on the microencapsulated DES, which lies on the limit between micro- and meso-porous silica. Consequently, we believe that the current DES-mediated non-aqueous sol-gel process can be employed for the preparation of highly porous silicate materials with controlled porosity.

Figure 38:
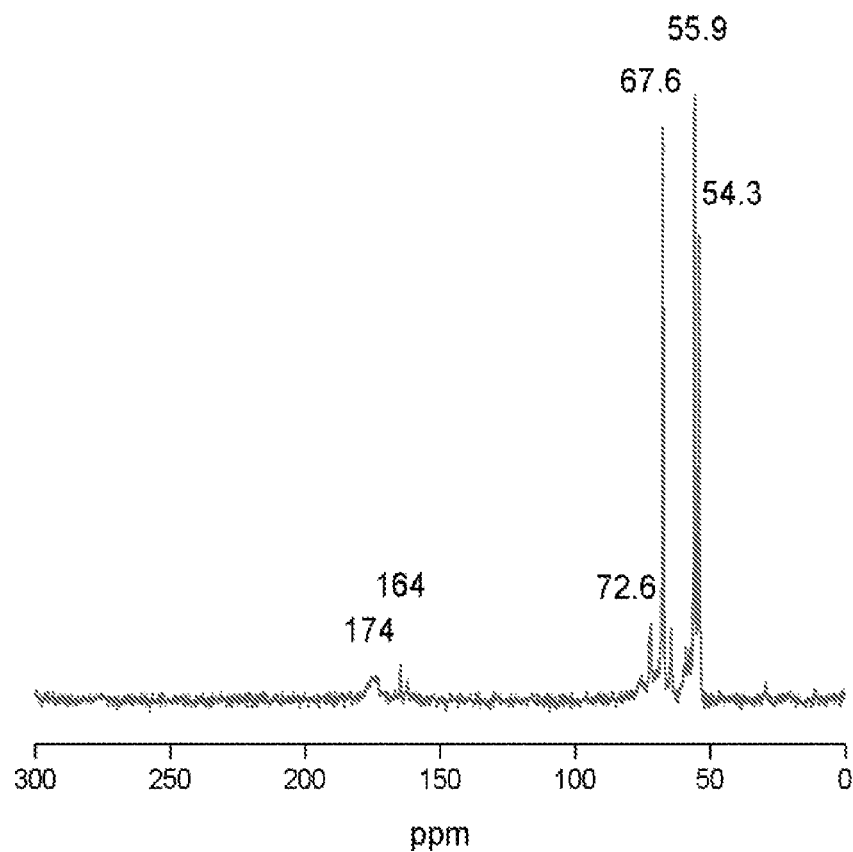
FIG. 38. shows the $^{13}$C CP-MAS NMR of CHCl:TA@SiO$_2$ microcapsules.
Figure 39:
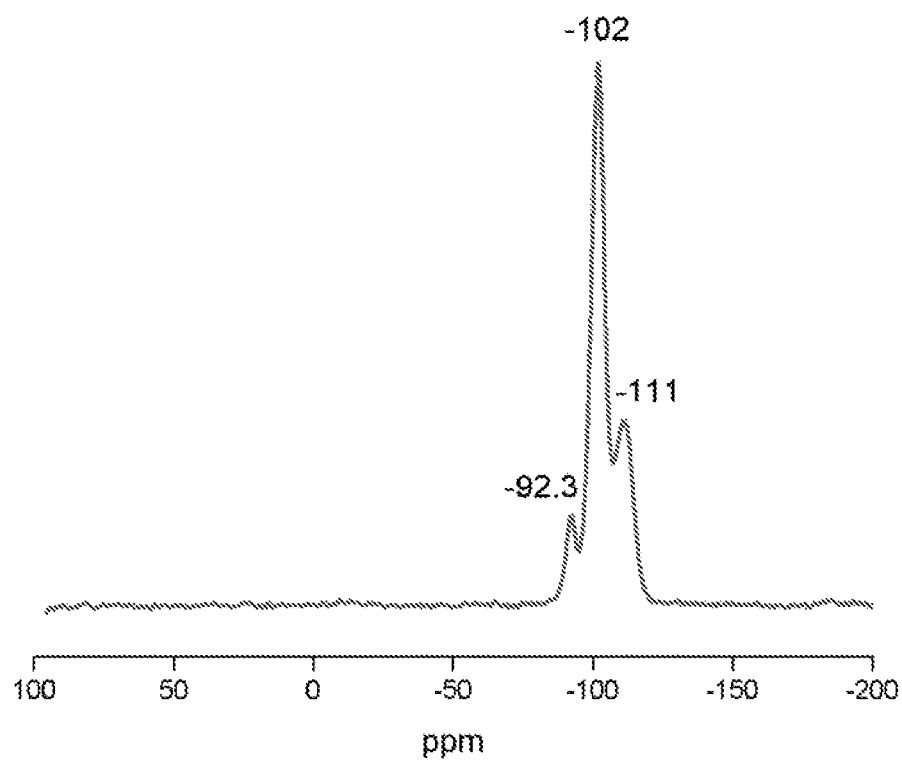
FIG. 39. shows the $^{29}$Si CP-MAS NMR of CHCl:TA@SiO$_2$ microcapsules.
Figure 40:
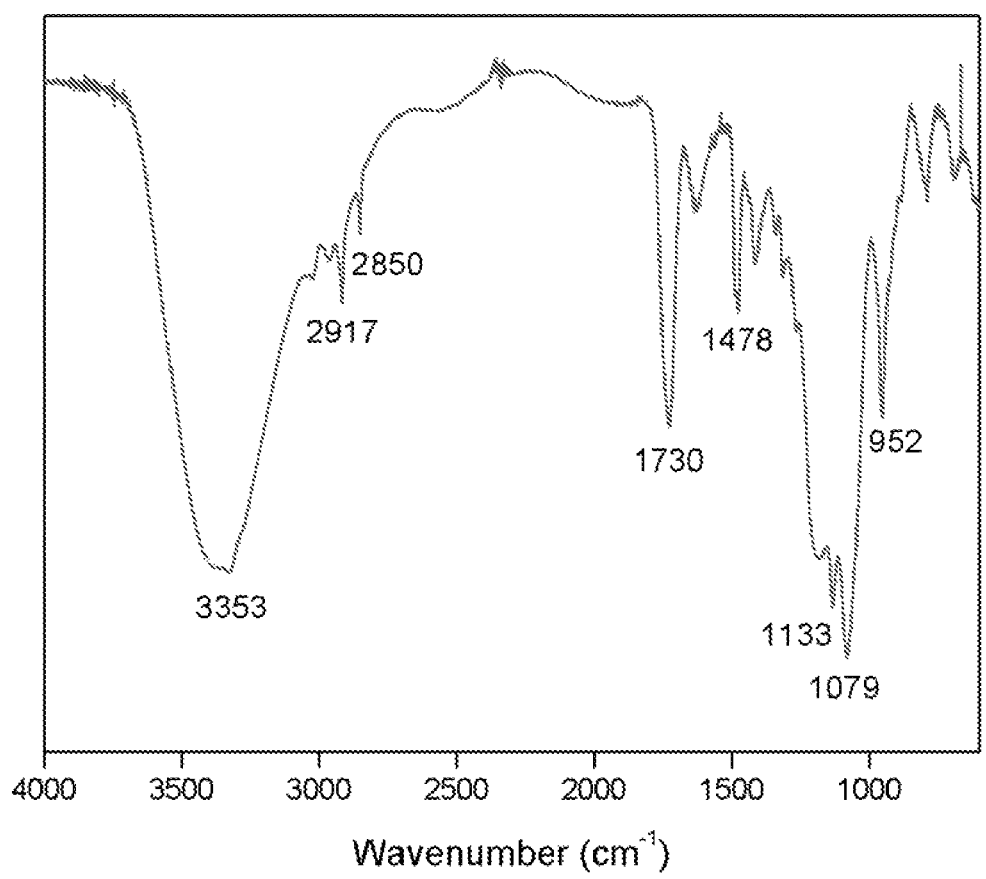
FIG. 40. shows the FTIR spectrum of CHCl:TA@SiO$_2$ microcapsules.

Afterwards, the chemical composition of the microcapsules was identified using solid state NMR and FTIR. $^{13}$C CP-MAS NMR confirmed the presence of the organic compounds, whereas $^{29}$Si CP-MAS NMR proved the existence of silica. Example of the NMR analyses for CHCl:TA@SiO$_2$ are demonstrated in FIGS. 38 and 39. In the $^{13}$C CP-MAS NMR, characteristic peaks of choline chloride and L-tartaric acid appeared at 54.3, 55.9, 67.6 and at 72.6, 174 ppm respectively. These results show that the targeted DES was successfully microencapsulated. The peak at 164 ppm indicates the presence of formic acid, which was used in excess in the microencapsulation process. The peak of formic acid also appeared among several other microencapsulated DESs. The $^{29}$Si CP-MAS NMR showed mostly $Q^3$ silicon types (−102 ppm). $Q^3$ corresponds to silicon atoms that are attached to three siloxane bonds. The other peaks belonged to $Q^4$ (−111 ppm), which was the second most abundant type, and $Q^2$ (−92.3). This trend reoccurred among all the microencapsulated DESs, except for $Q^2$ peaks, which were absent in some of the cases. The presence of these peaks confirmed the production of the desired silica matrix. Similarly, FTIR analyses showed the characteristic peaks of the microencapsulated DESs as well as the silica. Another representative example of CHCl:TA@SiO$_2$ is shown in FIG. 40. Although the presence of numerous functional groups in the DES complicated the identification of individual moieties, a high correlation was observed between the pure and microencapsulated compounds. Moreover, the band at 1730 cm$^{-1}$ can be clearly assigned to the stretching of the carbonyl group of L-tartaric acid. Thus proving the existence of the DES within the microcapsules. Furthermore, the band at 1079 cm$^{-1}$, which is characteristic of Si—O—Si stretching, affirms the presence of silica.

Figure 41A:
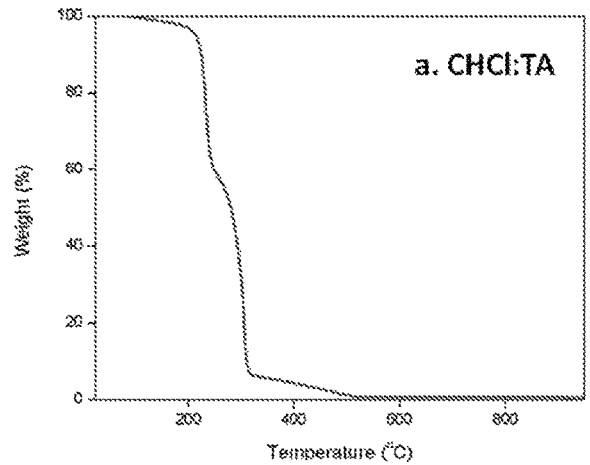
FIG. 41A-41B. show the TGA analysis of CHCl:TA bulk (41A) and CHCl:TA@SiO$_2$ microcapsules (41B) under air.
Figure 41B:
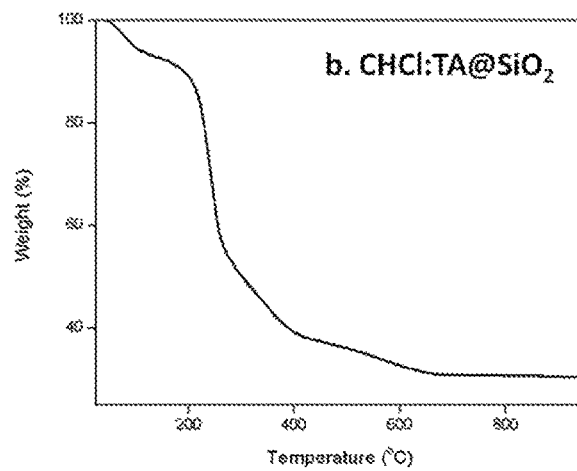

The thermal properties of the microcapsules were examined by TGA. The analyses were performed from 25 to 950° C. under nitrogen or air atmospheres. In both case, the thermal stability of the DESs slightly decreased after microencapsulation. A representative example of the analysis performed for bulk and microencapsulated CHCl-TA under air is shown in FIG. 41. The major decomposition for both the bulk and microencapsulated CHCl-TA started around 200° C. In FIG. 41B, an additional small weight drop can be spotted around 100° C. This decrease in weight can be attributed to the evaporation of any volatile materials that remained after the end of the microencapsulation process. Examples include excess formic acid, ethyl formate, and water. Similar results were acquired when the analyses were performed under nitrogen. Finally, the TGA was also used to determine the percentage of organic compounds and silica within the microcapsules. The amount of organic materials inside the capsules ranged from 55% to 83%. The aforementioned quantities cannot be entrapped by traditional sol-gel techniques but are achievable with microencapsulation.

Hydrogenation of Unsaturated Compounds

Figure 42:
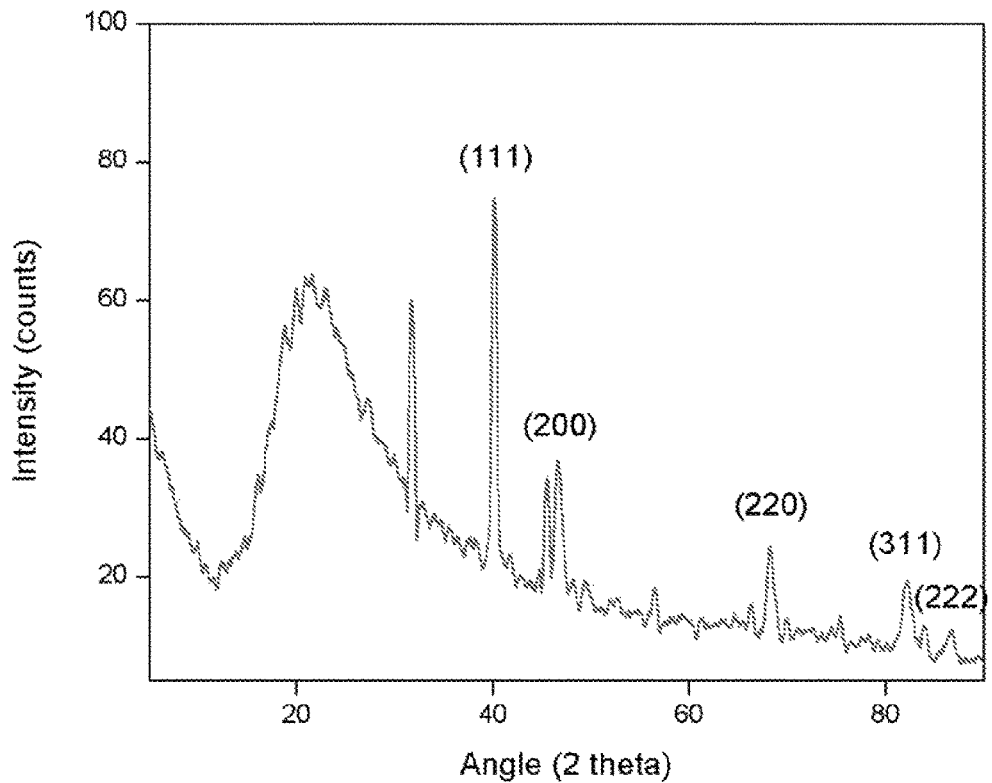
FIG. 42. shows the XRD analysis of Pd—CHCl:TA@SiO$_2$ microcapsules.

Following the characterization of the systems, we wanted to evaluate the efficiency of the DES-microcapsules as heterogeneous systems in catalysis. Therefore, the hydrogenation of styrene and other unsaturated compounds was attempted as a reaction model using CHCl:TA@SiO$_2$ as hosts for Pd NPs. The incorporation of palladium into the microcapsules proceeded by dissolving Na$_2$PdCl$_4$ in the CHCl:TA-formic acid phase prior to microencapsulation. The presence of the palladium salt within the microcapsules was confirmed using EDS measurements in STEM. At first, the hydrogenation of styrene was performed at room temperature without pre-activation of the palladium precursor with hydrogen gas. However, poor conversions were detected. Therefore, the metal precursor was reduced prior to the reaction using 500 psi of H$_2$ gas overnight at different temperatures using diethyl ether as the solvent. As shown in Table 4 (Entries 2 and 4), reducing the palladium at RT increased the conversion of styrene to ethylbenzene from 6% to 56%. The results were further improved when the metal precursor was activated at 50° C. instead of RT prior to reaction. The catalyst provided 99% ethylbenzene after just one hour. In addition, the activation of the catalyst enhanced the conditions of the reaction by enabling the use of higher S/C ratios and lower H$_2$ gas pressures (Table 4, entries 5 and 6). In contrast, increasing the activation temperature from 50° C. to 80° C. led to a significant decrease in catalytic activity. The reaction produced only 12% ethylbenzene as opposed to 99% conversion. Consequently, the investigation was continued using Pd—CHCl:TA@SiO$_2$ microcapsules that were reduced at 50° C. The presence of Pd NPs was confirmed using XRD analysis. As shown in FIG. 42, a broad peak that belonged to silica was obtained at 2θ=20.06. In addition, peaks of NaCl appeared at 2θ=31.70, 45.54, 56.42, 66.32, 75.42, and 84.04. Characteristic peaks of Pd$^0$, 2θ=40.16, 46.64, 68.24, 82.08, and 86.76, which correspond to Pd (111), (200), (220), (311), and (222) were also clearly observed. The leaching of palladium from the microcapsules was checked by separating the reaction mixture post-reaction, followed by adding a new amount of substrate, and performing the reaction again. The negative results indicated that the reaction was indeed heterogeneous and occurs without leaching of palladium.

TABLE 4

The hydrogenation of styrene to ethylbenzene using Pd—CHCl:TA@SiO$_2$ under different conditions.

| Entry [a] | Solvent | S/C | H$_2$ pressure (psi) | Activation temp. (° C.) | Reaction time (h) | Product (%) |
|---|---|---|---|---|---|---|
| 1 | Dichloromethane | 100 | 500 | — | 2 | — |
| 2 | diethyl ether | 100 | 500 | — | 2 | 6% |
| 3 | Dichloromethane | 100 | 500 | RT | 2 | 10% |
| 4 | diethyl ether | 100 | 500 | RT | 2 | 56% |
| 5 | diethyl ether | 100 | 500 | 50 | 2 | 100% |
| 6 | diethyl ether | 500 | 100 | 50 | 1 | 99% |
| 7 | diethyl ether | 1000 | 100 | 50 | 1 | 70% |
| 8 | diethyl ether | 2000 | 100 | 50 | 1 | 39% |
| 9 | diethyl ether | 500 | 100 | 80 | 1 | 12% |
| 10 | cyclohexane | 500 | 100 | 80 | 1 | — |

[a] 1 mmole reactant, 5 g solvent in a 25 ml glass-lined autoclave. The conversion was examined by both $^1$H NMR and GC.

As shown in Table 5, other unsaturated compounds were also successfully hydrogenated. Substrates such as phenylacetylene, diphenylacetylene, and 4-chlorostyrene were reduced at room temperature. The hydrogenation of diphenylacetylene proceeded with good selectivity towards single addition of hydrogen molecule to produce stilbene over bibenzyl. The hydrogenation of phenylacetylene, however, did not offer any special selectivity. Other substrates required heating the reaction mixture at 60° C. to produce appreciable conversions. Examples include cyclohexene, benzalacetone, and acetophenone. In the case of benzalacetone, Pd—CHCl:TA@SiO$_2$ provided exclusive hydrogenation of the double bond without any reduction of the carbonyl functional group. In the case of acetophenone, higher catalyst loading and hydrogen gas pressure were required (500 psi of H$_2$ and S/C=100), which are five times the amounts needed for other substrates. According to NMR and GC analysis, the reduction of acetophenone yielded both 1-phenylethanol and ethylbenzene. The latter was produced as a result of simultaneous dehydration and hydrogenation of 1-phenylethanol to styrene and ethylbenzene respectively. The dehydration was probably catalyzed by the Brønsted acidic CHCl:TA DES present inside the microcapsules. These results prove that the current system can be used for one-pot reactions that combines the catalytic activity of Pd NPs and the acidic DES.

TABLE 5

The hydrogenation of various unsaturated compounds using Pd—CHCl:TA@SiO$_2$ microcapsules.

| Entry [a] | Substrate | Temp. (° C.) | Conversion (%) | Product (%) |
|---|---|---|---|---|
| 1 | 4-chlorostyrene | RT | 42 | 1-chloro-4-ethylbenzene (42) |
| 2 | phenylacetylene | RT | 100 | styrene (68), ethylbenzene (32) |
| 3 | diphenylacetylene | RT | 78 | Z-stilbene (73), bibenzyl (3) |
| 4 | Z-stilbene | 60 | 94 | bibenzyl (94) |
| 5 | cyclohexene | 60 | 68 | cyclohexane (68) |
| 6 | benzalacetone | 60 | 73 | 4-phenyl-2-butanone (73) |
| 7 [b] | acetophenone | 60 | 65 | 1-phenylethanol (43), ethylbenzene (22) |

[a] 1 mmole reactant, 5 g diethylether, 0.01 g Pd—CHCl:TA@SiO$_2$ (S/C = 500), 100 psi H$_2$ in a 25 ml glass-lined autoclave at a suitable temperature for 2 hrs. The conversion was examined by both $^1$H NMR and GC. [b] 0.05 g Pd—CHCl:TA@SiO$_2$ (S/C = 100) and 500 psi of H$_2$ gas.

Another important aspect that defines the efficiency of Pd-DES@SiO$_2$ as microreactors is the recyclability of the system. Similar to other heterogeneous systems, the microencapsulation should facilitate the separation and enable multiple reuse of the entrapped compounds. Therefore, the recyclability of Pd—CHCl:TA@SiO$_2$ was tested on the hydrogenation of styrene. After each reaction, the catalyst was separated from the reaction mixture by centrifugation, followed by two washings with Et$_2$O. Afterwards, the catalyst was dried in an oven for 2 hours and reused in the next cycle. The reaction was performed 10 times without any decrease in conversion (FIG. 43). Moreover, SEM analysis showed that the microcapsules remained undamaged even after 10 runs (FIG. 44). This proves the efficiency of microencapsulated DESs as hosts for metal NPs in catalysis. Finally, it should be noted that comparison studies with homogeneous conditions with CHCl:TA were impossible for a number of reasons: 1) Even though Na$_2$PdCl$_4$ is easily miscible in CHCl:TA-formic acid, the metal precursor is poorly soluble in CHCl:TA alone. 2) The high viscosity of CHCl:TA prevents plausible stirring of the reaction mixture because the DES must be heated to a minimum of 90° C. in order to initiate the movement of the magnetic stirring bar. 3) The hydrophobic substrates used in the hydrogenation are insoluble in CHCl:TA, which is highly hydrophilic. Therefore, microencapsulation facilitates the use of DESs in reaction conditions that are otherwise inaccessible and eliminates the drawbacks that would otherwise originate from the high viscosity of DESs.

Synthesis of N-Substituted Pyrroles

Recently, the preparation of N-substituted pyrroles was achieved using choline chloride: L-tartaric acid (1:1) as a solvent and catalyst in the Clauson-Kaas and Paal-Knorr reactions.[23] The acidic DES provided high yields and was successfully recycled several times. High temperatures however, were required undoubtedly to circumvent the effects of the high viscosity of the bulk DES. Therefore, we attempted the Paal-Knorr synthesis of pyrroles with CHCl:TA@SiO$_2$ to demonstrate the advantages of microencapsulation. As shown in Table 6, para- and meta-substituted anilines such as p-anisidine, 4-bromoaniline, and 3,5-dimethylaniline reacted smoothly with acetonylacetone at room temperature and provided high conversions after only 2 hours. Among the solvents tested, acetonitrile delivered the best results. In addition, compounds bearing electron donating groups produced better conversions compared to aniline and 4-bromoaniline (Table 6, Entries). Sterically hindered substrates on the other hand, such as 2,6-dimethylaniline, 2-iodoaniline, and 2,6-diisopropylaniline required longer reaction time and higher temperatures.

TABLE 6

Paal-Knorr synthesis of N-substituted pyrroles from acetonylacetone and different aniline derivatives catalyzed by CHCl:TA@SiO$_2$ microcapsules.

| Entry [a] | Amine | Solvent | Conversion (%) | Product (%) |
|---|---|---|---|---|
| 1 | aniline | dichloromehane | 84 | 84 |
| 2 | aniline | acetonitrile | 86 | 86 |
| 3 | p-anisidine | acetonitrile | 100 | 100 |
| 4 | p-anisidine | diethyl ether | 69 | 69 |
| 5 | p-anisidine | tetrahydrofuran | 90 | 90 |
| 6 | 4-bromoaniline | acetonitrile | 87 | 87 |
| 7 | 2-iodoaniline | acetonitrile | 37 | 37 |
| 8 | 3,5-dimethylaniline | acetonitrile | 100 | 100 |
| 9 | 2,6-diisopropylaniline | acetonitrile | 7 | 7 |
| 10 [b] | 2,6-diisopropylaniline | acetonitrile | 78 | 78 |
| 11 | 2,6-dimethylaniline | acetonitrile | 28 | 28 |
| 12 [b] | 2,6-dimethylaniline | acetonitrile | 100 | 100 |
| 13 | 4,4'-methylenedianiline | acetonitrile | 100 | mono- (13), and di- (87) condensations |
| 14 [b] | 4,4'-methylenedianiline | acetonitrile | 100 | di- (100) condensation |

[a] 1 mmole amine, 1.1 eq. acetonylacetone, 1 g solvent, 0.05 g CHCl:TA@SiO$_2$ (10 mol % TA), at a room temperature for 2 hrs. The conversion was examined by $^1$H NMR. [b] the reaction was held at 50° C. for 24 hours.

At first, we tried recycling the capsules following the condensation of p-anisidine with acetonylacetone. Unfortunately, the conversions started to drop significantly after the 2$^{nd}$ run. By the 4$^{th}$ run, the reaction provided only 57% of the product. When checked in SEM after the 4$^{th}$ run, some of the microcapsules appeared destroyed. This might be the result of the base-catalyzed hydrolysis of the ceramic skeleton. Anilines as basic compounds, probably promoted the reaction between water, which were produced in-situ, and the silica matrix. Thus, the microcapsules were gradually destroyed. In order to prove our point, the recycling was reattempted with 4-bromoaniline, which is considerably less basic than p-anisidine. As shown in FIG. 45, the capsules delivered notably better results and the drop in conversion occurred only after the 4$^{th}$ run. In addition, the capsules remained in a good condition and were only minimally damaged even after 5 consecutive runs (FIG. 46). Accordingly, although the capsules are stable under relatively high pressures and temperatures, slightly basic compounds such as p-anisidine can catalyze the hydrolysis of silica in the presence of water and thereby degrade the ceramic structure.

CONCLUSION

Numerous choline-based DESs were successfully microencapsulated by bridging between O/O emulsions and non-aqueous sol-gel. These results demonstrate that our methods have great potential as an alternative technique to the traditional aqueous routes of microencapsulation prevalent in the literature. In addition, microencapsulating the DESs converted the viscous compounds to easily manipulated powders that were effectively used as hosts for Pd NPs and as heterogeneous microreactors in the hydrogenation of unsaturated compounds. Our microcapsules were recycled 10 times without any drop in activity and without any visible damage to the microcapsules. Moreover, results from the hydrogenation of acetophenone showed that the microencapsulated DESs can act by themselves as catalysts and thus can be used in one-pot reactions. In this case the acidic nature of CHCl:TA catalyzed the dehydration of 1-phenylethanol to styrene, which was then hydrogenated to ethylbenzene. The catalytic activity of the acidic CHCl:TA@SiO$_2$ was then further investigated in the Paal-Knorr synthesis of N-substituted pyrroles. The reactions proceeded at convenient conditions without the need of elevated temperature. These results highlight the efficiency of microencapsulated DESs as heterogeneous catalysts in synthesis.

Example 10: Preparation of Pd/PEG@Polyurea

Figure 56:
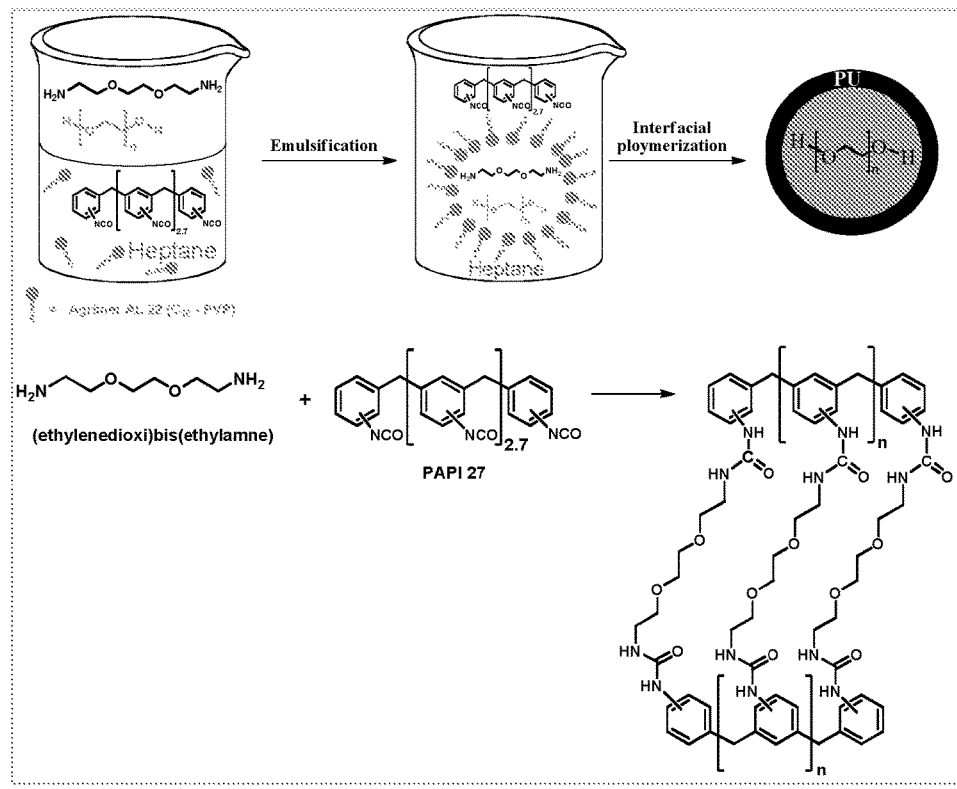
FIG. 56 shows a scheme of the preparation of PEG@polyurea microcapsules.

The invention further provides a method for preparing catalytic microreactors based on encapsulation of palladium nanoparticles dispersed in PEG within polyurea microcapsules that are created starting from oil-in-oil emulsions. Polyurea microcapsules were prepared by the addition of 2,2'(ethylenedioxy)bis(ethylamine) to the polar PEG phase followed by emulsification process and slow addition of the isocyanate monomer, PAPI 27. The two monomers (1:1 mole ratio) interact at the boundary of the two immiscible phases and interfacial polymerization process occurs as illustrated in FIG. 56.

Scanning electron microscopy (SEM) was used to analyze the morphological structure of the polyurea microcapsules. As seen in FIGS. 47A-47B, smoothed spherical capsules were mainly obtained.

The entrapment of catalytic palladium nanoparticles within polyurea (PU) microcapsules was performed by the formation palladium nanoparticles by reducing sodium tetrachloropalladate (Na2PdCl4) dissolved in PEG followed constructing the polyurea microcapsules as described above. Analysis of STEM/EDX (FIG. 48) showed a successful incorporation of the palladium NPs within the core of the PU microcapsules. To evaluate the activity and efficiency of the catalyst Pd/PEG@polyurea, it was applied in catalytic hydrogenation reactions. As shown in Table 7, the catalyst expressed high desired activity in the hydrogenation of alkenes. Fully saturated alkanes could be generated smoothly under mild conditions (Table 7, entries 1-7). The catalyst activity was also tested in the hydrogenation of alkynes, which were converted mainly to the corresponding alkanes in full conversions (Table 7, entries 8-11). Diphenylacetylene with a 100% conversion (Table 7, entry 8) showed, exceptionally, a moderate selectivity of 61% towards the alkene where the fully hydrogenated bibenzyl was also attained as a byproduct. This partial selectivity could be attributed to the steric hindrance of the cis-stilbene formed initially, which can slow its hydrogenation with Pd/PEG@polyurea. An excellent reactivity of our catalyst was also achieved when a substrate/catalyst ratio of 5000 was applied in styrene hydrogenation (Table 7, entry 1).

Figure 49:
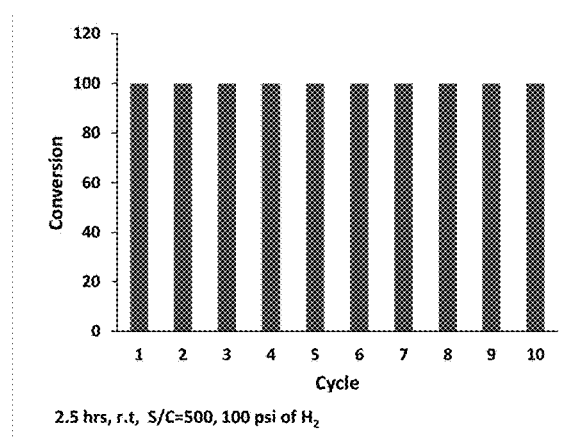
FIG. 49. Recyclability of Pd/PEG@polyurea in styrene hydrogenation reaction

The recyclability of our catalyst was tested in the hydrogenation of styrene. The catalyst was recycled over 10 times without showing any loss in its activity as seen in FIG. 49. The catalyst was separated easily by centrifugation, washed and reused for the next cycle.

Figure 50:
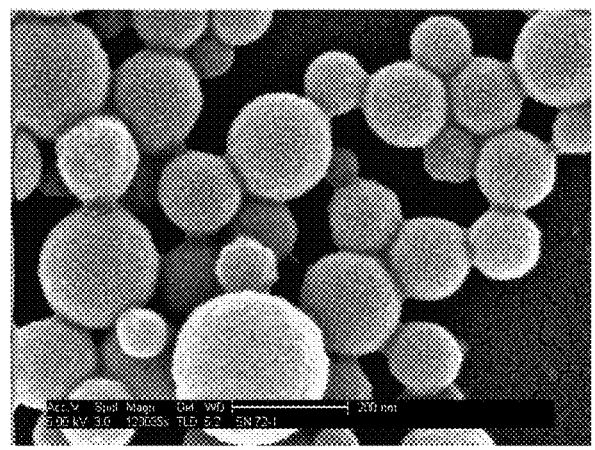
FIG. 50. SEM image of chiral polyurea nanocapsules prepared by interfacial polyaddition of (1R,2R)-cyclohexane-1,2-diamine and PAPI 27.
Figure 51:
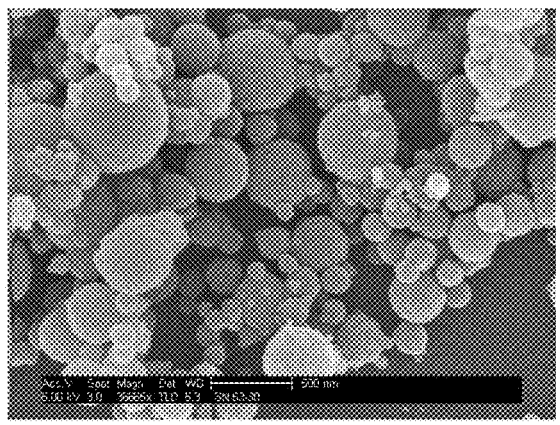
FIG. 51. SEM image of chiral polyurea nanocapsules prepared by interfacial polyaddition of (1S,2S)-1,2-diphenylethane-1,2-diamine and PAPI 27.
Figure 57:
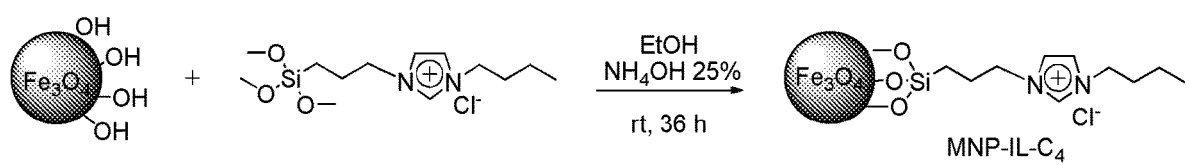
FIG. 57 shows a scheme of the structure of chiral diamines used in the preparation of chiral polyurea nanocapsules

The preparation method of polyurea microcapsules using non-aqueous emulsions was applied to create chiral polyurea nanocapsules or magnetically separable chiral polyurea nanocapsules. Specifically, chiral diamines (FIG. 57) dissolved in polar solvents such as dimethyl sulfoxide (DMSO), N,N-dimethylformamide (DMF) or dimethylacetamide was nanoemulsified by sonication in non-polar solvent such as heptane or toluene containing polymeric surfactants like Agrimer AL22 (FIGS. 50-51). After addition the isocyanate monomer such as PAPI 27, a chiral polyurea shell is formed around the polar nano-droplets.

Figure 52:
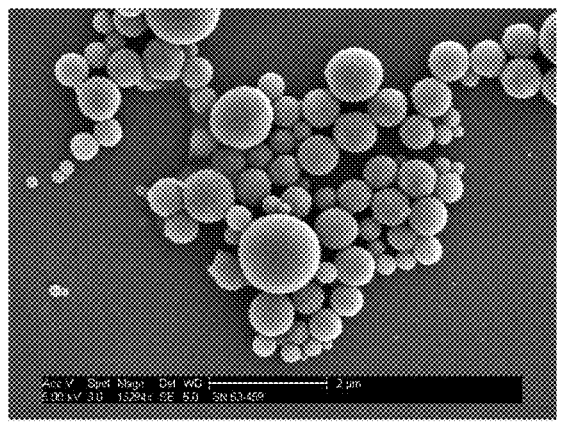
FIG. 52. SEM image of magnetically separable chiral polyurea nanocapsules prepared by interfacial polyaddition of (1R,2R)—N1,N2-bis(3-aminopropyl)-N1,N1,N2,N2-tetramethylcyclohexane-1,2-diaminium chloride and PAPI 27.
Figure 58:
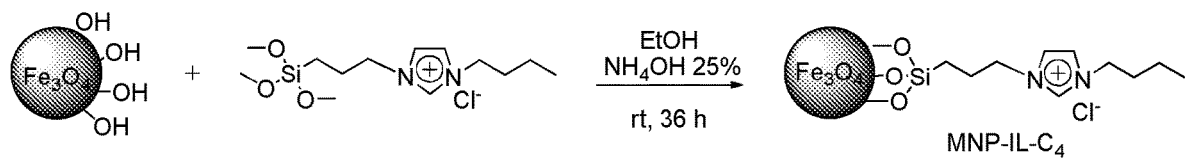
FIG. 58 shows the scheme of the modification of magnetite nanoparticles with imidazolium groups.

To incorporate magnetic nanoparticles in the core of the chiral polyurea, magnetite nanoparticles modified with imidazolium groups were used (FIG. 58). The modification of the magnetic nanoparticles with imidazolium groups facilitate their dispersion in the polar solvents and ensure keeping the particles in the core of the chiral nanocapsules (FIG. 52).

TABLE 7

Hydrogenation reaction with Pd/PEG@polyurea[a]

$$\underset{H}{\overset{H}{C}}=\underset{H}{\overset{H}{C}}-R \;+\; H_2 \;\xrightarrow[\text{0.2 mol \% catalyst}]{\text{100 psi } H_2,\; 2.5\text{ hrs, rt,}}\; R-\underset{H}{\overset{H}{C}}-\underset{H}{\overset{H}{C}}-H$$

| Entry | Substrate | Yield (%)[b] |
|---|---|---|
| 1[c] | styrene | 100 |
| 2 | styrene | 100 |
| 3 | 4-methoxystyrene | 100 |
| 4 | 3-methylstyrene | 96 |
| 5 | 4-methylstyrene | 100 |
| 6 | 3-chlorostyrene | 92 |
| 7 | indene | 92 |
| 8[d] | diphenylacetylene | 100 |
| 9 | phenylacetylene | 100 |
| 10 | 4-methylphenylacetylene | 100 |
| 11 | 4-fluorophenylacetylene | 100 |

[a]Reaction conditions: 2.5 hrs, rt, 100 psi of H₂, 0.2 mol % catalyst;
[b]Determined by ¹HNMR and GC;

TABLE 7-continued

Hydrogenation reaction with Pd/PEG@polyurea[a]

$$\underset{H}{\overset{H}{C}}=\underset{H}{\overset{H}{C}}-R \;+\; H_2 \;\xrightarrow[\text{0.2 mol \% catalyst}]{\text{100 psi } H_2,\; 2.5\text{ hrs, rt,}}\; R-\underset{H}{\overset{H}{C}}-\underset{H}{\overset{H}{C}}-H$$

| Entry | Substrate | Yield (%)[b] |
|---|---|---|

[c]Reaction conditions: 2.5 hrs, rt, 50 psi of H₂, 0.02 mol % catalyst;
[d]61% cis-stilbene, 39% bibenzyl.

Scheme 5. Structure of chiral diamines used in the preparation of chiral polyurea nanocapsules.

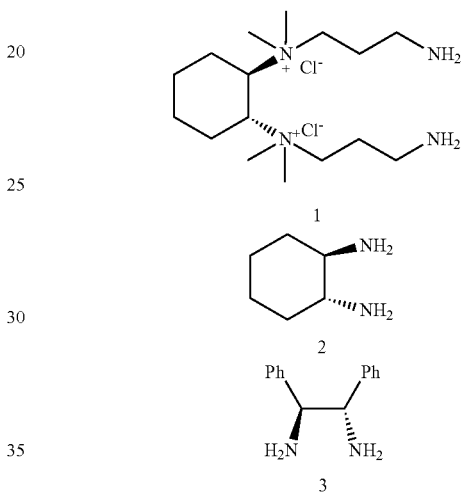

Scheme 6. Modification of magnetite nanoparticles with imidazolium groups.

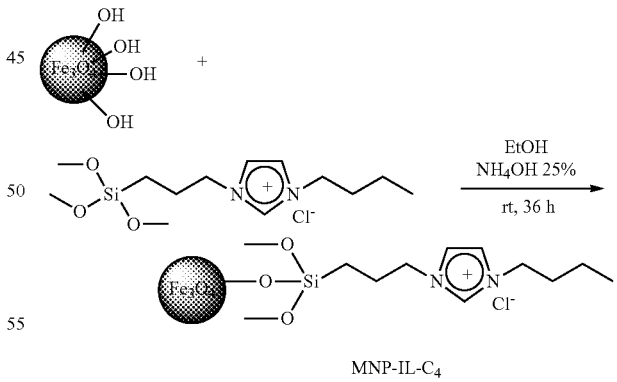

MNP-IL-C₄

Preparation of PEG@Polyurea Microcapsules:

1) In heptane: In a 250 mL beaker, 5 g of agrimer AL22 were dissolved in 85 g heptane. The solution was homogenized at 10,000 rpm for 30 seconds. To this phase, a mixture of 0.4 g of (ethylenedioxi)bis(ethylamine) (2.7 mmol) and 9.6 g of polyethylene glycol (PEG) was added and homogenized for further 1.5 minutes. Then, 0.9 g of polymethylene polyphenylisocyanate (PAPI 27) (2.64 mmol) dissolved in 6 g toluene were added dropwise. The emulsion was allowed to stir for 4 hours at room temperature. The resulting microcapsules were separated by centrifugation and washed three times with heptane (20 mL×3).

2) In cyclopentasiloxane:

2.1 PAPI 27

In a 250 mL beaker, 5 g of a 12.5% dispersion of high molecular weight silicone polyether in cyclopentasiloxane (Dow corning 5225) were dissolved in 75 g cyclopentasiloxane. The solution was homogenized at 10,000 rpm for 30 seconds. To this phase, a mixture consisted of 0.6 g of (ethylenedioxi)bis(ethylamine) (4 mmol) and 4.6 g of polyethylene glycol (PEG) was added and homogenized for further 1.5 minutes. Then, 1.4 g of polymethylene polyphenylisocyanate (PAPI 27)(4.1 mmol) dissolved in 6 g toluene were added dropwise. The emulsion was allowed to stir for 4 hours at room temperature. The resulting microcapsules were separated by centrifugation and washed three times with cyclopentasiloxane (20 mL*3).

2.2 tolylene-2,4-diisocyanate

In a 250 mL beaker, 5 g of a 12.5% dispersion of high molecular weight silicone polyether in cyclopentasiloxane (5225 dow corning) were dissolved in 75 g cyclopentasiloxane. The solution was homogenized at 10,000 rpm for 30 seconds. To this phase, a mixture consisted of 0.4 g of diethylenetriamine (3.8 mmol) and 4.6 g of polyethylene glycol (PEG) was added and homogenized for further 1.5 minutes. Then, 0.7 g of tolylene-2,4-diisocyanate (4 mmol) dissolved in 6 g xylene were added dropwise. The emulsion was allowed to stir for 4 hours at room temperature. The resulting microcapsules were separated by centrifugation and washed three times with cyclopentasiloxane (20 mL×3).

2.3 Paraffin Wax+Clomazone

In a 100 mL beaker, 2.5 g of a 12.5% dispersion of high molecular weight silicone polyether in cyclopentasiloxane (5225 dow corning) were dissolved in 32.5 g cyclopentasiloxane. The solution was homogenized at 10,000 rpm for 30 seconds. To this phase, a mixture consisted of 0.3 g of diethylenetriamine (2.9 mmol), 5 g clomazone and 4.7 g paraffin wax was added and homogenized for further 1.5 minutes. Then, 0.6 g of 4 4'-methylenebis(cyclohexylamine) (2.8 mmol) dissolved in 5 g cyclopentasiloxane were added. The emulsion was allowed to stir for 4 hours at room temperature. The resulting microcapsules were separated by centrifugation and washed three times with heptane (20 mL×3).

Preparation of BMIm[PF6] Polyurea Microcapsules Via BMIm[PF6]-In-Oil Emulsion

BMIm[PF6]-in-oil emulsion requires a surfactant consisting of a low HLB, HLB b 15, in order to stabilize the BMIm[PF6] droplets in the oil phase. In addition, polymeric surfactants are efficient in the stabilization of the ionic liquid droplets; therefore, the surfactant Bu-PVP was poly(1-ethenylpyrrolidin-2-one/hexadec-1-ene (Agrimer AL22). Agrimer AL22 is a block co-polymeric surfactant with a HLB lower than 15 (HLB=3-5) and therefore should enable the stabilization of the BMIm[PF6] droplets within the oil phase. A number of BMIm[PF6]-in-oil emulsions in the presence of Agrimer AL22 were examined. The solvents xylene, cyclohexane, heptane and toluene enabled the formation of BMIm[PF6]-in-oil emulsion. Xylene demonstrated no phase separation in the time required for the capsule preparation and was therefore chosen as the oil phase. HMDA was dissolved within the BMIm[PF6] by means of sonication or heat. First, HMDA was combined with PAPI 27. The centrifugation test demonstrated no phase separation, but when the system was analyzed by SEM, only chunks of polyurea were observed. Second, the formation of BMIm[PF6]@PU microcapsules was also examined in the presence of HMDA combined with TDI. The system passed the centrifugation test, but again, only polyurea chunks were formed. Therefore, the HMDA was changed to DETA and the formation of BMIm[PF6]@PU microcapsules was examined in the presence of different isocyanates, TDI, HDI, MBDI and PAPI 27. The centrifugation test gave phase separation only in the presence of MBDI. SEM images indicate that mainly polyurea chunks are formed, but some capsules were observed in the presence of TDI or PAPI 27, indicating optimization is required. Optimization was done for both systems, TDI combined with DETA and PAPI 27 combined with DETA. First, different Agrimer AL22 percentages were examined, 0%, 2%, 4%, 6% and 10%. SEM images demonstrated mainly creation of polyurea chunks, although in percentages 2-6% some capsules were observed. Further optimization procedures were performed with 4% surfactant. Second, xylene, toluene, heptane and cyclohexane were examined as the oil phase. SEM images indicate xylene is the optimum oil phase in the formation of BMIm[PF6]@PU microcapsules, in the combination of DETA and TDI. In the presence of DETA combined with PAPI 27, some capsules were observed in the presence of xylene and heptane as the continuous phase. In the preparation of BMIm[PF6]@PU microcapsules in heptane, PAPI 27 was dissolved in the BMIm[PF6], since it is insoluble in heptane, and DETA was diluted in heptane and dripped slowly; whereas in xylene, DETA was dissolved in the BMIm[PF6], and PAPI 27 was diluted in xylene and dripped slowly. As observed from the SEM images, less polyurea chunks were obtained when PAPI 27 was utilized in heptane. It was assumed that the formation of polyurea chunks in these experiments is due to the creation of oligomers soluble in the oil phase. This decreases their affinity to the interface and prevents the polymerization to occur at the droplet interface. Therefore, the amine, 1,3-bis(3-aminopropyl)-1H-imidazol-3-ium chloride (BAPIC), with ionic liquid features, was synthesized (FIG. 55). Having an ionic liquid functional group within the diamine monomer, BAPIC, should decrease the solubility of the formed urea oligomers in the dispersing phase, thus enable controlled interfacial polymerization and prevent formation of polyurea chunks or films.

The effect BAPIC has on the formation of BMIm[PF6] @PU microcapsules was examined in xylene in the presence of PAPI 27 and Agrimer AL22 as a surfactant. The sample passed the centrifugation test and SEM analysis indicated only BMIm[PF6]@PU microcapsules were formed. Optimization was employed by examining the polymerization time, the surfactant type and percentage, the isocyanate: BAPIC molar ratio, and the percentage of the BMIm[PF6] phase. The polymerization time was examined by stirring the system for various hours, 2 h, 4 h, 6 h, and 24 h at room temperature. Capsules were observed after 2 h of polymerization and up. Undesirable polymeric coating covers the microcapsules obtained after 6 h and up. We believe the polymer coating occurs when the entire interface is polymerized and further polymerization occurs in the dispersing phase. Therefore, 4 h was chosen as the optimized polymerization time. Then, the surfactant type and percentage were examined. The surfactants polymeric surfactants: Agrimer AL22, Pluronic 123 the nonionic surfactants: polyoxyethylene (20) sorbitan monooleate (Tween 80), bis-PEG/PPG-14/14 dimethicone (EM-97), and the anionic surfactants: sodium 1,4-bis(2-ethylhexoxy)-1,4-dioxobutane-2- sulfonate (AOT), were tested and capsules were formed only in the presence of Agrimer AL22. These results correlate with those obtained for the BMIm[PF6]-in-water emulsion, were the polymeric surfactant enabled the formation of the desired microcapsules. In addition, Pluronic P123 is not suitable for the stabilization of the BMIm[PF6]droplet in this system as well. Next, the following percentages, 0%, 2%, 4%, 6% and 10%, of Agrimer AL22 were examined. SEM images indicate that the optimized system was formed using 4% of surfactant. Five different PAPI 27:BAPIC molar ratio were examined, 1.0:0.8, 1.0:1.0, 1.0:1.2, 1.0:1.4 and 1.0:1.6, and in all ratios capsules were formed. As mentioned before, the ratio affects the amount of cross linking within the capsules and therefore its permeability. Thus, the applicability of the capsule should determine the ratio. These capsules can be applied in catalytic reactions, therefore the capsules should, on one hand, be permeable, in order to enable the reactants diffusion to the core. On the other hand, the shell should prevent leaching of the core. The PAPI 27:BAPIC molar ratio, 1.0:1.4 can provide these features and therefore further optimization was conducted using this ratio. Five different BMIm[PF6] percentages were examined, 2%, 6%, 10%, 14% and 17%. Capsules were formed in all five percentages. The higher the BMIm[PF6] phase, the higher the ionic liquid loading is, therefore, 17% was chosen. The optimized conditions were found to be, 4% Agrimer AL22, 17% BMIm[PF6] and PAPI 27 and BAPIC as the monomers in a molar ratio of 1.0:1.4. The optimizedBMIm[PF6]@PU microcapsuleswere characterized by SEM, NMR, TGA, and IR analyses. SEM images indicate the capsules have a spherical morphology. An additional indication for the formation of BMIm[PF6]@PU microcapsules was obtained by 13C CP-MAS NMR (FIG. 6). Ten peaks are observed in the 13C CP-MASNMR spectra, 155, 140, 135, 123, 121, 49, 35, 31, 18 and 12 ppm. All eight characteristic peaks of BMIm[PF6] are observed. Five alkyl carbon peaks at 69, 35, 31, 18 and 12 ppm as well as three imidazolium carbon peaks at 135, 123 and 121 ppmare detected. These results indicate that BMIm[PF6]@PU microcapsules were formed. The peak at 155 ppm represents the C=O carbon of the urea group, demonstrating a polyurea shell was formed. The peak at 140 ppm is ascribed to the aromatic carbon of the polyurea shell as well as the broad peak from 113 to 142 ppm, which overlaps with the BMIm [PF6]imidazoliumcarbons. In addition, the broad peak at 23–46 ppm, which overlaps with the BMIm[PF6] alkyl carbon peaks, is ascribed to the aliphatic carbons of the polyurea shell. The absence of the characteristic peak of Agrimer AL22 at 175 ppm, in the BMIm[PF6]@PU microcapsules spectra, indicates that during the process all of the surfactant was washed. In order to detect the thermal stability and the organic content of the BMIm[PF6], TGA analysis was performed. The analysis was performed under N2 atmosphere temperature ranging from 25° C. to 800° C.

A total of 94% weight lost was observed for the BMIm [PF6]@PU microcapsules. The weight loss occurs in two stages. The first centered at 140° C., demonstrating the desorption of volatile solvents. The second stage occurs between 260 and 473° C. This weight loss refers to the decomposition of the polyurea and BMIm[PF6] consisting the BMIm[PF6]@PU microcapsule, as deducted from the 13C CP-MAS NMR. The remaining 6% are ascribed to non-decomposable species formed during the heating process. Infrared analysis indicated polyurea was formed, by the presence of the characteristic band peaks of the urea groups: 3425 cm-1, 3304 cm-1, and 3169 cm-1 belong to the N—H asymmetric and symmetric stretch bands. The band at 1665 cm-1 is ascribed to the C=O stretch. The band at 1603 cm-1 is attributed to the C=C stretching of the aromatic and the imidazolium rings. The band at 1456 cm-1 is assigned to the C—N stretch and the peak at 1166 cm-1 belongs to N—H bending. The C=O stretching band of an isocyanate group is not observed, indicating no free isocyanate groups exist. This can be explained by the amine isocyanate molar ratio, as well as the way the polymerization occurs. In this system the amine is dissolved within the BMIm[PF6], and in order to create the polyurea shell, PAPI 27 should diffuse to the droplet interface, where statistically there is a high number of BAPIC. In addition, no surfactant characteristic peaks are observed, indicating the surfactant was washed out in the workup process, which correlates with the solid NMR. Determination of the BMIm[PF6] loading was obtained by extraction of the ionic liquid by refluxing the capsules for three days in chloroform. A 19% loading was obtained.

The invention claimed is:

1. A process for the preparation of microcapsules encapsulating at least one active agent in a metal oxide shell comprising the steps of:
   Preparing a non-hydrous emulsion comprising at least one polar phase, at least one non-polar phase, at least one active agent, at least one metal oxide precursor, at least one condensation precursor and at least one surface active agent;
   Subjecting said non-hydrous emulsion to at least one condition allowing the formation of a metal oxide shell encapsulating said at least one active agent;
   thereby forming said microcapsules;
   wherein said non-hydrous emulsion further comprises at least one catalyst.

2. The process according to claim 1, wherein said non hydrous emulsion is prepared by:
   (i) mixing said at least one polar phase and said at least one non-polar phase, wherein said at least one non-polar phase comprises the at least one metal oxide precursor prior to said mixing; or
   (ii) mixing said at least one polar phase and said at least one non-polar phase, wherein said at least one polar phase comprises the at least one condensation precursor prior to said mixing; or
   (iii) mixing said at least one polar phase and said at least one non-polar phase, wherein said at least one metal oxide precursor is added after said mixing; or
   (iv) mixing said at least one polar phase and said at least one non-polar phase, wherein said at the least one condensation precursor is added after said mixing; or
   (v) mixing said at least one polar phase and said at least one non-polar phase, wherein said at least one non-polar phase comprises at least one surfactant prior to said mixing; or
   (vi) mixing said at least one polar phase and said at least one non-polar phase, wherein said at least one polar phase comprises at least one surfactant prior to said mixing; or
   (vii) mixing said at least one polar phase and said at least one non-polar phase, wherein said at least one non-polar phase comprises at least one active agent prior to said mixing; or
   (viii) mixing said at least one polar phase and said at least one non-polar phase, wherein said at least one polar phase comprises the at least one active agent prior to said mixing.

3. The process according to claim 1, wherein said at least one polar phase is selected from a hydrophobic polar phase or a hydrophilic polar phase.

4. The process according to claim 1, wherein said at least one non-polar phase is selected from a hydrophobic non-polar phase or a hydrophilic non-polar phase.

5. The process according to claim 1, wherein said at least one condition allowing the formation of a metal oxide shell encapsulating the at least one active agent comprises homogenizing, stirring, aging, temperature, ratio between the polar and non-polar phases, surfactant concentration, concentration of condensation precursor.

6. The process according to claim 1, wherein said at least one active agent is dissolved in at least one of said polar phase and said non-polar phase.

7. The process according to claim 1, wherein said at least one active agent is dispersed in at least one of said polar phase and said non-polar phase.

* * * * *